US012601886B2

(12) United States Patent
Enge et al.

(10) Patent No.: US 12,601,886 B2
(45) Date of Patent: Apr. 14, 2026

(54) PANEL SYSTEM WITH MANAGED CONNECTIVITY

(71) Applicant: CommScope Technologies LLC, Hickory, NC (US)

(72) Inventors: Ryan Edward Enge, Carrollton, TX (US); Paula Lockhart, New Prague, MN (US); Scott Martin Keith, Plano, TX (US); David Jan Irma Van Baelen, Winksele (BE); Jacob C. Anderson, Chanhassen, MN (US); Steven Walter Knoernschild, Allen, TX (US); Brian J. Fitzpatrick, McKinney, TX (US); Pedro Maldonado, Dallas, TX (US); Gary Federico Gibbs, Wylie, TX (US); James J. Solheid, Minneapolis, MN (US); Matthew J. Holmberg, Le Center, MN (US); Matthew Robert Kiener, McKinney, TX (US)

(73) Assignee: CommScope Technologies LLC, Hickory, NC (US)

( * ) Notice: Subject to any disclaimer, the term of this patent is extended or adjusted under 35 U.S.C. 154(b) by 182 days.

(21) Appl. No.: 18/492,368

(22) Filed: Oct. 23, 2023

(65) Prior Publication Data

US 2024/0126038 A1      Apr. 18, 2024

Related U.S. Application Data

(63) Continuation of application No. PCT/US2022/026171, filed on Apr. 25, 2022.

(Continued)

(51) Int. Cl.
*G02B 6/44* (2006.01)

(52) U.S. Cl.
CPC ....... *G02B 6/44526* (2023.05); *G02B 6/4453* (2013.01); *G02B 6/44528* (2023.05)

(58) Field of Classification Search
CPC . G02B 6/4452; G02B 6/44526; G02B 6/4453
See application file for complete search history.

(56) References Cited

U.S. PATENT DOCUMENTS

| | | | |
|---|---|---|---|
| 5,363,460 A | 11/1994 | Marazzi et al. | |
| 6,302,592 B1 | 10/2001 | Zullig | |
| (Continued) | | | |

FOREIGN PATENT DOCUMENTS

| | | | |
|---|---|---|---|
| CN | 203581765 U | * | 5/2014 |
| KR | 10-2014-0101737 A | | 8/2014 |
| (Continued) | | | |

OTHER PUBLICATIONS

International Search Report and Written Opinion for Application No. PCT/US2022/026171 mailed Aug. 12, 2022.

(Continued)

*Primary Examiner* — Tina Wong
(74) *Attorney, Agent, or Firm* — MERCHANT & GOULD P.C.

(57) ABSTRACT

A panel system includes a chassis holding one or more tray arrangements, which are each configured to receive one or more cassettes at two or more bays. The tray arrangements and cassettes cooperate to define a cassette sensor arrangement and a port occupancy sensor arrangement having separate interface points. The cassette sensor arrangement may include electronic memory storing physical layer information about the cassette. All active components of the port occupancy sensor arrangement are disposed on the tray while the electronic memories of the cassette sensor arrangement are stored on the cassettes.

20 Claims, 61 Drawing Sheets

Related U.S. Application Data

(60) Provisional application No. 63/282,062, filed on Nov. 22, 2021, provisional application No. 63/278,924, filed on Nov. 12, 2021, provisional application No. 63/178,900, filed on Apr. 23, 2021.

(56) References Cited

U.S. PATENT DOCUMENTS

| | | | |
|---|---|---|---|
| 6,526,210 B1* | 2/2003 | Harrison | G02B 6/3825 |
| | | | 385/134 |
| 6,554,484 B2 | 4/2003 | Lampert et al. | |
| 6,685,362 B2 | 2/2004 | Burkholder et al. | |
| 6,709,165 B2 | 3/2004 | De Marchi | |
| 7,182,524 B2 | 2/2007 | Kramer et al. | |
| 7,534,115 B2 | 5/2009 | Murano et al. | |
| 8,596,882 B2 | 12/2013 | Smrha et al. | |
| 8,690,593 B2 | 4/2014 | Anderson et al. | |
| 8,757,895 B2 | 6/2014 | Petersen | |
| 8,923,013 B2 | 12/2014 | Anderson et al. | |
| 8,934,252 B2 | 1/2015 | Anderson et al. | |
| 8,934,253 B2 | 1/2015 | Anderson et al. | |
| 8,992,260 B2 | 3/2015 | Coffey et al. | |
| 9,020,319 B2 | 4/2015 | Anderson et al. | |
| 9,054,440 B2 | 6/2015 | Taylor et al. | |
| 9,128,262 B2 | 9/2015 | Campbell et al. | |
| 9,140,859 B2 | 9/2015 | Anderson et al. | |
| 9,176,294 B2 | 11/2015 | Smrha et al. | |
| 9,198,320 B2 | 11/2015 | Anderson et al. | |
| 9,213,363 B2 | 12/2015 | Anderson et al. | |
| 9,223,105 B2 | 12/2015 | Anderson et al. | |
| 9,265,172 B2 | 2/2016 | Anderson et al. | |
| 9,285,552 B2 | 3/2016 | Marcouiller et al. | |
| 9,379,501 B2 | 6/2016 | Taylor et al. | |
| 9,401,552 B2 | 7/2016 | Coffey et al. | |
| 9,417,399 B2 | 8/2016 | Anderson et al. | |
| 9,423,570 B2 | 8/2016 | Petersen et al. | |
| 9,532,481 B2 | 12/2016 | Anderson et al. | |
| 9,532,482 B2 | 12/2016 | Anderson et al. | |
| 9,538,262 B2 | 1/2017 | German et al. | |
| 9,549,484 B2 | 1/2017 | Anderson et al. | |
| 9,595,797 B2 | 3/2017 | Taylor et al. | |
| 9,632,255 B2 | 4/2017 | Anderson et al. | |
| 9,684,134 B2 | 6/2017 | Anderson et al. | |
| 9,769,939 B2 | 9/2017 | Coffey et al. | |
| 9,778,424 B2 | 10/2017 | Marcouiller et al. | |
| 9,804,337 B2 | 10/2017 | Anderson et al. | |
| 9,810,860 B2 | 11/2017 | Smrha et al. | |
| 9,967,983 B2 | 5/2018 | Coffey et al. | |
| 10,012,813 B2 | 7/2018 | Petersen et al. | |
| 10,088,636 B2 | 10/2018 | Brandt et al. | |
| 10,101,542 B2 | 10/2018 | Kostecka et al. | |
| 10,123,444 B2 | 11/2018 | Anderson et al. | |
| 10,177,514 B2 | 1/2019 | Taylor et al. | |
| 10,268,000 B2 | 4/2019 | Marcouiller et al. | |
| 10,470,320 B2 | 11/2019 | Coffey et al. | |
| 10,473,864 B2 | 11/2019 | Anderson et al. | |
| 10,571,641 B2 | 2/2020 | Petersen et al. | |
| 10,574,008 B2 | 2/2020 | Taylor et al. | |
| 10,678,001 B2 | 6/2020 | Smrha et al. | |
| 10,746,943 B2 | 8/2020 | Marcouiller et al. | |
| 10,958,024 B2 | 3/2021 | Taylor et al. | |
| 10,983,285 B2 | 4/2021 | Anderson et al. | |
| 10,983,287 B2 | 4/2021 | Terashima | |
| 11,143,833 B2 | 10/2021 | Petersen et al. | |
| 11,191,173 B2 | 11/2021 | Coffey et al. | |
| 11,231,555 B2 | 1/2022 | Smrha et al. | |
| 11,327,248 B2 | 5/2022 | Marcouiller et al. | |
| 11,378,755 B2 | 7/2022 | Anderson et al. | |
| 11,469,560 B2 | 10/2022 | Taylor et al. | |
| 11,558,680 B2 | 1/2023 | German et al. | |
| 11,630,269 B2 | 4/2023 | Smrha et al. | |
| 11,695,232 B2 | 7/2023 | Yang et al. | |
| 11,714,246 B2 | 8/2023 | Petersen et al. | |
| 11,862,912 B2 | 1/2024 | Taylor et al. | |
| 11,867,952 B2 | 1/2024 | Marcouiller et al. | |
| 12,160,693 B2 | 12/2024 | German et al. | |
| 2006/0158866 A1* | 7/2006 | Peterson | H05K 7/1491 |
| | | | 361/796 |
| 2009/0148116 A1* | 6/2009 | Yanagimachi | G02B 6/43 |
| | | | 385/135 |
| 2011/0038581 A1 | 2/2011 | Mudd et al. | |
| 2011/0116748 A1 | 5/2011 | Smrha et al. | |
| 2011/0142407 A1 | 6/2011 | Rapp et al. | |
| 2014/0219614 A1* | 8/2014 | Marcouiller | G02B 6/3895 |
| | | | 385/88 |
| 2015/0039788 A1 | 2/2015 | Dearing et al. | |
| 2015/0060539 A1* | 3/2015 | Thompson | G02B 6/44526 |
| | | | 235/375 |
| 2016/0077298 A1* | 3/2016 | Wiltjer | G02B 6/4455 |
| 2017/0293098 A1* | 10/2017 | Lee | G02B 6/44526 |
| 2019/0075676 A1 | 3/2019 | Anderson et al. | |
| 2019/0101717 A1* | 4/2019 | Pilon | G02B 6/4455 |
| 2019/0219786 A1* | 7/2019 | Crawford | G02B 6/562 |
| 2019/0258011 A1* | 8/2019 | Pitwon | H05K 7/1488 |
| 2019/0286211 A1 | 9/2019 | Polland et al. | |
| 2020/0057226 A1 | 2/2020 | Sievers et al. | |
| 2020/0319476 A1 | 10/2020 | Han et al. | |
| 2021/0088742 A1* | 3/2021 | Malecha | G02B 6/44528 |
| 2021/0267084 A1 | 8/2021 | Anderson et al. | |
| 2022/0201876 A1 | 6/2022 | Coffey et al. | |
| 2022/0260800 A1 | 8/2022 | Van Baelen et al. | |
| 2023/0023071 A1 | 1/2023 | Anderson et al. | |
| 2023/0124584 A1 | 4/2023 | German et al. | |
| 2023/0367091 A1 | 11/2023 | Petersen et al. | |

FOREIGN PATENT DOCUMENTS

| | | | |
|---|---|---|---|
| WO | 2015/120617 A1 | 8/2015 | |
| WO | 2020/150070 A1 | 7/2020 | |
| WO | 2022/081751 A1 | 4/2022 | |
| WO | 2022/178310 A1 | 8/2022 | |
| WO | 2022/192654 A1 | 9/2022 | |
| WO | 2022/204515 A1 | 9/2022 | |
| WO | 2022/226171 A1 | 10/2022 | |
| WO | 2022/226406 A1 | 10/2022 | |

OTHER PUBLICATIONS

Extended European Search Report for Application No. 22792643.3 mailed Feb. 7, 2025.

* cited by examiner

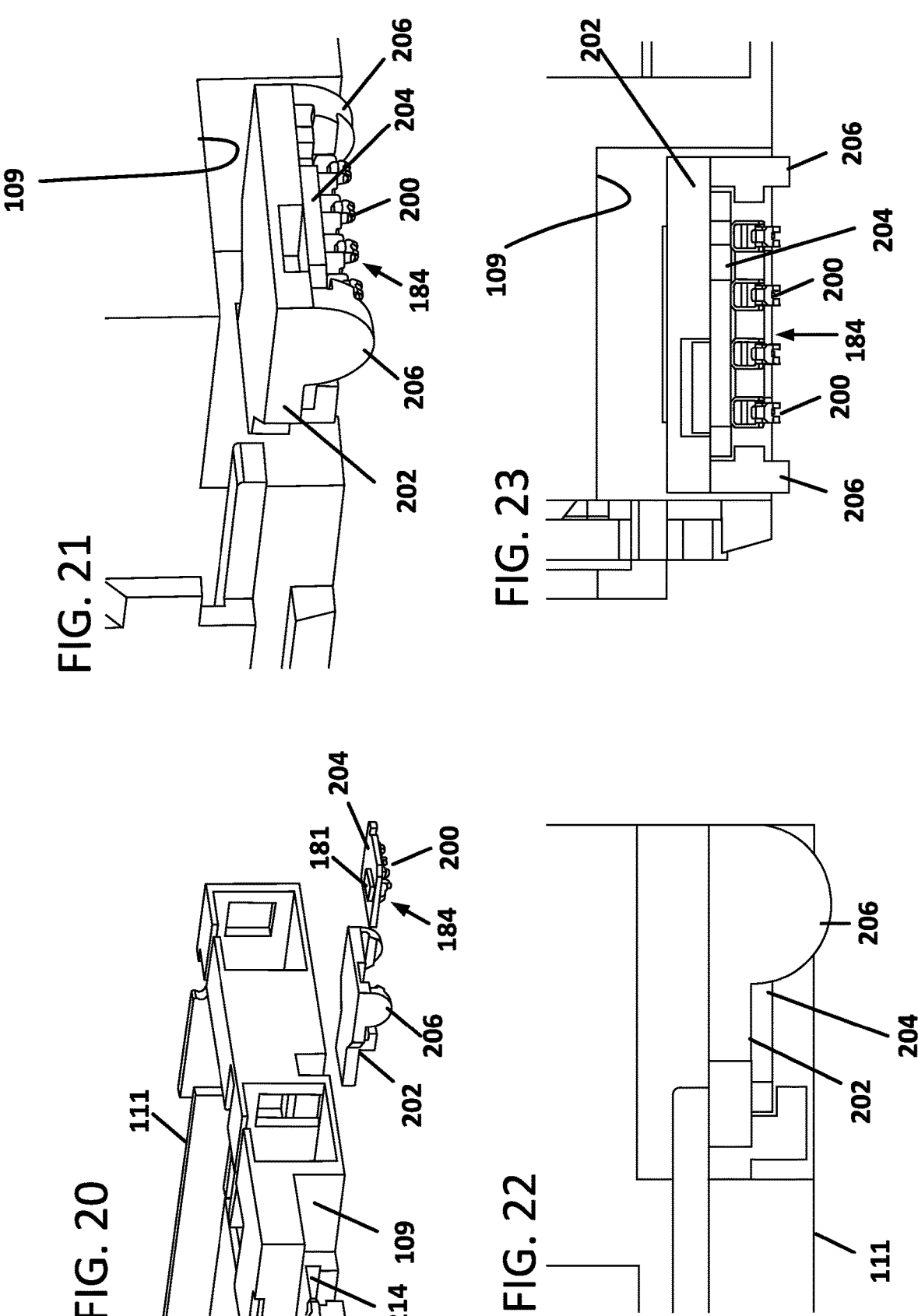

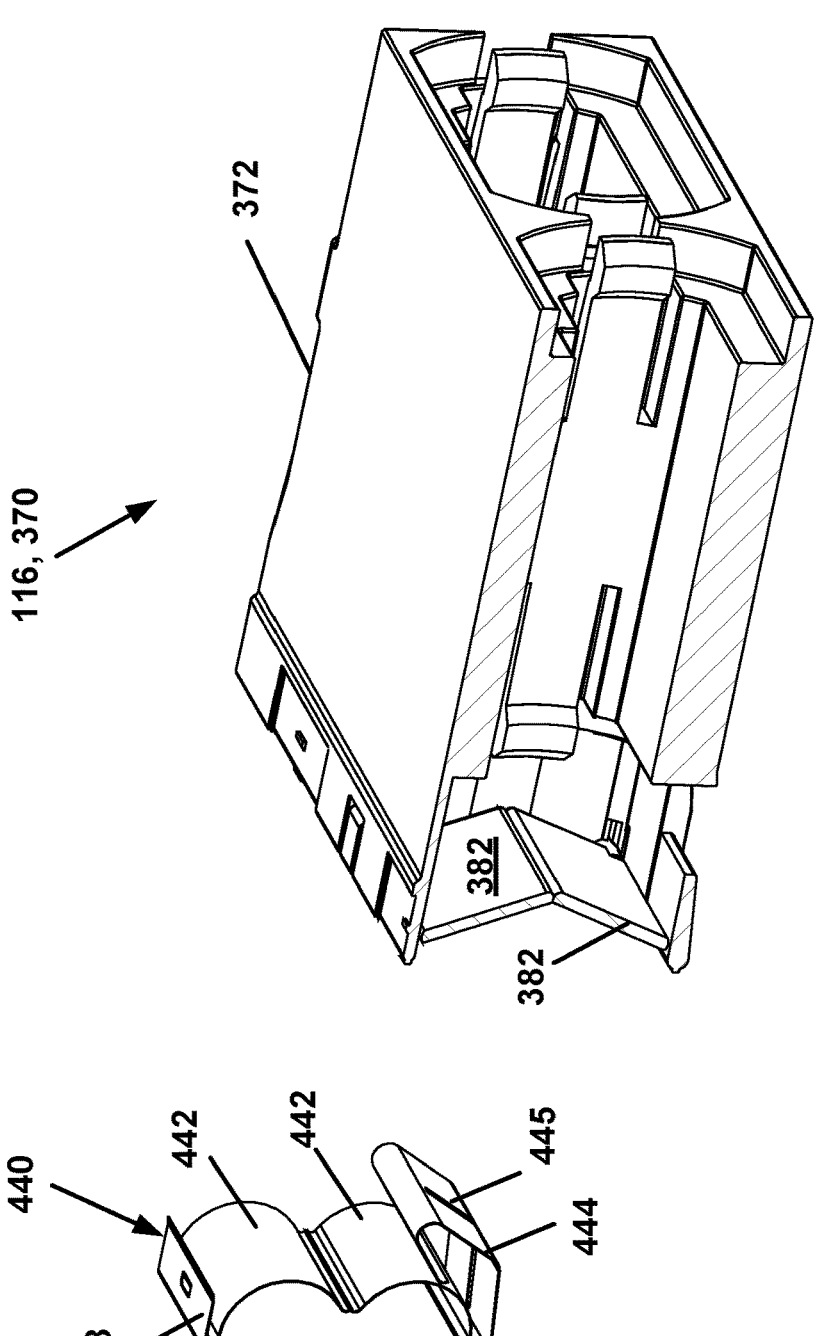
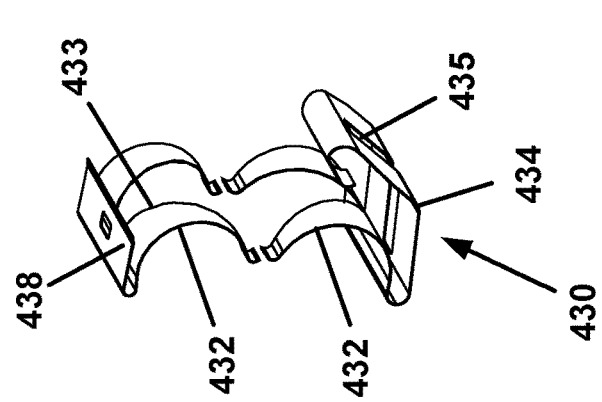
FIG. 71

PANEL SYSTEM WITH MANAGED CONNECTIVITY

CROSS-REFERENCE TO RELATED APPLICATIONS

This application is a Continuation of International Patent Application No. PCT/US2022/026171, filed on Apr. 25, 2022, which claims the benefit of U.S. Patent Application Ser. No. 63/178,900, filed on Apr. 23, 2021, claims the benefit of U.S. Patent Application Ser. No. 63/278,924, filed on Nov. 12, 2021 and claims the benefit of U.S. Patent Application Ser. No. 63/282,062, filed on Nov. 22, 2021, the disclosures of which are incorporated herein by reference in their entireties. To the extent appropriate, a claim of priority is made to each of the above disclosed applications.

BACKGROUND

Communications panel systems are used to interconnect various communication lines (e.g., telecommunications lines, data center lines, etc.) in one or more racking systems. In various cases, the panel system can support optical lines, electrical lines, and/or hybrid lines. Each panel system includes a plurality of front ports and a plurality of rear ports. In some implementations, equal numbers of front and rear cables are directly connected together at the front and rear ports. In other implementations, cassettes are provided at a panel system to communicatively connect one or more rear cables to a different number of front cables. As communications panel systems become more and more dense, accurately identifying which ports are available to support additional connections becomes more difficult.

Improvements are desired.

SUMMARY

Some aspects of the disclosure are directed to a communications panel system including a tray adapted to receive one or more cassettes of various types in a variety of configurations. The cassettes capable of being received can vary in size, in the number of front ports, in the number of rear ports, and/or in the type of front and/or rear ports. In certain implementations, the tray holds a first portion of a cassette identification sensor arrangement. In certain implementations, the tray holds a first portion of a port occupancy sensor arrangement. In certain implementations, the tray holds both the first portion of the cassette identification sensor arrangement and the first portion of the a port occupancy sensor arrangement.

In certain implementations, each cassette carries a second portion of the cassette identification sensor arrangement and a second portion of the port occupancy sensor arrangement. The second portion of the cassette identification sensor arrangement engages or otherwise interacts with the first portion of the cassette identification sensor arrangement to identify a cassette type including the number and types of ports carried by the cassette. The second portion of the port occupancy sensor arrangement engages or otherwise interacts with the first portion of the port occupancy sensor arrangement to indicate which ports are available.

In certain implementations, the first portion of the port occupancy sensor arrangement includes any active components of the sensor arrangement and the second portion of the port occupancy sensor arrangement includes only passive components.

In certain implementations, the tray defines a plurality of bays at which the cassettes are mounted with each cassette spanning at least two bays. The first portion of the cassette identification sensor arrangement includes a plurality of first readers aligned with the bays so that each bay includes a respective first reader. In some examples, the first readers include wireless transceivers. In other examples, the first readers include contact pads.

In certain implementations, the first portion of the port occupancy sensor arrangement includes a plurality of second readers aligned with the bays so that each bay includes at least two of the second readers. In certain examples, each bay includes at least four of the second readers. The second readers are disposed towards a front of the tray to align with the front ports of the cassettes when the cassettes are mounted on the tray. In certain examples, the first readers are spaced rearwardly of the second readers.

In certain implementations, the first portion of the port occupancy sensor arrangement also includes a plurality of third readers aligned with the bays rearward of the second readers so that third readers are aligned with the rear ports of the cassettes. In some examples, the third readers are disposed forward of the first readers. In other examples, the third readers are disposed rearward of the first readers.

In some examples, the first, second, and third readers have a common type. For example, the first, second, and third readers may all include contact pads. In other examples, the first readers may differ from the second and third readers.

In certain implementations, the first portion of the cassette identification sensor arrangement and the first portion of the port occupancy sensor arrangement are mounted to a circuit board, which is mounted to the tray. In certain examples, cassette guides, which define the bays, hold the circuit board to the tray.

In certain implementations, the second portion of the cassette identification sensor arrangement includes electronic memory and an interface through which the electronic memory is made accessible to one of the first readers. In some examples, the interface is a wireless interface (e.g., a transceiver). In other examples, the interface is a physical contact interface (e.g., one or more spring contacts).

In certain implementations, the cassette is slidably mounted to the tray. In certain examples, the cassettes carries a physical contact interface for the electronic memory of the cassette identification sensor arrangement. In some such examples, the physical contact interface is deflectably mounted to the cassette to inhibit damage to the physical contact interface when the cassette is mounted to or removed from the tray.

In certain implementations, the second portion of the port occupancy sensor arrangement includes one or more spring contacts configured to engage the second or third readers.

In certain implementations, the tray also holds an indication arrangement including a plurality of indicators (e.g., light indicators such as LEDs) that align with at least some of the ports carried by the cassettes. The indicators can be used for guiding patching and cabling work orders (e.g., to add and/or remove connections at specific ports).

In certain implementations, the tray arrangement may include a tactile user interface by which a user may select a port to be traced. In certain examples, each tray arrangement includes first and second tactile user interfaces that allow for forward and reverse cycling of the port selection. In certain examples, the tactile user interface is installed at a common location with the latching handle so that the latching handle surrounds and moves relative to the tactile user interface.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 11 is a perspective view of an axial cross-section taken through an example cassette so that an actuator and plug sensor of the port occupancy sensor arrangement are visible;

FIG. 12 is a bottom perspective view of an example port member suitable for use with a cassette, the port member carrying a spring contact arrangement extending towards the shutters from a central portion of the port member;

FIG. 20 is a rear perspective view of an example cassette having a separate frame arm to which the cassette identifier mounts;

FIG. 21 is a rear perspective view of the cassette identifier and frame arm of FIG. 20 mounted to a portion of the cassette;

FIG. 22 is a side elevational view of the frame arm and portion of the cassette of FIG. 21;

FIG. 23 is a rear elevational view of the cassette identifier, frame arm, and portion of the cassette of FIG. 21;

FIG. 35 is a perspective view of an example tray arrangement showing a multi-piece circuit board and latching arrangement exploded from a tray base;

FIG. 53 is an axial cross-section taken of the port member of FIG. 51;

FIG. 64 shows an example cassette identifier having pre-loaded springs mounted within a pocket of a cassette;

FIG. 71 is a perspective view of an axial cross-sectional of the port member of FIG. 59 with two alternative spring arrangements exploded outwardly therefrom for ease in viewing.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 3:
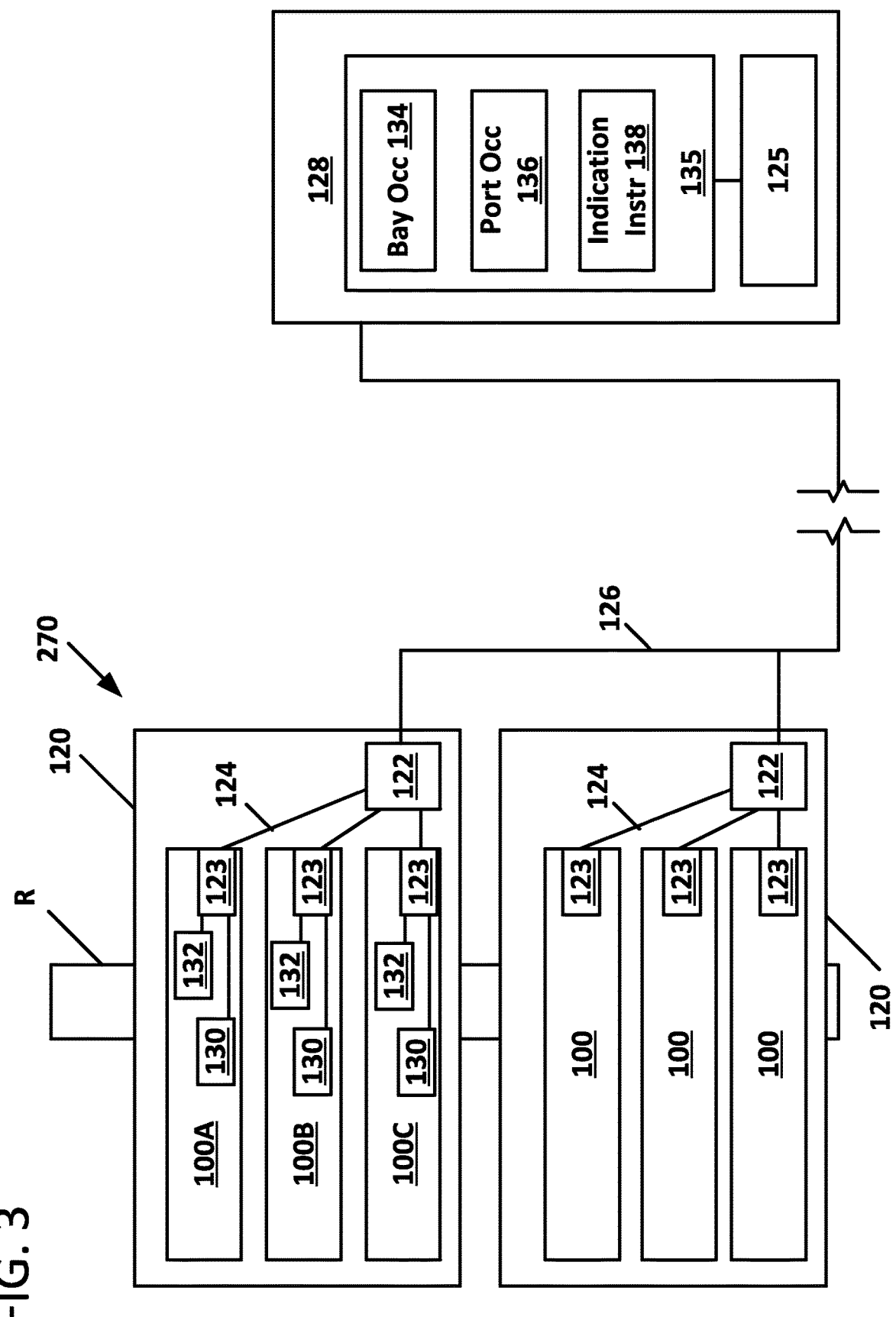
FIG. 3 is a schematic diagram of an example panel system including a plurality of chassis holding a plurality of tray arrangements, each chassis having a communications unit by which signals from a cassette sensor arrangement and a port occupancy sensor arrangement can be provided to a remote server.

The present disclosure is directed to a tray arrangement 100 for use in a panel system (e.g., see panel system 270 of FIG. 3). The tray arrangement 100 is mountable (e.g., fixedly mountable, slidably mountable, etc.) within a chassis 120 of the panel system 270. The tray arrangement 100 extends along a depth D between a front 102 and a rear 104 and extends along a width W between opposite first and second sides 106, 108. The tray arrangement 100 is configured to receive one or more cassettes 110 carrying port members 116 and/or other communications equipment (e.g., optical splice holders, optical power splitters, wave division multiplexers, active components, power amplifiers, etc.).

In certain implementations, the tray arrangement 100 includes a plurality of cassette guides 112 extending in parallel along the depth D of the tray arrangement 100. The cassette guides 112 are spaced along the width W to define a plurality of bays 114 at which the cassettes 110 can be mounted. In certain implementations, each cassette 110 spans at least two bays 114. In various examples, each cassette 110 may span two, three, four, five, six, or more bays 114. In other implementations, a cassette 110 may span a single bay 114.

A first type of example cassette 110 may hold a first row of port members 116 defining front ports and rear ports at which first connectorized media segments and second connectorized media segments are aligned and connected. In some examples, the first type of cassette 110 holds a plurality of single-fiber port members (e.g., LC ports, SC ports, etc.) 116A. In other examples, the first type of example cassette 110 may hold a plurality of multi-fiber port members (e.g., MPO ports, SN ports, etc.) 116B. A second type of example cassette 110 may hold a first row of ports members 116, 116A, 116B and one or more rear port members 116C defining rear ports at which a connectorized media segment can be received. Circuitry (e.g., optical circuitry, electrical circuitry, etc.) within the cassette 110 connects the rear port member(s) 116C to the rear ports of the front port members 116, 116A, 116B so to connect the connectorized media segments received at the front ports to the connectorized media segment(s) received at the rear port(s). Other types of cassettes 110 are possible (e.g., cassettes carrying splice holders, optical splitters, power amplifiers, etc.).

In accordance with certain aspects of the disclosure, the tray arrangement 100 is configured to enable monitoring of bay occupancy and availability at the tray arrangement 100. In accordance with certain aspects of the disclosure, the tray arrangement 100 also is configured to enable monitoring of port occupancy and availability at each cassette 110 mounted to the tray arrangement 100. For example, the tray arrangement 100 may enable monitoring of the occupancy of the front ports of the row of port members 116A, 116B. In certain examples, the tray arrangement 100 may enable monitoring of the occupancy of the rear ports of rear port members 116C. In certain examples, the tray arrangement 100 may enable monitoring of the occupancy of the rear ports of the front port members 116A, 116B. Bay and port occupancy can be tracked and aggregated at a remote location (e.g., a remote server or network of servers) 128.

In accordance with certain aspects of the disclosure, the tray arrangement 100 is configured to enable reading of physical layer information from any cassette 110 mounted thereto. Examples of such physical layer information includes the type of cassette 110 (e.g., an optical termination cassette carrying adapters configured to connect first and second cables, an optical splice cassette configured to carry one or more optical splices, a conversion module configured to receive different types of connectors at the front and rear of the cassette, etc.), the size of the cassette 110 (e.g., the number of bays 114 the cassettes spans), the number and type of port members 116 carried by the cassette 110 (e.g., duplex LC adapters, SC adapters, MPO adapters, SN adapters, MDC adapters, single-pair sockets, etc.), fiber routing for conversion/module cassettes, media segment type (e.g., fiber, electrical, hybrid, etc.) and other such information.

Figure 2:
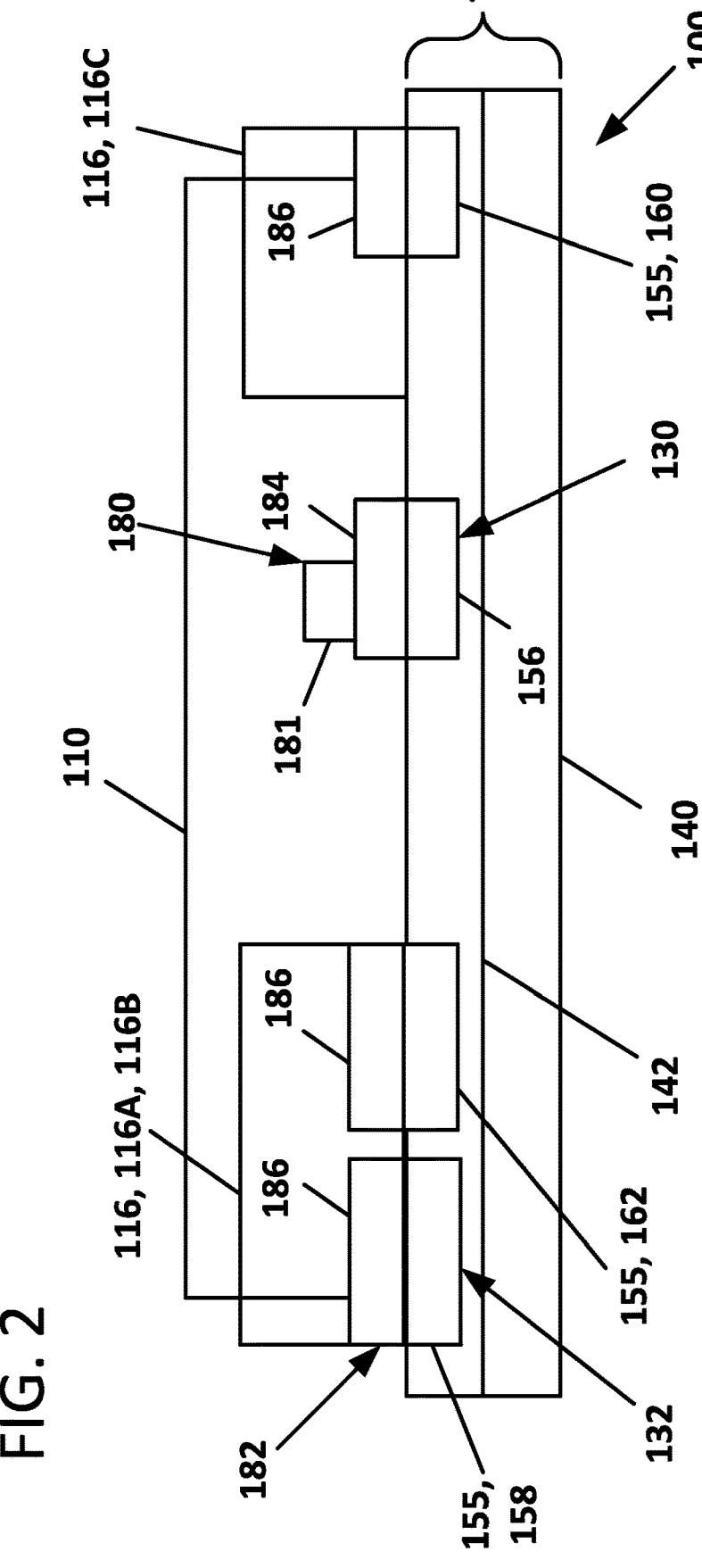
FIG. 2 is a schematic diagram of an example cassette mounted at a tray arrangement so that a cassette identifier carried by the cassette engages or interfaces with a cassette sensor of the tray arrangement and an actuator of the cassette engages or interfaces with a plug sensor of the tray arrangement.

For example, FIG. 2 schematically illustrates an example cassette 110 mounted to a tray arrangement 100. In the example shown, the tray arrangement 100 includes a circuit board 142 mounted to a tray base 140. The tray arrangement 100 includes a first portion 130 of a cassette sensor arrangement and a first portion 132 of a port occupancy sensor arrangement. The cassette 110 includes a second portion 180 of the cassette sensor arrangement and a second portion 182 of the port occupancy sensor arrangement. Engagement or other interaction between the first and second portions 130, 180 of the cassette sensor arrangement triggers a determination that a cassette 110 has been mounted at the tray arrangement 100. In certain examples, the determination that the cassette 110 has been mounted at the tray arrangement 100 triggers a reading of the physical layer information carried by the cassette 110. Engagement or other interaction between the first and second portions 132, 182 of the port occupancy sensor arrangement triggers a determination that a plug connector has been received at a port.

FIG. 3 shows an example panel system 270 configured to receive signals from the first portions 130, 132 of the cassette and port occupancy sensor arrangements and to aggregate and/or analyze the signals. The panel system 270 includes one or more communications units 122 that receive the signals (e.g., raw analog signals or processed digital signals) from the first portions 130 of the cassette sensor arrangement and the signals (e.g., raw analog signals or processed digital signals) from the first portions 132 of the port occupancy sensor arrangement. In some examples, the communications units 122 are directly electrically connected to the first portions 130, 132 of the sensor arrangements. In other examples, the communications units 122 are electrically connected to the first portions 130, 132 of the sensor arrangements via intermediate components (e.g., integrated circuits) disposed on the circuit board 142. The panel system 270 also includes a remote server or servers 128 that receives signals from the communication unit(s) 122 as will be discussed in greater detail herein.

Referring back to FIGS. 1 and 2, in certain implementations, a respective cassette sensor 156 of the first portion 130 of the cassette sensor arrangement is disposed in each of at least some of the bays 114. Each cassette 110 carries a respective cassette identifier 184, which forms the second portion 180 of the cassette sensor arrangement. The cassette identifier 184 is configured to automatically engage or interface with the cassette sensor 156 when the cassette 110 is mounted at the bay 114 as will be discussed in more detail herein. As noted above, in certain examples each cassette 110 spans two or more of the bays 114. In some implementations, each cassette 110 carries a cassette identifier 184 for each bay 114 the cassette 110 spans. However, in certain implementations, each cassette 110 carries only one cassette identifier 184, which engages or otherwise interacts with the cassette sensor 156 in only one of the bays 114 being spanned.

In such implementations, the cassette identifier 184 includes an electronic memory 181 that stores information (e.g., physical layer information) about the cassette 110 and an interface by which the stored information can be passed as will be described in more detail herein. In an example, the electronic memory 181 form part of an $I^2C$ circuit. In certain examples, the information stored in electronic memory 181 on the cassette 110 includes the type of cassette 110, the size of the cassette 110 (e.g., the number of bays 114 that cassettes spans), the number and type of port members 116 carried by the cassette 110, internal fiber routing within the cassette, the media segment types, and other such information.

The cassette sensor 156 is configured to read (or enable reading by a respective communications unit 122) of the electronic memory 181 to obtain the stored information. In certain such examples, the cassette identifier 184 is disposed in a common location relative to a cassette latching arrangement on each cassette 110. Accordingly, the number of bays 114 spanned by the cassette 110 can be determined (e.g. by the communications unit 122 or by the remote server(s) 128) and hence the specific bays occupied by the cassette 110 can be identified. Example cassette latching arrangements suitable for use on the cassettes 110 are disclosed in U.S. Provisional Appl. No. 63/150,840, filed Feb. 18, 2021, titled "Cassette Latching Arrangement," the disclosure of which is hereby incorporated herein by reference in its entirety.

Figure 1:
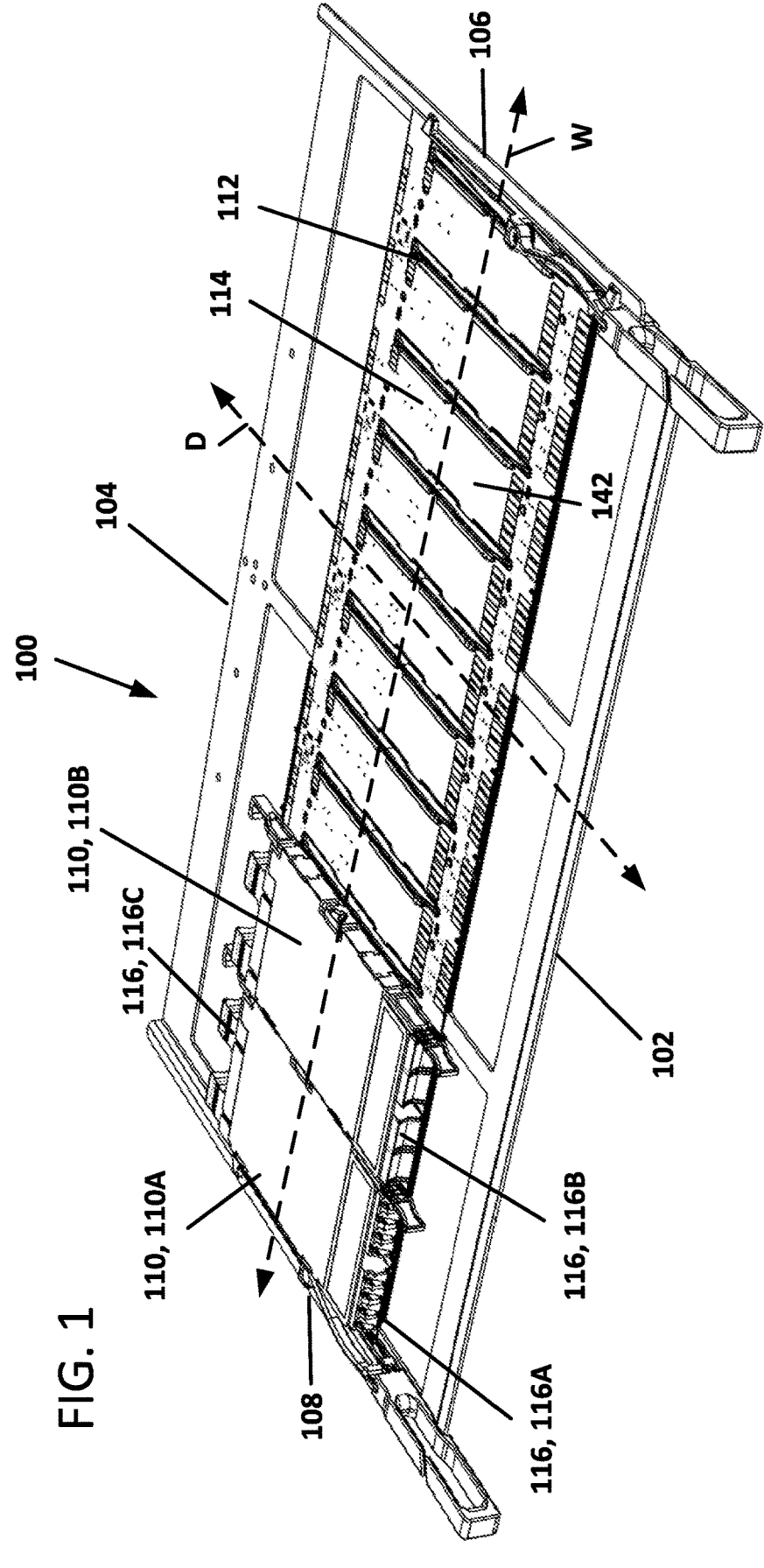
FIG. 1 is a perspective view of an example tray arrangement holding two representative cassettes, the tray arrangement and cassettes being configured in accordance with the principles of the present disclosure.

For example, the cassette 110A of FIG. 1 spans two bays 114. Accordingly, the electronic memory 181 of the cassette 110A would store the information that the cassette 110A spans two bays 114. If the cassette identifier 184 of the cassette 110A were mounted at the left side of the cassette 110A in FIG. 1, then the cassette identifier 184 would engage the cassette sensor 156 of the left-most bay 114. Further, the cassette sensor 156 of the left-most bay 114 would read (or allow to be read) the number of bays the cassette spans from the electronic memory 181 of the cassette 110A via the cassette identifier 184. From this information, it could be determined (e.g., by the communications unit 122 and/or the remote server(s) 128) that the cassette 110A spans the left-most bay 114 and the adjacent bay 114. Accordingly, the occupancy of both bays 114 would be known.

In certain implementations, fewer than each of the bays 114 has a corresponding cassette sensor 156. For example, if all cassettes 110 have the cassette identifier 184 disposed at a right side of the cassette 110 and if all cassettes 110 span at least two bays 114, then the left-most bay 114 would never align with the cassette identifier 184 of a cassette 110. Accordingly, the cassette sensor 156 could be omitted from the left-most bay 114 in such an implementation. Similarly, if the cassette identifier 184 were always disposed at the left side of the cassette 110, then the cassette sensor 156 could be omitted from the right-most bay 114.

In certain implementations, cassette sensors 156 are disposed in at least one set of adjacent bays 114 even when all cassettes 110 span at least two bays 114. While cassettes 110 span at least two bays 114, some cassettes 110 may span more than two bays 114 (e.g., three bays, four bays, six bays, etc.). Disposing cassette sensors 156 in adjacent bays provides flexibility for mounting cassettes 110 of various sizes to a common tray arrangement 100. For example, referring back to FIG. 1, a second cassette 110B mounted adjacent the first cassette 110A spans two bays 114. Because the first cassette 110A spans the first two bays 114 from the left side of the tray arrangement 100, the second cassette 110B spans the third and fourth bays 114 from the left side of the tray arrangement 100. If the cassette identifiers 184 of the cassettes 110 are disposed at left sides of the cassettes 110, then the cassette identifier 184 of the second cassette 110A engages or otherwise interacts with the cassette sensor 156 in the third bay 114 from the left side of the tray arrangement 100. However, if the first cassette 110A had spanned three bays instead of two bays (i.e., had spanned the first three bays from the left side of the tray arrangement), then the second cassette 110B would have occupied the fourth and fifth bays 114. In such a case, the cassette identifier 184 of the second cassette 110B would have engaged or otherwise interacted with the cassette sensor 156 of the fourth bay 114. Accordingly, disposing cassette sensors 156 in adjacent bays 114 (e.g., in both the third bay and the fourth bay) enables sensing and determining cassette positions even when the sizes of the cassettes 110 can vary.

In certain implementations, the communications unit 122 and/or the remote server 128 use the information obtained from the cassette identifier 184 to determine which plug sensors 155 of the port occupancy sensor arrangement to read. The cassette identifier 184 includes information on the number and type of the port members carried by the cassette 110. From this information, the position of the port members 116 can be determined. The communications unit 122 and/or the remote server 128 may then ignore information obtained by plug sensors 155 not properly aligned with the port members 116. For example, a cassette 110 carrying MPO type port members 116 in the front will not activate (i.e., ignore) half of the forward plug sensors 155 within the respective bay(s) 114 because those plug sensors 155 would align with and hence only be used with LC type port members 116. Similarly, rear port members 116 may be present or not present on the cassette 110. The physical layer information read from the cassette identifier 184 informs the communications unit 122 and/or the remote server 128 whether to read or ignore signals from the rear plug sensors 155.

Referring back to FIG. 2, in certain implementations, the first portion 132 of the port occupancy sensor arrangement includes one or more plug sensors 155 disposed in each of the bays 114. In certain examples, each plug sensor 155 is positioned to align with a respective port carried by a cassette 110 when the cassette 110 is mounted to the tray arrangement 100. Each cassette 110 carries one or more actuators 186 forming the second portion 182 of the port occupancy sensor arrangement. Each actuator 186 is positioned to align with a respective plug sensor 155 when the cassette 110 is mounted to the tray arrangement 100. Each actuator 186 is configured to not automatically engage or otherwise interface with the respective plug sensor 155 when the cassette 110 is mounted to the tray arrangement 100. Rather, each actuator 186 is configured to engage or otherwise interface with the respective plug sensor 155 when a plug connector is received at the corresponding port. In certain implementations, the actuators 186 are passive components and the cassette 110 does not carry any active components of the port occupancy sensor arrangement.

In certain implementations, the first portion 132 of the port occupancy sensor arrangement includes a sufficient number of plug sensors 155 in each bay 114 to accommodate the smallest port type carried by a cassette 110. For example, each bay 114 may carry sufficient plug sensors 155 to sense occupancy for each of a plurality of LC ports. However, as noted above, different types of cassettes may carry different numbers and types of ports. Accordingly, in such implementations, multiple plug sensors 155 may align with one port of the cassette 110. In some such implementations, each actuator 186 may be configured to engage or otherwise interface with each plug sensor 155 aligned with the respective port. In other implementations, the cassette 110 may carry multiple actuators 186 for each port carried by the cassette 110. In still other implementations, the electronic memory 181 of the cassette 110 stores the type (and hence size) of the ports. In such implementations, the communications unit 122 and/or remote server 128 may use the stored information to determine port occupancy even if fewer than all plug sensors 155 across a port are actuated. In other implementations, a plug sensor 155 is provided for each larger-sized port (e.g., MPO ports) with the understanding that smaller sized ports (e.g., LC ports) function as duplex ports that span the distance of the larger-sized ports.

In some implementations, each cassette 110 carries a respective actuator 186 for each port carried by the cassette 110. In other implementations, each cassette 110 carries a respective actuator 186 for each externally-facing port carried by the cassette 110. For example, the cassette 110 may carry an actuator 186 for each front port of the front port members 116A, 116B. In some examples, the cassette 110 carries an actuator for each of the front ports 116. In other examples, the cassette 110 carries an actuator 186 for half of the front ports (e.g., for each duplex front port). In some examples, the cassette 110 carries an actuator 186 for each rear port of each rear port member 116C of the cassette 110. In other examples, the cassette 110 carries an actuator 186 for the rear ports of the front port members 116A, 116B. In still other examples, the cassette 110 also carries an actuator 186 for the internally-facing ports (e.g., rear ports of the front port members and front ports of the rear port members). In the example shown in FIG. 2, the cassette 110 carries actuators 186 for the front ports of first port members 116, for the rear ports of the front port members 116, and for the rear ports of the rear port member 116C.

FIG. 3 shows an example panel system 270 including two representative chassis 120 mounted to a rack R. In other examples, a greater or lesser number of chassis 120 may be mounted to the rack R and the panel system 270 may include a greater number of racks. In the example shown, each chassis 120 receives three tray arrangements 100A, 100B, 100C. In other examples, a chassis 120 may receive a greater or lesser number of tray arrangements 100 (e.g., one, two, four, five, six, eight, twelve, etc.). Each tray arrangement 100 carries at least one first portion 130 of a cassette sensor arrangement to detect and/or a cassette on the tray arrangement 100 and at least one first portion 132 of a port occupancy sensor arrangement to detect port occupancy on the tray arrangement 100. In certain examples, the first portion 130 also reads information (e.g., physical layer information) from any cassette mounted at the respective port.

Each tray arrangement 100 also carries a tray connector 123 (e.g., a PCBA-to-cable connector) that receives the signals from the cassette occupancy sensor arrangement and the port occupancy sensor arrangement of the tray arrangement 100. In certain examples, the tray connector 123 is configured to provide an interface between a circuit board 142 and a cable. The tray connector 123 is connected to the cassette occupancy sensor arrangement and the port occupancy sensor arrangement by tracings on the circuit board 142 of the tray arrangement 100. In certain examples, the tray connector 123 is mounted at the rear 104 of the tray arrangement 100.

In certain implementations, each chassis 120 includes a respective communications unit 122 that receives (e.g., via cable 124) and optionally aggregates the data signals from the connector 123. In certain examples, the communications unit 122 services all of the tray arrangements 100 (i.e., the cassette sensor arrangements and port occupancy sensor arrangements of the tray arrangements 100) within the chassis 120. In other examples, a communications unit 122 may service tray arrangements 100 from multiple chassis 120. In still other examples, multiple communications units 122 may services the tray arrangements 100 of one chassis 120. Each communications unit 122 communicates with the remote server 128 via a connection 126 (e.g., a cabled connection, a wireless connection, etc.).

The remote server(s) 128 includes a processor 125 and memory (e.g., non-volatile memory) 135. In memory 135, the remote server 128 stores cassette data 134 and port occupancy data 136 so that the bay and port availability of each tray arrangement 100 can be determined at the remote location. In certain examples, the remote server 128 also may store instructions 138 in memory for indicating a bay or port at one of the tray arrangements 100 (e.g., using an LED or other indicator) as will be described in more detail herein. The memory 135 also may store instructions for determining which bays are occupied based on information read from the electronic memory 181 of each cassette 110. In certain implementations, the remote server 128 can be implemented on a standalone compute server. In certain implementations, the remote server 128 can be implemented in a rack-level management device in an Automated Infrastructure Management (AIM) system.

Figure 4:
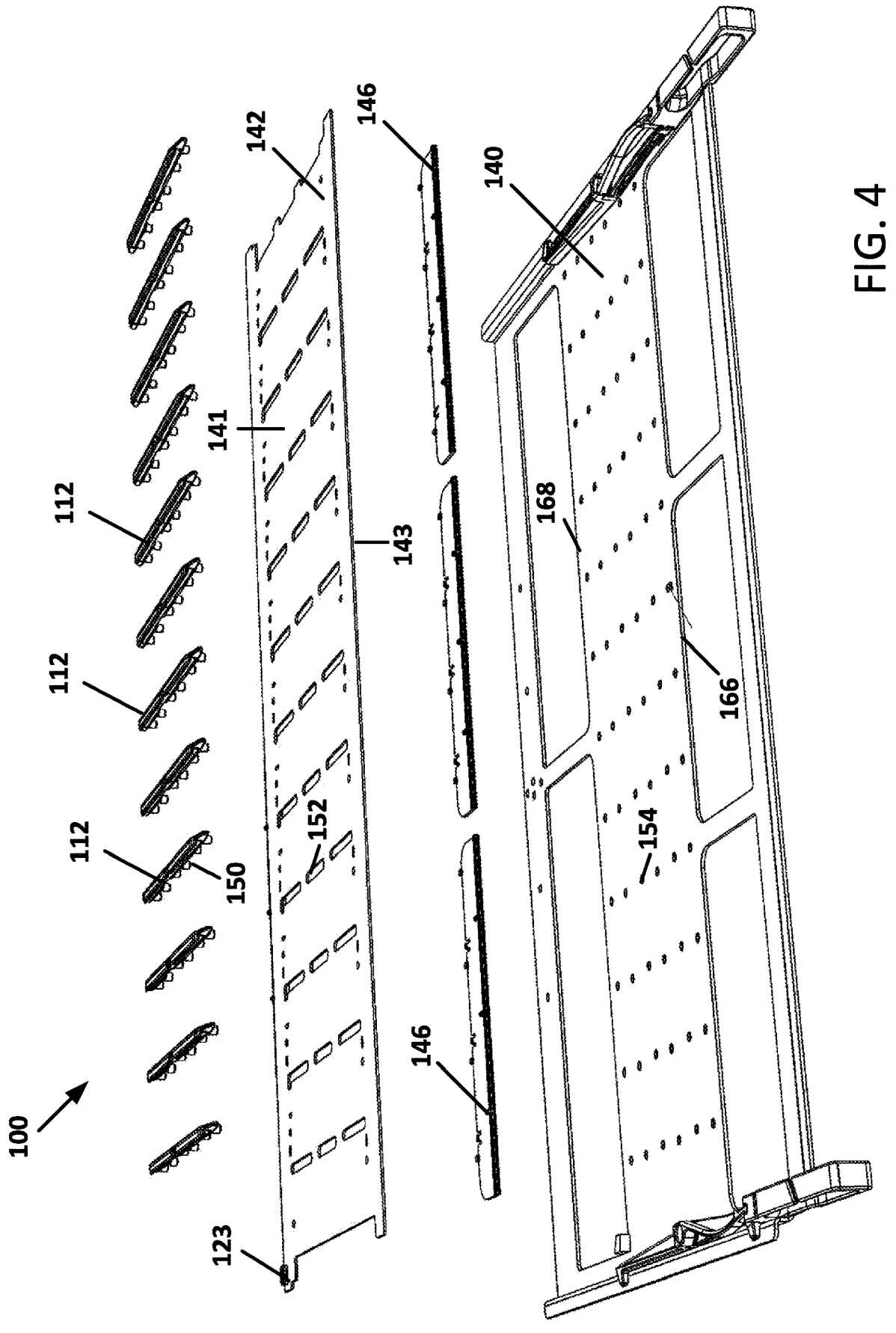
FIG. 4 is a perspective view of the tray arrangement of FIG. 1 showing a circuit board exploded away from a tray base, front bezels exploded away from the circuit board, and cassette guides also exploded away from the circuit board.

FIG. 4 is a perspective view of the tray arrangement 100 showing the components exploded away from each other for ease in viewing. The tray arrangement 100 includes a tray base 140 and a circuit board (e.g., a PCBA) 142 mounted thereon. The circuit board 142 has a first major side 141 facing away from the tray base 140 and a second major side 143 facing towards the tray base 140. In certain implementations, the circuit board 142 mounts to the tray base 140 using the cassette guides 112. For example, stakes 150 of the guides 112 may extend through holes or slots 152 in the circuit board 142 and through holes or slots 154 in the tray base 140. The stakes 150 may be heated or otherwise deformed at the bottom of tray base 140 to secure the stakes 150 to the tray base 140. In other implementations, the stakes 150 may be latched or otherwise fastened to the tray base 140 or circuit board 142. In still other implementations, the circuit board 142 may be otherwise coupled to the tray base 140. In certain implementations, bezels (e.g., front bezels and/or rear bezels) 146 may be mounted to the tray arrangement 100 to protect components on the circuit board 142 as will be described in more detail herein.

Figure 5:
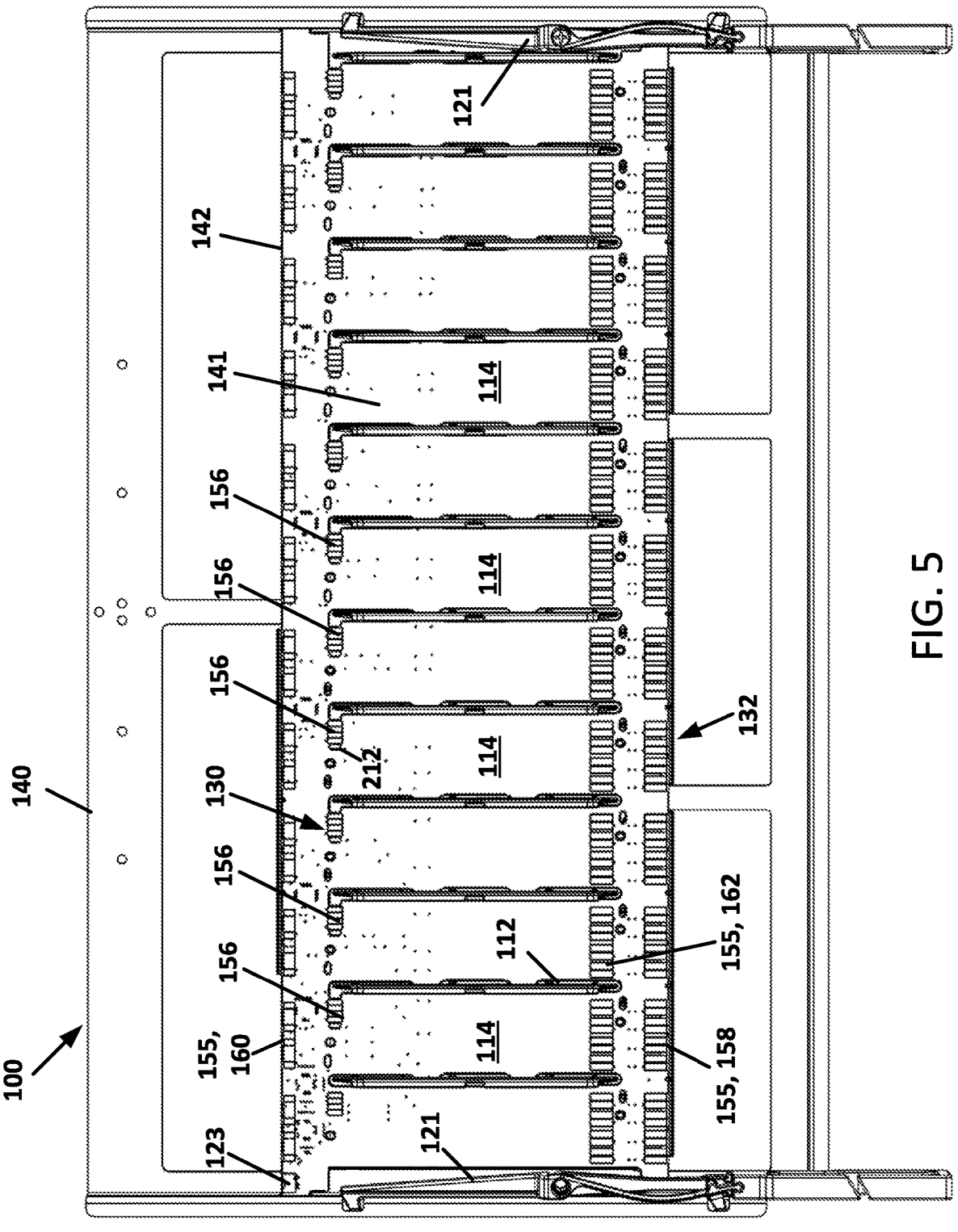
FIG. 5 is a top plan view of the tray arrangement of FIG. 4.

FIG. 5 is a top plan view of the tray arrangement 100 with no cassettes 110 mounted for ease in viewing the circuit board 142. The cassette sensors 156 and the plug sensors 155 are visible on the first major side 141 of the circuit board 142. A respective cassette sensor 156 is disposed in at least some of the bays 114. In certain examples, each bay 114 has a corresponding cassette sensor 156. In other examples, all but one bay 114 has a corresponding cassette sensor 156. For example, the cassette sensor 156 may be omitted from one of the bays 114 at the end of the row of bays 114 as described above.

Figure 6:
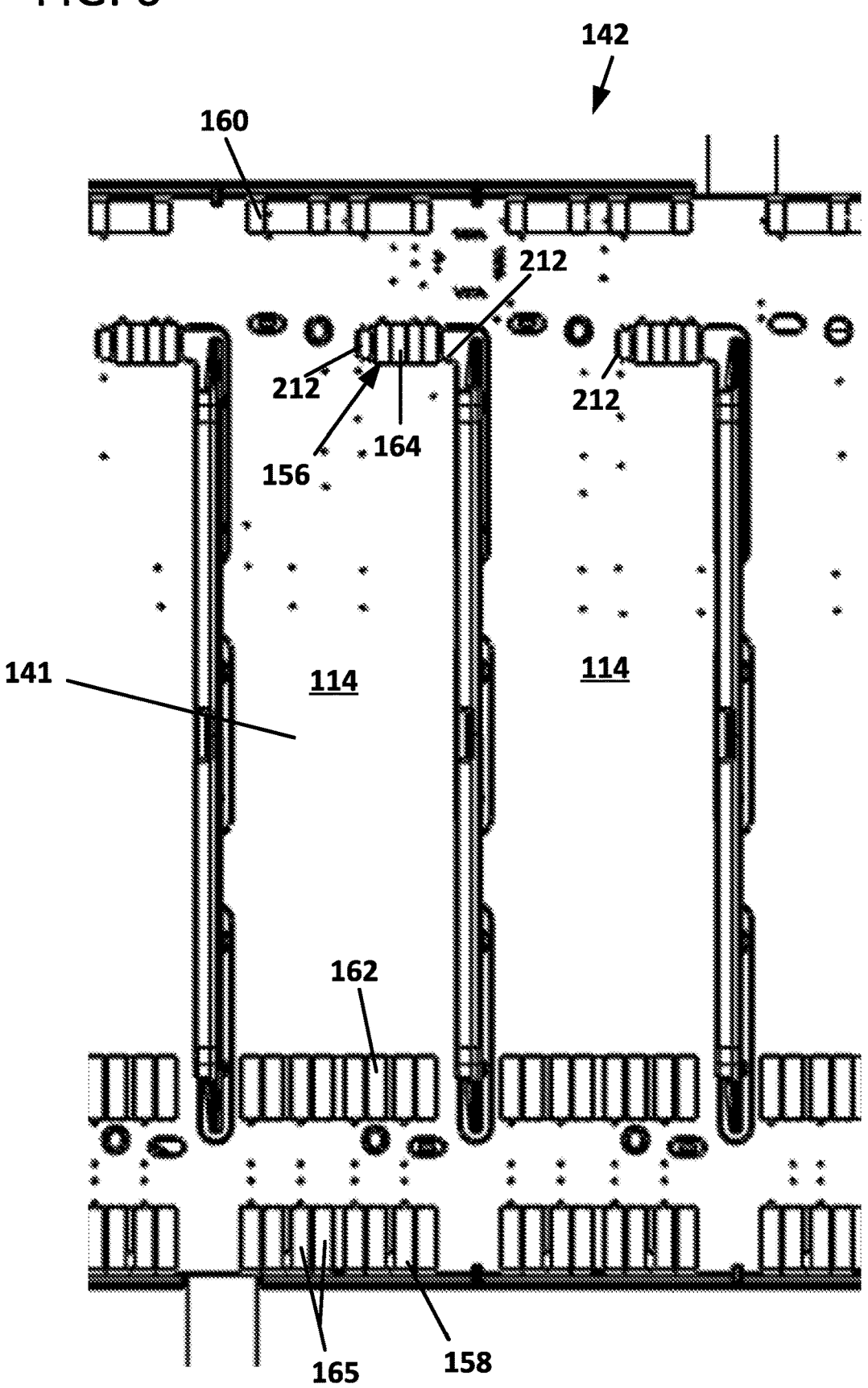
FIG. 6 is an enlarged portion of FIG. 5.

In certain implementations, each cassette sensor 156 includes a plurality of contact pads 164 accessible from the first major surface 141 of the circuit board 142 (e.g., see FIG. 6). In some implementations, the contact pads 164 are etched into the first major surface 141. In other implementations, the contact pads 164 can be welded or otherwise mounted over the first major surface 141. In the example shown, each cassette sensor 156 includes four contact pads 164. In other examples, each cassette sensor 156 may include a greater or lesser number of contact pads 164. In still other examples, each cassette sensor 156 may have other structure (e.g., an RFID reader).

The first portion 132 of the port occupancy sensor arrangement includes two or more plug sensors 155 disposed in at least some of the bays 114. In certain implementations, each bay 114 has a corresponding set of two or more plug sensors 155. In some examples, the plug sensors 155 include first plug sensors 158 disposed at the front of the board 142 to align with the front ports of the front port members 116A, 116B of a cassette 110 mounted at the corresponding bay 114. In the example shown, each bay 114 has four respective first plug sensors 158. In other examples, however, each bay 114 may have a greater or lesser number (e.g., one, two, three, five, six, eight, etc.) of first plug sensors 158.

In certain examples, the plug sensors 155 also may include second plug sensors 160 disposed at the rear of the board 142 to align with rear ports of the rear port member(s) 116C carried by a cassette 110 mounted at the corresponding bay 114. In the example shown, each bay 114 has two corresponding second plug sensors 160. In other examples, however, each bay 114 may have a greater or lesser number (e.g., one, three, four, etc.) of second plug sensors 160. In certain examples, the plug sensors also may include a third plug sensors 162 disposed towards the front of the board 142 to align with the rear ports of the front port members 116A, 116B carried by any cassette 110 mounted at the corresponding bay 114. In certain examples, each bay 114 has a common number of first and third plug sensors 158, 162. In certain implementations, each plug sensor 158, 160, 162 includes a pair of contact pads 165 as will be discussed in more detail herein.

Referring back to FIG. 4, each tray base 140 defines a plurality of apertures 166 at the front 102 and a plurality of apertures 168 at the rear 104. In certain examples, the front and rear apertures 166, 168 provide finger access for the front and rear ports of the cassettes 110 mounted to the tray arrangement 100. In certain implementations, the front and/or rear apertures 166, 168 also may provide space to accommodate one or more electronic components on the circuit board 142. For example, the circuit board 142 may overhang the front and/or rear apertures 166, 168 so that circuit board components extend downwardly from the second major surface 143 of the circuit board 142 and into the apertures 166, 168.

In certain examples, all electronic components (e.g., the integrated circuits that convert the signals from the contact pads 165 into digital signals) mounted to the second major surface 143 of the circuit board 142 are positioned to overhang the apertures 166, 168. Accordingly, the second surface 143 of the circuit board 142 may be mounted directly to the tray base 140. Such an arrangement allows for a reduced vertical profile of the tray arrangement 100 (compared to mounting the electronic components elsewhere on the board 142). In certain examples, all electronic components mounted to the circuit board 142, are disposed at the second major surface 143 and positioned to overhang the apertures 166, 168. By mounting the electronic components to the second major surface 143, the electronic components don't interfere with mounting of the cassettes 110 within the bays 114.

In certain implementations, the only circuit board components mounted to the first major surface 141 are the contact pads 165 that are etched into the circuit board 142 so that the contact pads 165 are about flush with the first major surface 141 of the board 142. In certain examples, the circuit board 142, the circuit board components, and the tray base 140 have combined thickness T (see FIG. 2) of no more than 5 mm. In certain examples, the circuit board 142, the circuit board components, and the tray base 140 have combined thickness T of no more than 4 mm. In certain examples, the circuit board 142, the circuit board components, and the tray base 140 have combined thickness T of no more than 3 mm. In certain examples, the circuit board 142, the circuit board components, and the tray base 140 have combined thickness T of no more than 2.5 mm. In certain examples, the circuit board 142, the circuit board components, and the tray base 140 have combined thickness T of no more than 2 mm.

One or more bezels 146 may be mounted over the circuit board surface and electronics components on the circuit board 142 to protect such components. In some examples, a respective front bezel 146A may be mounted within each front aperture 166 and a respective rear bezel 146B may be mounted within each rear aperture 168. In some examples, each tray base 140 defines a common number of front and rear apertures 166, 168 (e.g., see FIG. 7). In such examples, the tray arrangement 100 has a common number of front and rear bezels 146A, 146B. In other examples, the tray arrangement 100 may have a different number of front and rear bezels 146A, 146B. In other examples, however, the tray base 140 may define a different number of front and rear apertures 166, 168 (e.g., see FIGS. 1 and 4).

Figure 7:
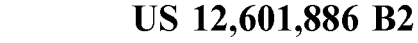
FIG. 7 is a perspective view of another example tray arrangement and cassettes configured in accordance with the principles of the present disclosure.
Figure 8:
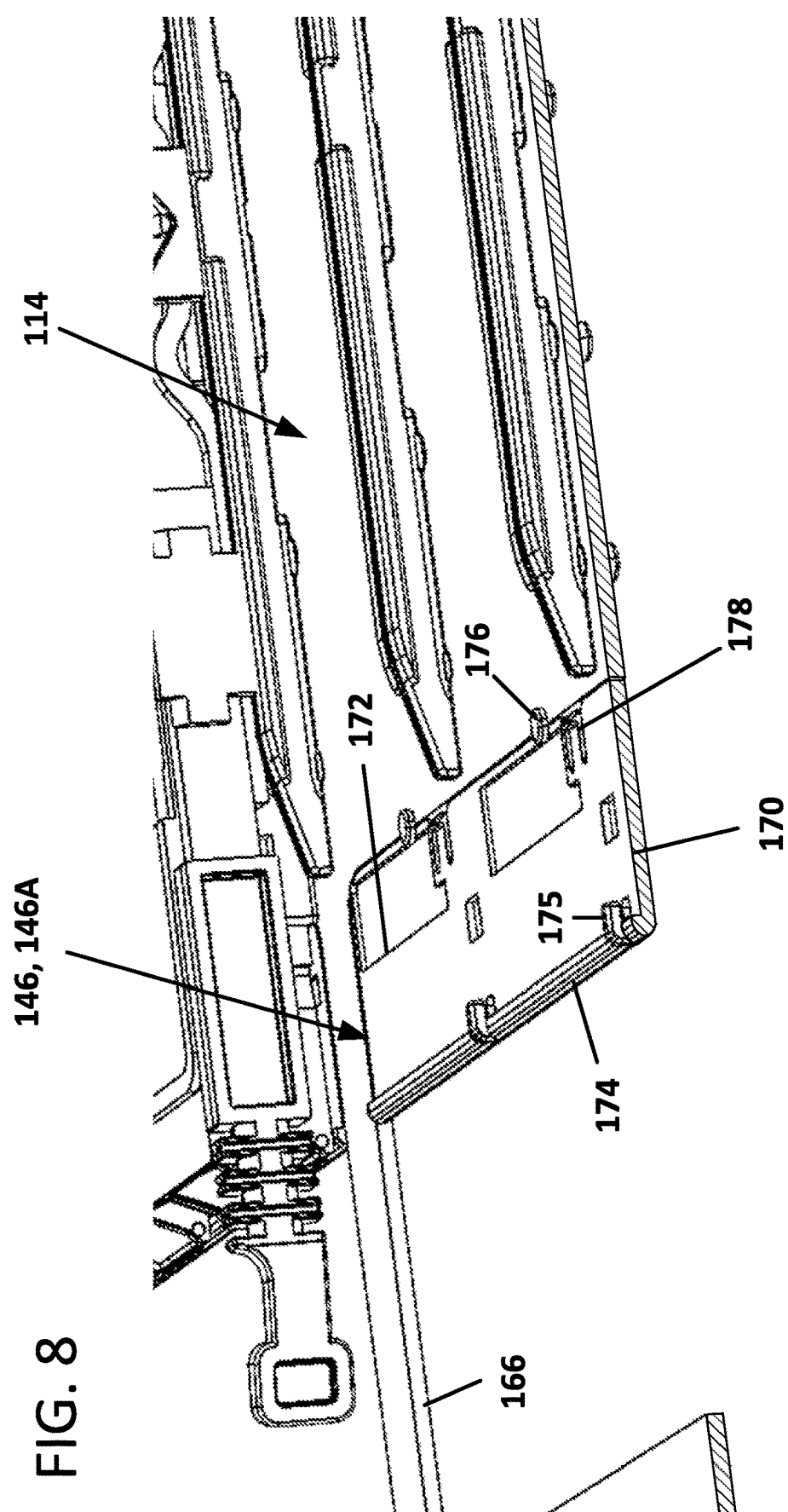
FIG. 8 is an enlarged view of a portion of the tray arrangement of FIG. 7 with the circuit board removed for ease in viewing a front bezel of the tray arrangement.
Figure 9:
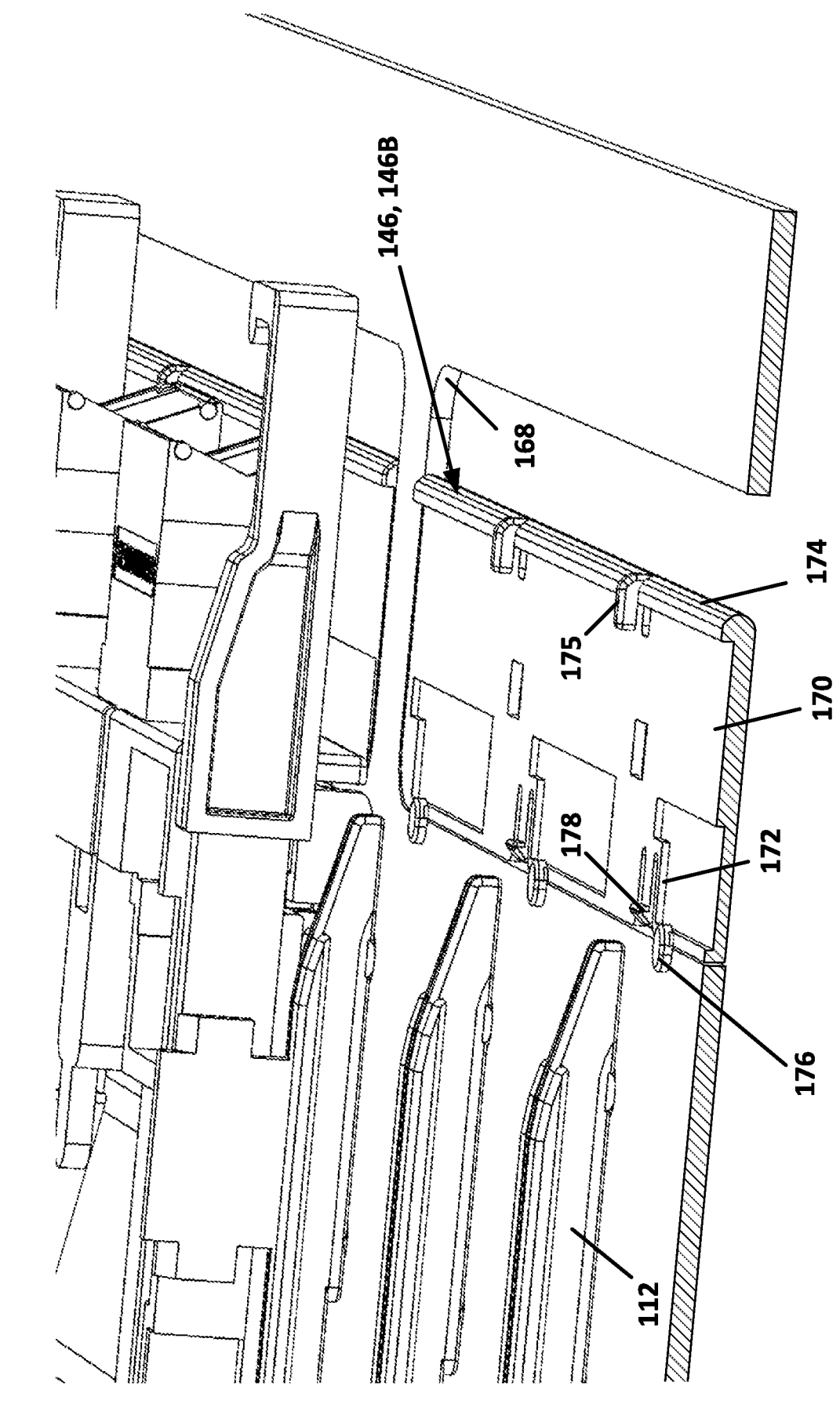
FIG. 9 is an enlarged view of another portion of the tray arrangement of FIG. 7 with the circuit board removed for ease in viewing a rear bezel of the tray arrangement.

FIGS. 7-9 show the tray base 140 and bezels 146 without the circuit board 142 for ease in viewing. Each bezel 146 includes a body 170 defining one or more through-openings or recesses 172 through which the circuit board components may extend (e.g., see FIGS. 8 and 67). The bezel body 170 is configured to mount to the circuit board 142. The bezel body 170 includes a wrap-around end 174 that extends across the front or rear of the circuit board 142. The wrap-around end 174 includes one or more flanges 175 that extend over a top of the circuit board 142 to hold the end of the bezel body 170 to the circuit board 142. The bezel body 170 also includes one or more outwardly extending tabs 176 configured to seat on top of the tray base 140 at an opposite side of the bezel body 170 from the flanges 175. The flanges 175 and tabs 176 vertically support the bezel body 170 relative to the circuit board 142. The bezel body 170 also includes one or more latch fingers 178 that snap into the circuit board 142 to inhibit axial movement of the bezel body 170 relative to the circuit board 142 along the depth D of the tray arrangement 100.

Figure 10:
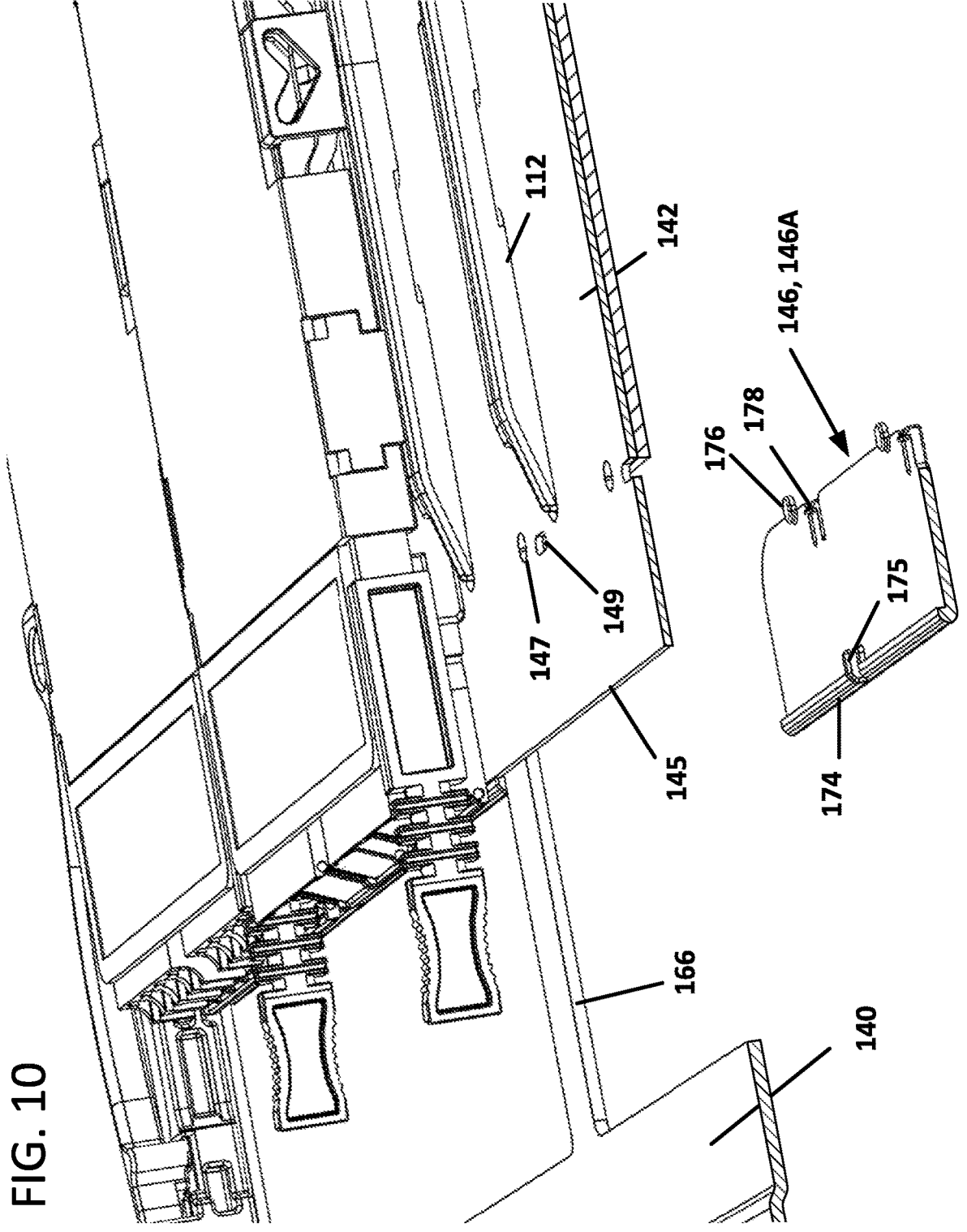
FIG. 10 shows an example front bezel exploded away from a tray base and circuit board.

FIG. 10 shows a portion of a bezel 146 exploded away from a portion of a tray arrangement 100. In FIG. 10, the circuit board 142 is shown overhanging the front aperture 166 of the tray base 140. A bezel 146 mounts within the front aperture 166 beneath the circuit board 142. In certain examples, the bezel 146 mounts flush with a bottom surface of the tray base 140. In certain examples, the bezel 146 is coplanar with the tray base 140 when mounted. The wrap-around end 174 of the bezel 146 extends over an edge 145 of the circuit board 142. The flanges 175 of the bezel 146 extend over the top of the circuit board 142. The tabs 176 of the bezel 146 mount within holes 147 defined in the circuit board 142 (e.g., see FIG. 11). The latch fingers 178 of the bezel 146 snap into openings 149 defined in the circuit board 142. A front bezel 146A is shown in FIG. 10. It will be understood, however, that the above description also applies to a rear bezel 146B. The portion of the bezel 146 in FIG. 10 is shown devoid of openings 172. In other examples, however, the bezel 146 may define one or more openings 172 to accommodate circuit board components.

In certain implementations, one type of the circuit board component protected by the bezels 146 include light indicators (e.g., LED indicators) mounted to the circuit board 142. In certain examples, the light indicators include right angled LEDs. In some examples, the light indicators can be used to indicate a particular port (e.g., a port at which a connection should be added or removed). In other examples, the light indicators can be used to indicate a particular cassette 110 (e.g., a cassette that should be removed from the tray arrangement 100) or a particular bay 114 or set of bays 114 (e.g., a bay 114 at which a cassette 110 should be mounted).

Figure 11:
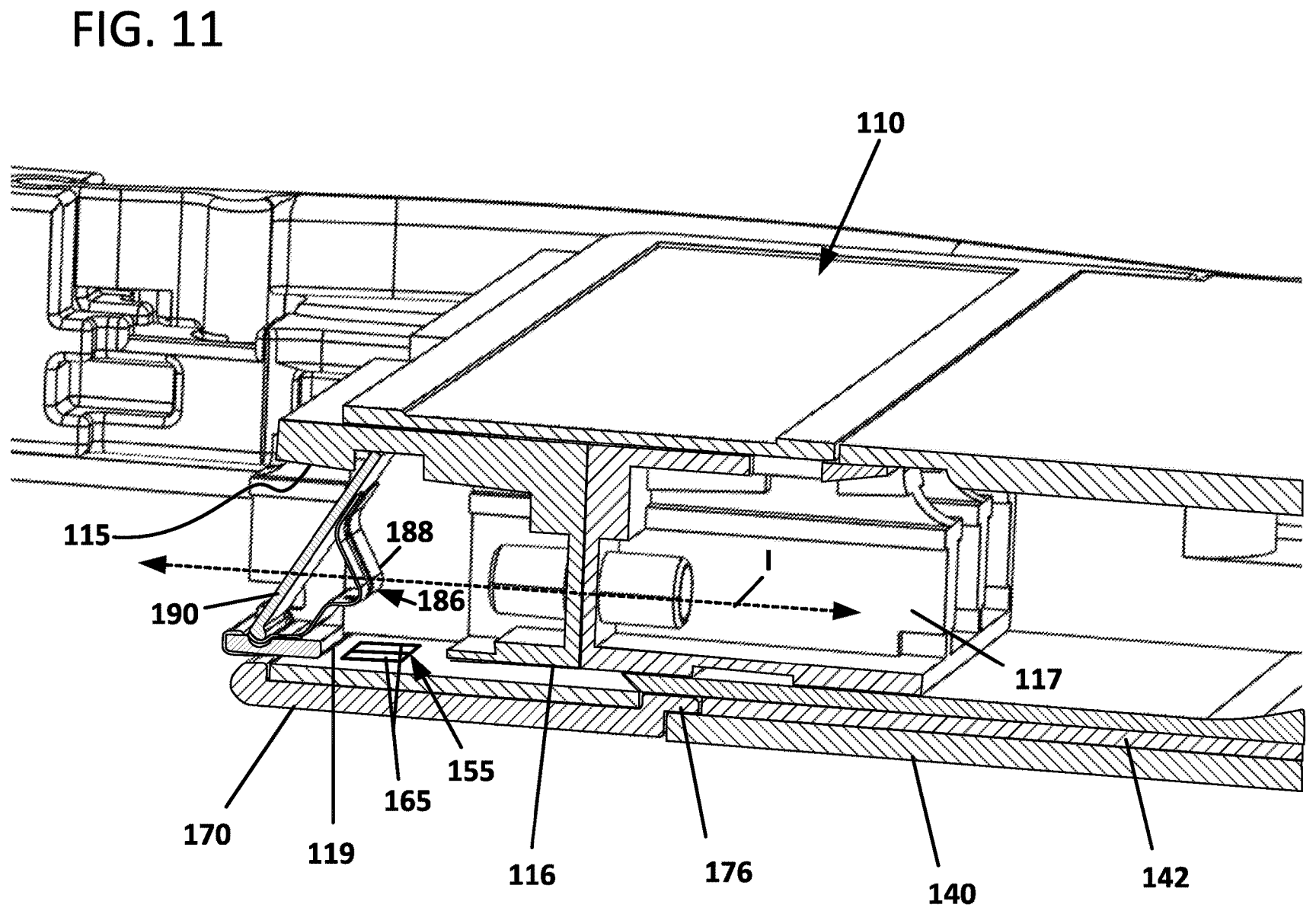
Figure 12:
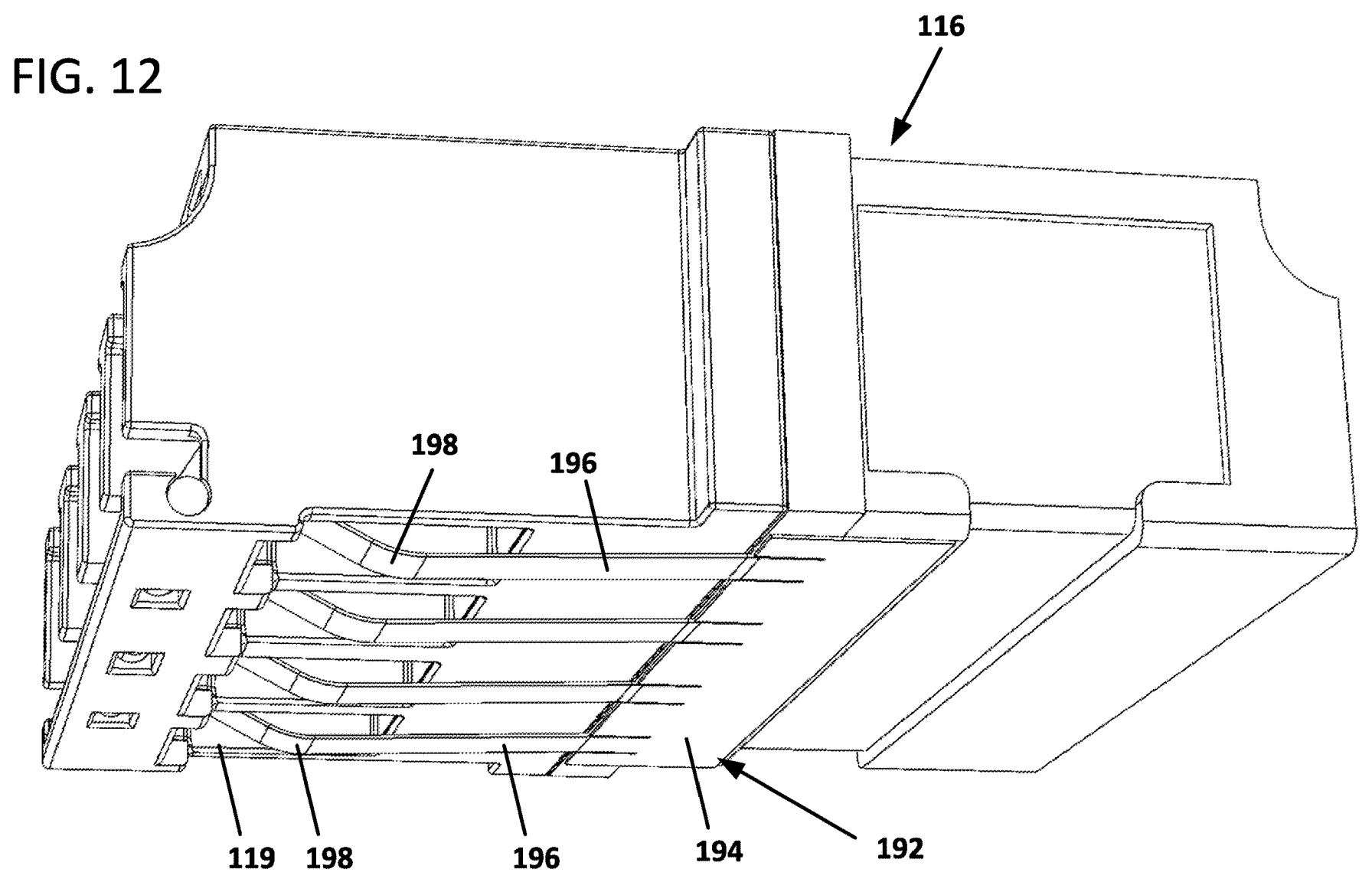
Figure 13:
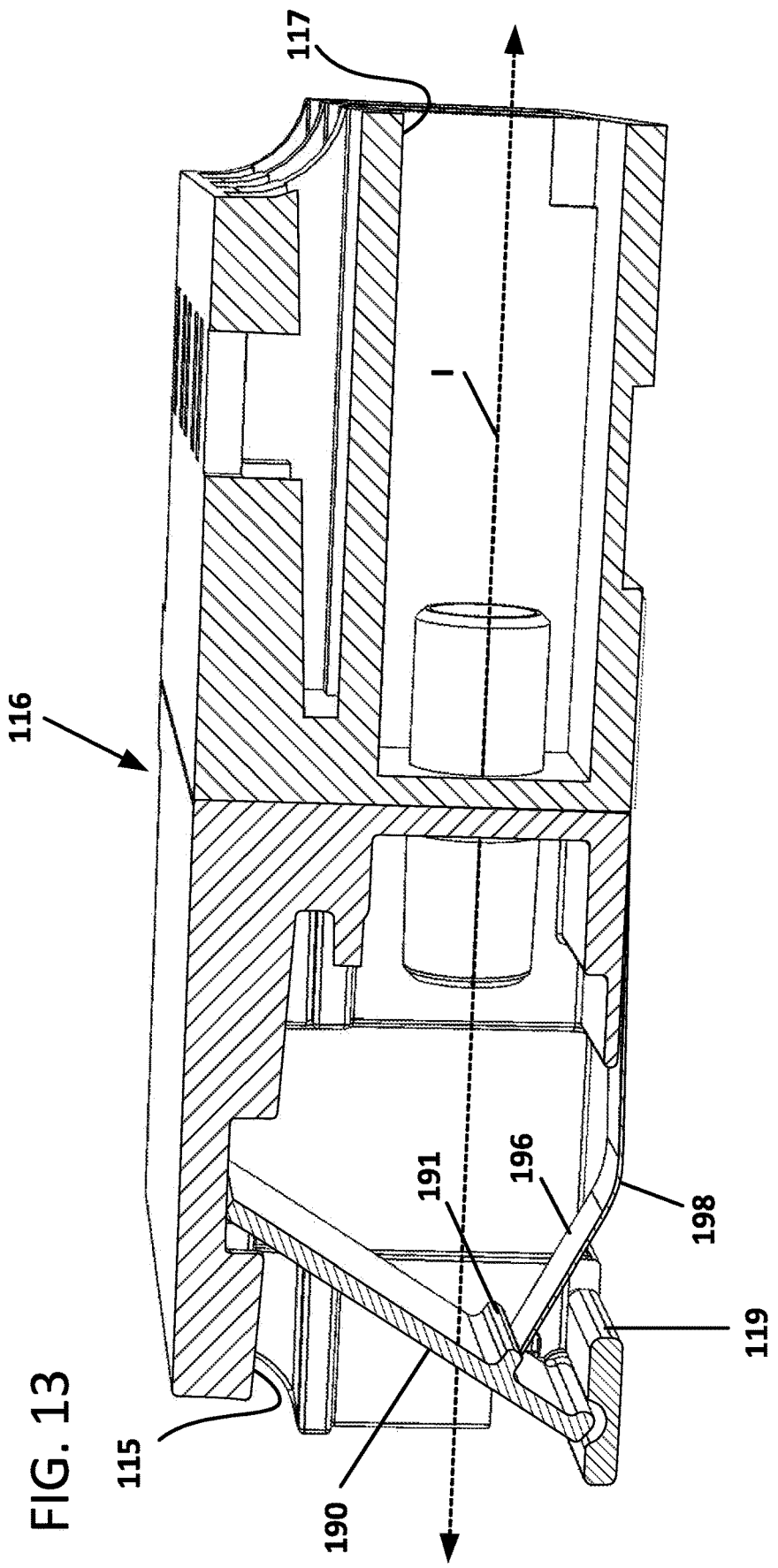
FIG. 13 is a perspective view of an axial cross-section taken of the port member of FIG. 12 so that the spring contact arrangement and shutter are visible.

FIGS. 11-13 illustrate example implementations for a port occupancy sensor arrangement including an example plug sensor 155 and an example actuator 186. The plug sensor 155 includes a pair of contact pads 165. The example actuator 186 includes a spring contact 188 mounted to a shutter 190 carried by the port member 116. The shutter 190 is configured to move between a blocking position covering the front port 115 of the port member 116 and an open position allowing access to the front port 115 of the port member 116. The shutter 190 is biased to the blocking position. When a plug connector is inserted into the front port 115, the plug connector pushes the shutter 190 to the open position to enable the plug connector to enter the port 115. Moving the shutter 190 to the open position moves the spring contact 188 towards an aperture 119 in the port member 116 providing access to the plug sensor 155. When the shutter 190 is disposed in the open position, the spring contact 188 bridges the pair of contact pads 165. In certain examples, the contact pads are held at different voltages (e.g., a high voltage and ground). Bridging the contact pads 165 closes the circuit, which can be detected by an processor component on the circuit board 142, the communications unit 122, and/or the remote server 128 (via the communications unit 122). For example, one or more integrated circuits on the board 142 may convert the analog signal levels at the contact pads 165 to readable digital signals. The communications unit 122 may communicate with the integrated circuits on the board 142 (e.g., using I2C protocol) to obtain the readable digital signals and to pass those digital signals (with or without additional processing) to the remote server(s) 128.

In FIG. 11, the spring contact 188 extends over a majority of a height of the shutter. In some such examples, the spring contact 188 is split to enable light passing along the insertion axis I (e.g., from a plug connector received at the rear port 117 of the port member) to pass by the spring contact 188 to the shutter door 190. The shutter door 190 may be configured to glow or otherwise allow transmission of at least some of the light to indicate the port.

FIGS. 12 and 13 illustrate another type of spring contact 192 that mounts to the port member 116 to provide the actuator 186 for one or more plug sensors 155. As shown in FIG. 12, the spring contact 192 includes a base 194 that mounts to the port member 116. One or more legs 196 extends outwardly from the base 194 towards a respective aperture 119 in the port member 116. Each leg 196 extends through the respective aperture 119 towards a shutter 190 at the respective port (e.g., front port 115).

As shown in FIG. 13, each leg 196 abuts a rib 191 or other engagement structure (e.g., a groove) of the shutter 190 to bias the shutter 190 to the blocking position. When the shutter 190 moves towards the open position, the rib 191 presses the leg 196 back towards the aperture 119, thereby pressing a contact portion 198 against the plug sensor 155 to bridge the contact pads 165. In certain examples, the leg 196 attaches to the shutter 190 below the ferrule insertion axis so that light may reach the shutter without interference from the spring contact 192.

In certain implementations, the port member 116 protrudes forwardly from a body of the cassette 110 so that the port member 116 forms the bottom of the cassette 110 at the front-most part of the cassette 110. In certain examples, a rear port member 116C protrudes rearwardly from the body of the cassette 110 so that the rear port member 116C forms the bottom of the cassette 110 at the rear-most part of the cassette 110. In certain implementations, a bottom of the port member 116 is thicker towards the outside edge of the port (e.g., front port 115) than towards the middle of the port member 116. Accordingly, in such implementations, the port member body accommodates the spring contact 192 so that the spring contact 192 does not extend beyond the bottom of the port member 116 while the shutter 190 is disposed in the blocking position. In other implementations, the spring contact 192 extends beyond the bottom of the port member 116 even while the shutter 190 is disposed in the blocking position, but the spring contact leg 196 protrudes at a shallow angle. In either case, the spring contact 192 is configured to not interfere with the mounting of the cassette 110 at the tray arrangement 100.

Figure 14:
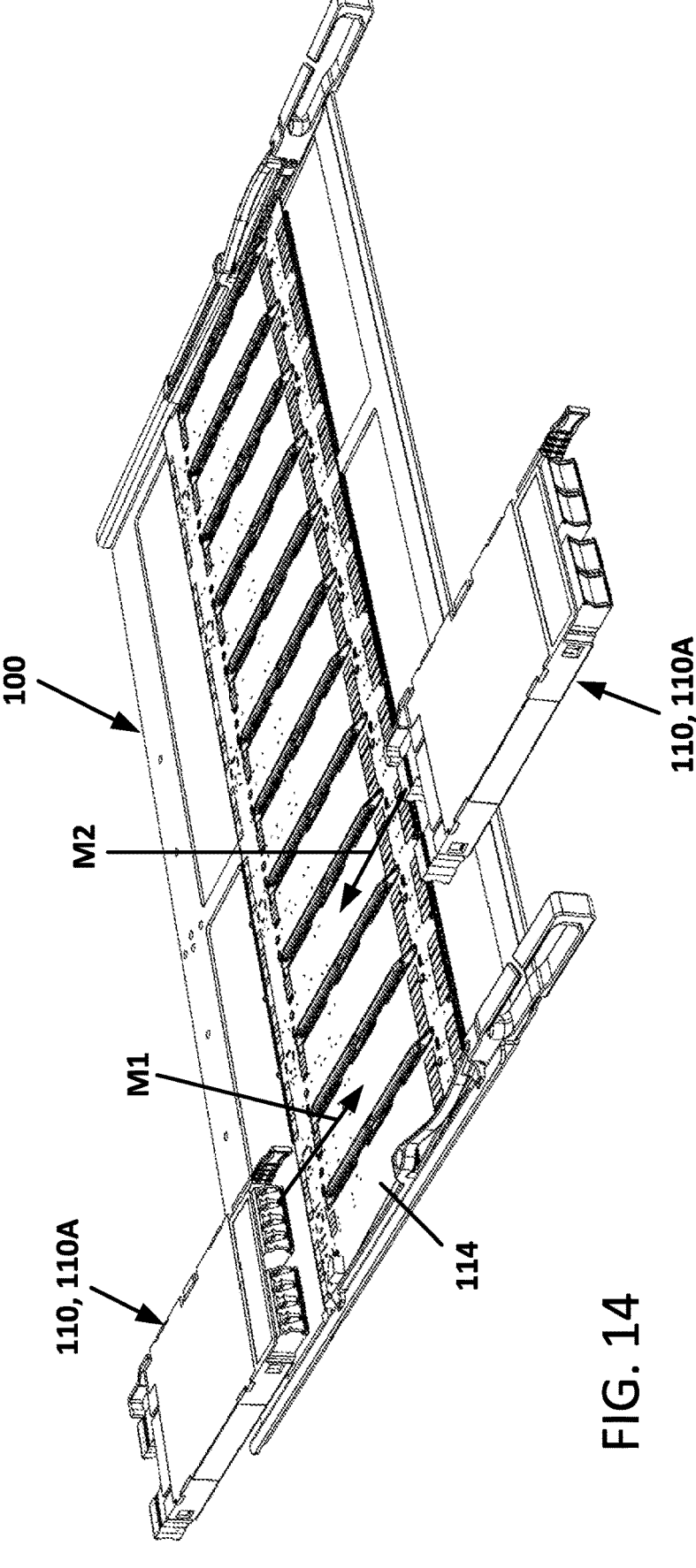
FIG. 14 is a perspective view of the tray arrangement of FIG. 1 showing a first cassette being mounted to the tray arrangement from a rear of the tray arrangement and a second cassette being mounted to the tray arrangement from a front of the tray arrangement.

As shown in FIG. 14, each cassette 110 can be mounted to the tray arrangement 100 by a sliding motion. In certain implementations, the cassette 110 can be slid onto the tray arrangement 100 along a first direction M1 from the rear 104 of the tray arrangement 100 or along a second direction M2 from the front 102 of the tray arrangement 100 at a discretion of a user. By recessing the spring contact 192 within the port member 116 while the shutter 190 is in the blocking position, the spring contact 192 is carried over the circuit board 142 and corresponding plug sensors 155 as the cassette 110 is slid into position over the tray arrangement 100. Alternatively, by protruding at a shallow angle, the spring contact leg 196 can be deflected or deformed upwardly through the aperture 119 and flattened against the bottom of the port member 116 as the cassette 110 is loaded on the tray arrangement 100 without damaging the spring contact 192.

Other examples of spring contacts suitable for use with shutters 190 to form actuators 186 for plug sensors 155 are shown and described in U.S. Application No. 63/159,827, filed Mar. 11, 2021, titled "Port Occupancy Sensing," the disclosure of which is hereby incorporated herein by reference in its entirety.

Figure 37:
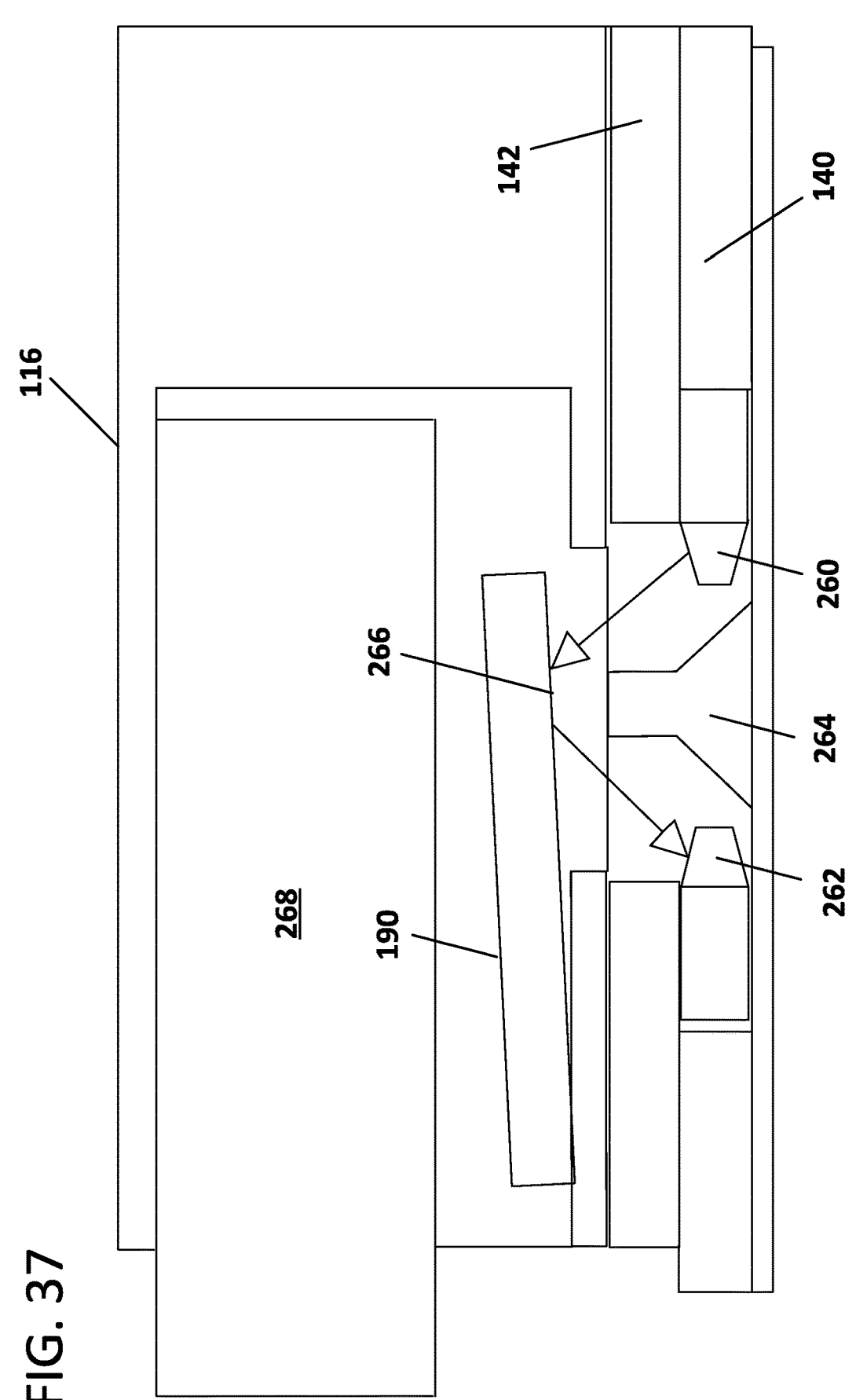
FIG. 37 is a schematic diagram of another example plug sensor and actuator forming part of another example port occupancy sensor arrangement of a tray arrangement and cassette.

In other implementations, the plug sensors 155 and actuators 186 may have other forms. For example, as shown in FIG. 37, the plug sensor 155 may include an emitter 260 (e.g., an infrared light emitter, a visible spectrum light emitter, etc.), a separate receiver 262, and blocking structure 264 therebetween. The actuator 186 may include a reflective surface 266 (i.e., a surface capable of reflecting the signals from the emitter) mounted to the shutters 190. When the shutter 190 is disposed in the blocking position, the blocker 264 stops the signals from the emitter 260 from reaching the receiver 262. When the shutter 190 is disposed in the open position, the reflective surface 266 bounces the signals from the emitter 260 to the receiver 262, thereby indicating the presence of a plug connector 268. In still other implementations, the receiver may receive signals from an emitter until the signals are blocked by the shutter in the open position. In still other implementations, plug sensors may include micro switches or other such structures.

Figure 15:
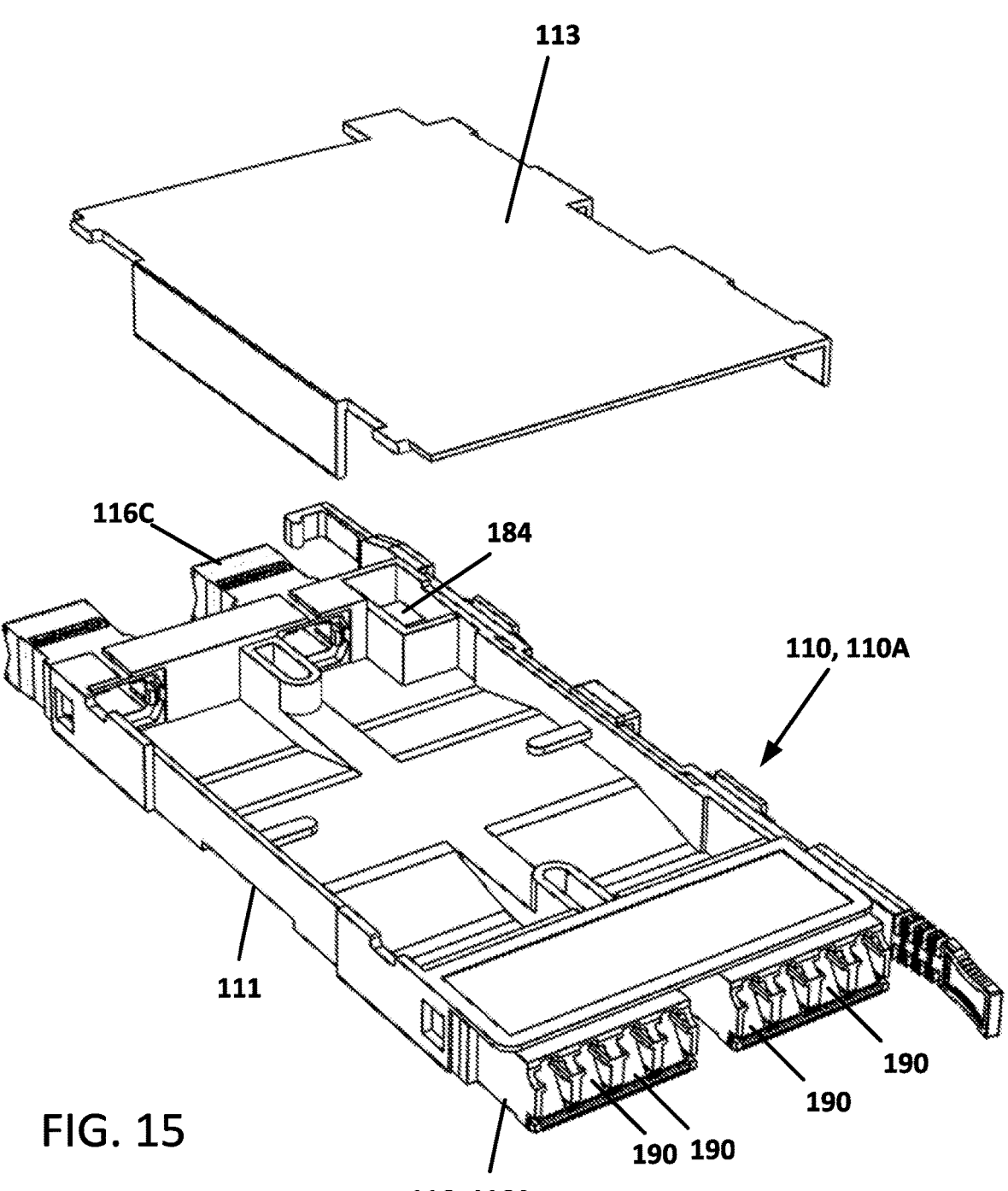
FIG. 15 is a perspective view of an example cassette with a cover exploded away from a cassette body for ease in viewing the interior.
Figure 16:
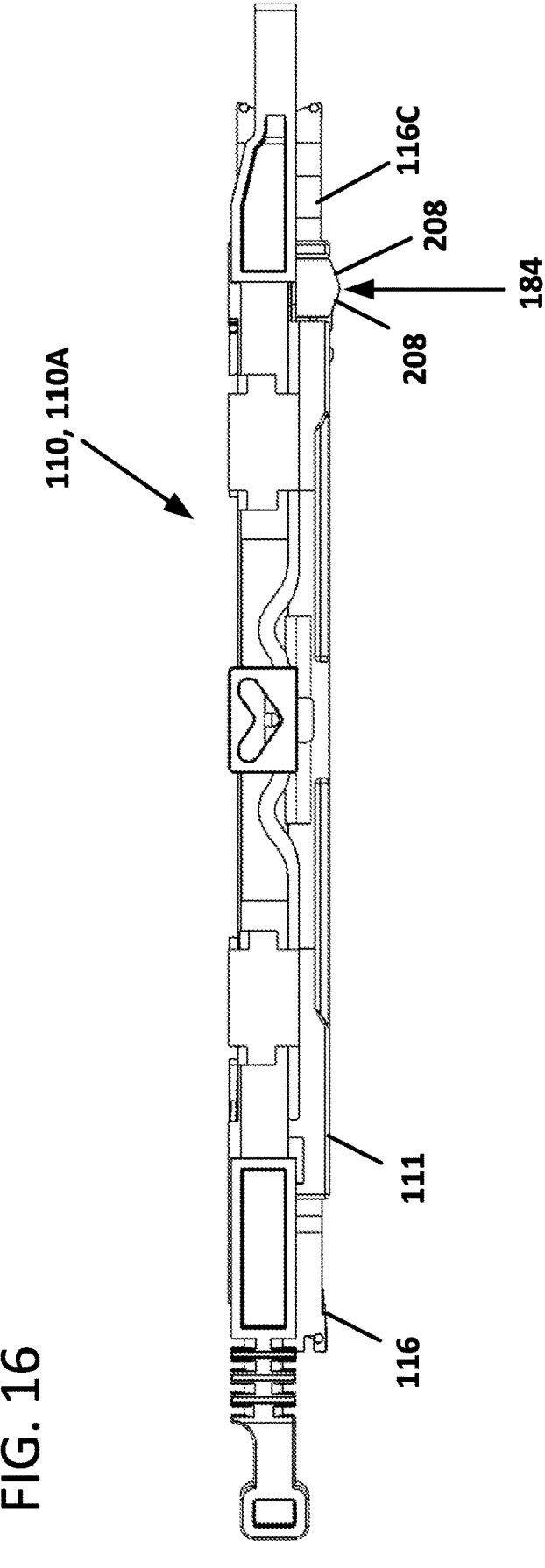
FIG. 16 is a side elevational view of the cassette of FIG. 15.

FIGS. 15 and 16 illustrates an example cassette 110 carrying an example cassette identifier 184 of the cassette sensor arrangement. In the example shown, the cassette identifier 184 is disposed at a rear corner of a body 111 of the cassette 110. A cover 113 of the cassette 110 is shown exploded from the body 111 in FIG. 15 for ease in viewing the position of the cassette identifier 184. In certain examples, the cassette identifier 184 protrudes beyond a bottom of the cassette 110 (e.g., see FIG. 16) to engage or otherwise interface with the cassette sensor 156 on the tray arrangement 100.

Figure 17:
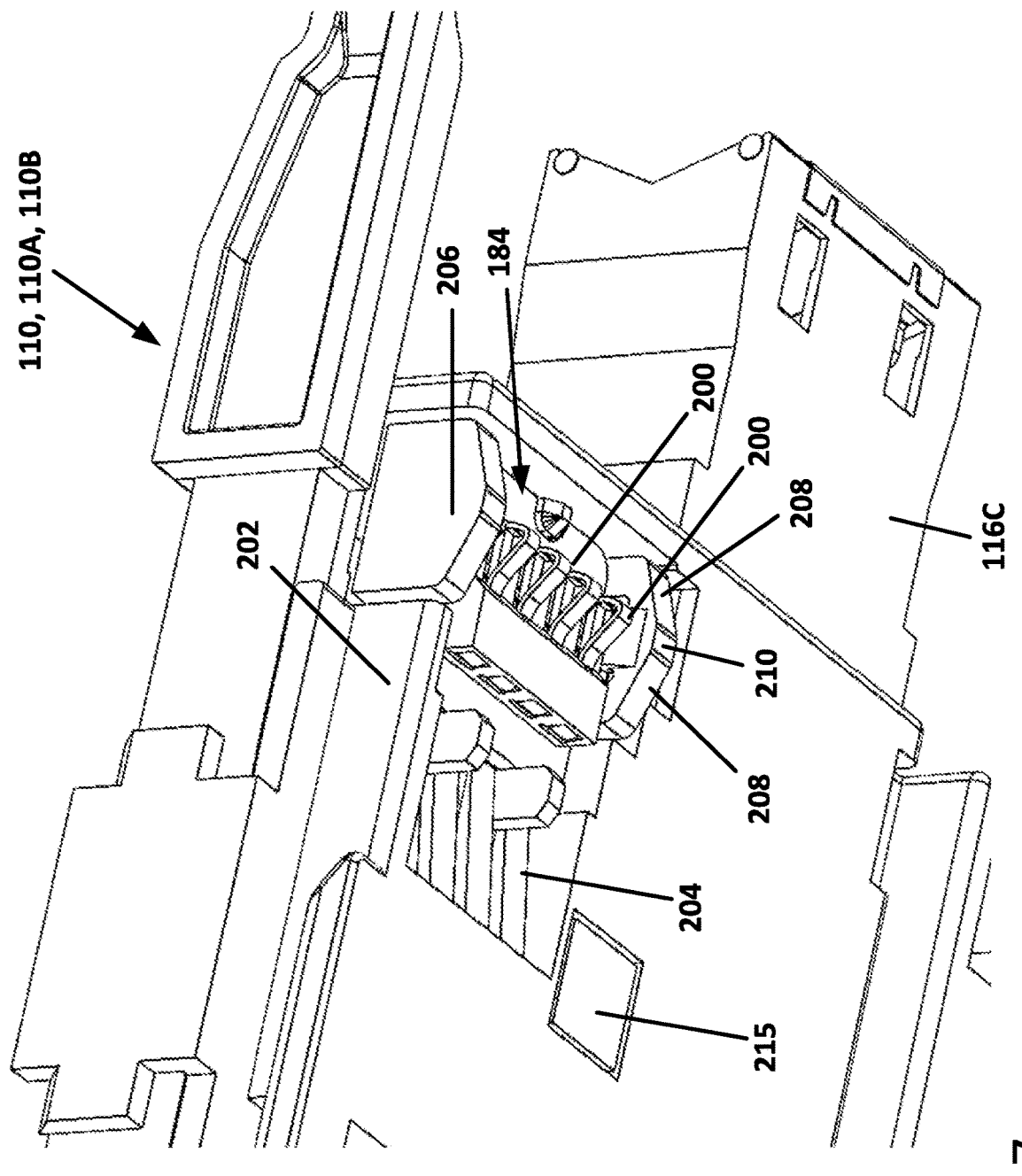
FIG. 17 is a bottom perspective view of a portion of the cassette of FIG. where a cassette identifier of the cassette sensor arrangement is visible.
Figure 18:
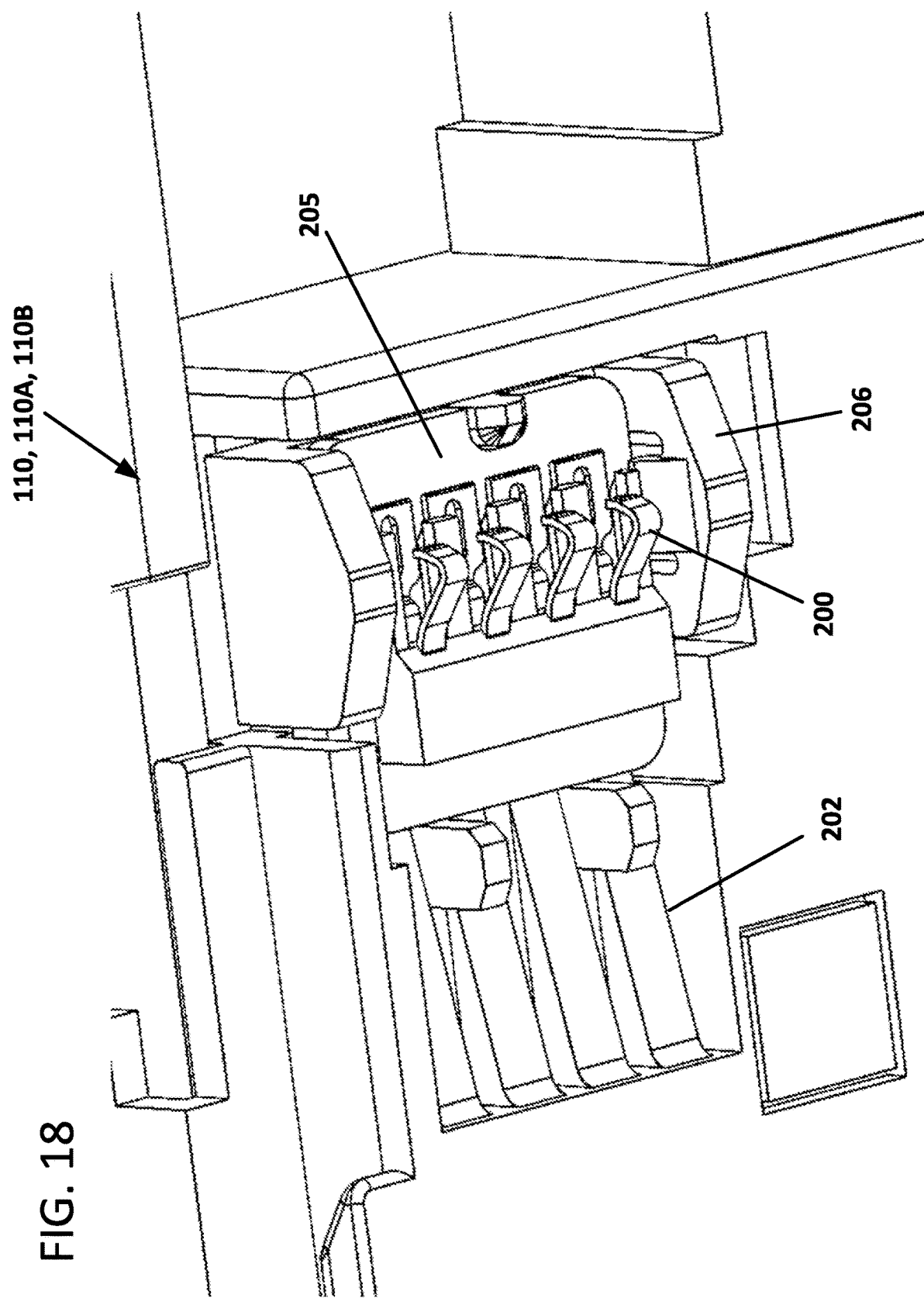
FIG. 18 is another perspective view of the cassette identifier and supporting frame.
Figure 19:
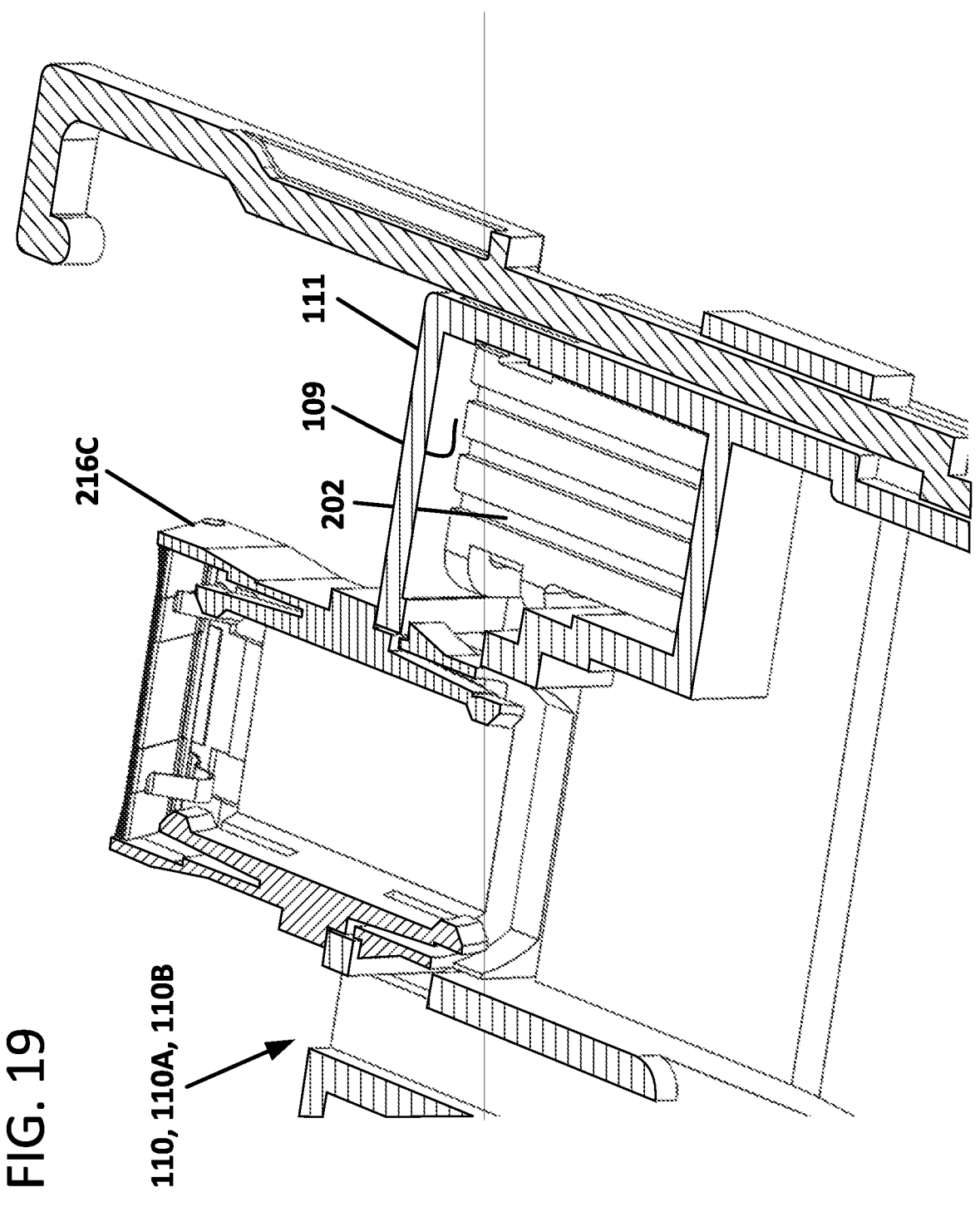
FIG. 19 is a top perspective view of a cross-section of the cassette of FIG. 15 where a pocket into which the cassette identifier deflects is visible.

FIGS. 17-19 illustrate an example cassette identifier 184 including a circuit board 205 on which one or more spring contacts 200 are mounted to form the interface with the electronic memory 181. The electronic memory 181 also is mounted to the circuit board 205. In certain examples, the spring contacts 200 include a power contact to transfer power from the tray arrangement 100 to the electronic memory 181, a ground contact to connect the electronic memory 181 to ground, and at least one data contact over which data is transferred between the memory 181 and the tray arrangement 100. In certain examples, the interface includes a spring contacts 200 for an SDA (i.e., data) line and a spring contact 200 for an SCL (i.e., clock) line. Other configurations are possible.

In certain implementations, the cassette identifier 184 (e.g., the circuit board 205 holding the electronic memory 181 and interface contacts 200) is mounted to a frame 202 configured to move relative to the cassette body 111 to protect the spring contacts 200 as the cassette 110 is mounted on the tray arrangement 100. In certain examples, the frame 202 includes a deflectable arm 204 having a free end to which the cassette identifier 184 is mounted. The arm 204 is configured to enable deflection of the electronic memory 181 and interface contacts 200 away from the circuit board 142 (e.g., into the pocket 109 defined in the cassette body 111 in FIG. 19) as the cassette 110 is slid along the top surface 141 of the circuit board 142. In certain examples, the arm 204 includes triangle-shaped ribs that taper along the deflection direction.

In certain implementations, the deflection arm 204 includes guides 206 protruding downwardly from the deflection arm 204. In some examples, the guides 206 extend past the interface contacts 200. In other examples, the guides 206 are about flush with the interface contacts 200. In other examples, the interface contacts 200 extend past the guides 206 by no more than 0.5 mm. In other examples, the interface contacts 200 extend past the guides 206 by no more than 0.4 mm. In other examples, the interface contacts 200 extend past the guides 206 by no more than 0.3 mm. Each guide 206 has a forwardly angled or contoured side 208 and a rearwardly angled or contoured side 208 to cam over the circuit board 142 as the cassette 110 is slid relative to the circuit board 142. The arm 204 deflects away from the circuit board 142 until flat or contoured tips 210 of the guides 20106 engage the circuit board 142. The tips 210 glide over the circuit board 142 until the cassette 110 latches into position relative to the cassette guides 112. In some examples, the interface contacts 200 are held over the circuit board 142 out of contact while the tips 210 contact the circuit board 142. In other examples, the interface contacts 200 skim over the first surface 141 of the circuit board 142 with the deflection alleviating some of the sheer force applied to the interface contacts 200. In examples where the guides 206 extend past the interface contacts 200, the circuit board 142 defines slots 212 (e.g., see FIG. 6) sized to receive the tips 210 of the guides 206 when the cassette 110 is aligned with the bay 114 at the latching position for the cassette 110. The slots 212 enable the guides 206 to drop into the undeflected positions, which lowers the cassette identifier 184 sufficient for the contact interface 200 to engage the contact pads 164 of the cassette sensor 156. In certain examples, such as examples where the interface contacts 200 protrude beyond the guides 206, the circuit board 142 may be devoid of slots 212.

In other implementations, the cassette identifier 184 includes an RFID tag 215 or other wireless memory and transmitter mounted to a bottom of the cassette body 111 (e.g., see FIGS. 17 and 18). In such implementations, the cassette sensor 156 on the tray arrangement 100 includes an RFID reader that periodically emits a query signal. In certain examples, a cassette 110 will include only one cassette identifier 184. Accordingly, a cassette 110 would include either the spring contacts 200 or the RFID tag 215. In other examples, a cassette 110 may contain both types of cassette identifiers 184 as a backup.

FIGS. 20-23 illustrate another example frame 202 for the cassette identifier 184. In FIGS. 20-23, the cassette identifier 184 includes the circuit board 205 holding the electronic memory 181 and spring contacts 200. The cassette identifier 184 is mounted to a deflectable arm 204. However, the arm 204 in FIGS. 20-23 is a separate piece from the cassette body 111. The arm 204 mounts within a groove 214 defined in the cassette body 111. The guides 206 of the arm 204 shown in FIGS. 20-23 have a continuous curvature instead of angled surfaces. The guides 206 are still configured to drop into slots 212 in the tray arrangement 100.

Figure 24:
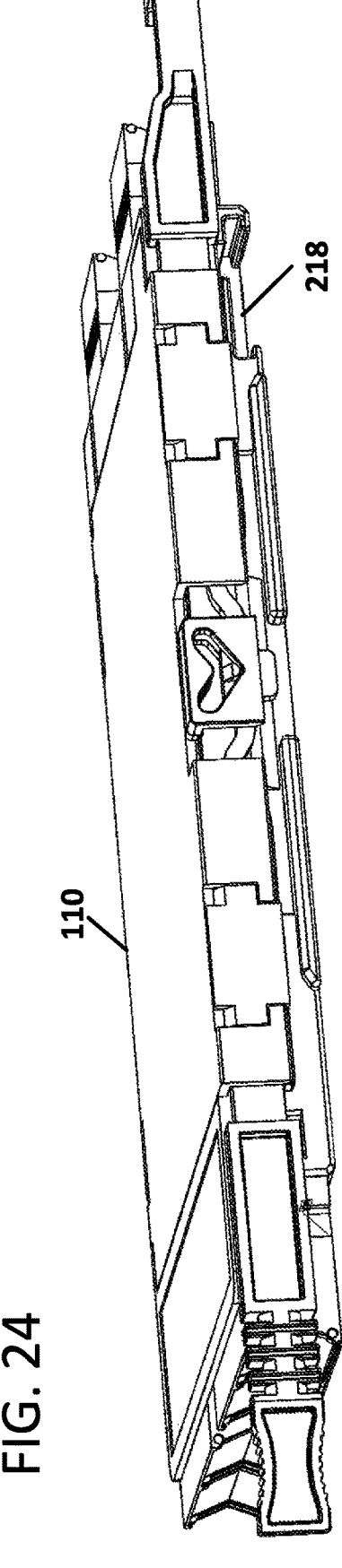
FIG. 24 is a perspective view of another example cassette defining a side pocket at which a cassette identifier can be mounted.
Figure 25:
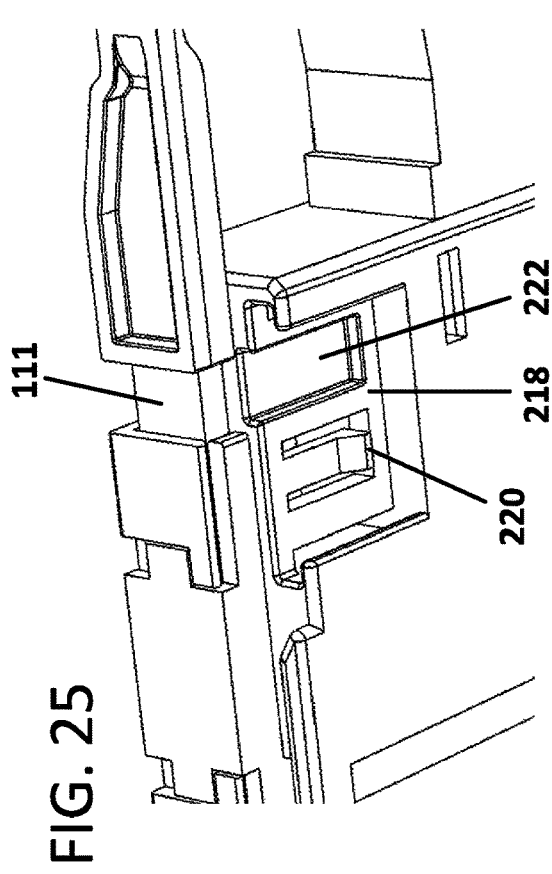
FIG. 25 is a bottom perspective view of the side pocket of the cassette of FIG. 24.

FIGS. 24 and 25 illustrate another example mounting interface for the cassette identifier 184. The cassette 110 defines a side pocket 218 in which the cassette identifier 184 can slide edge-wise. In certain examples, the cassette body 111 also defines a latch hook 220 within the side pocket 218 to receive and retain the cassette identifier 184. In certain examples, the side pocket 218 defines a groove 222 to accommodate the electronic memory 181 or other electronic components of the cassette identifier 184.

Figure 26:
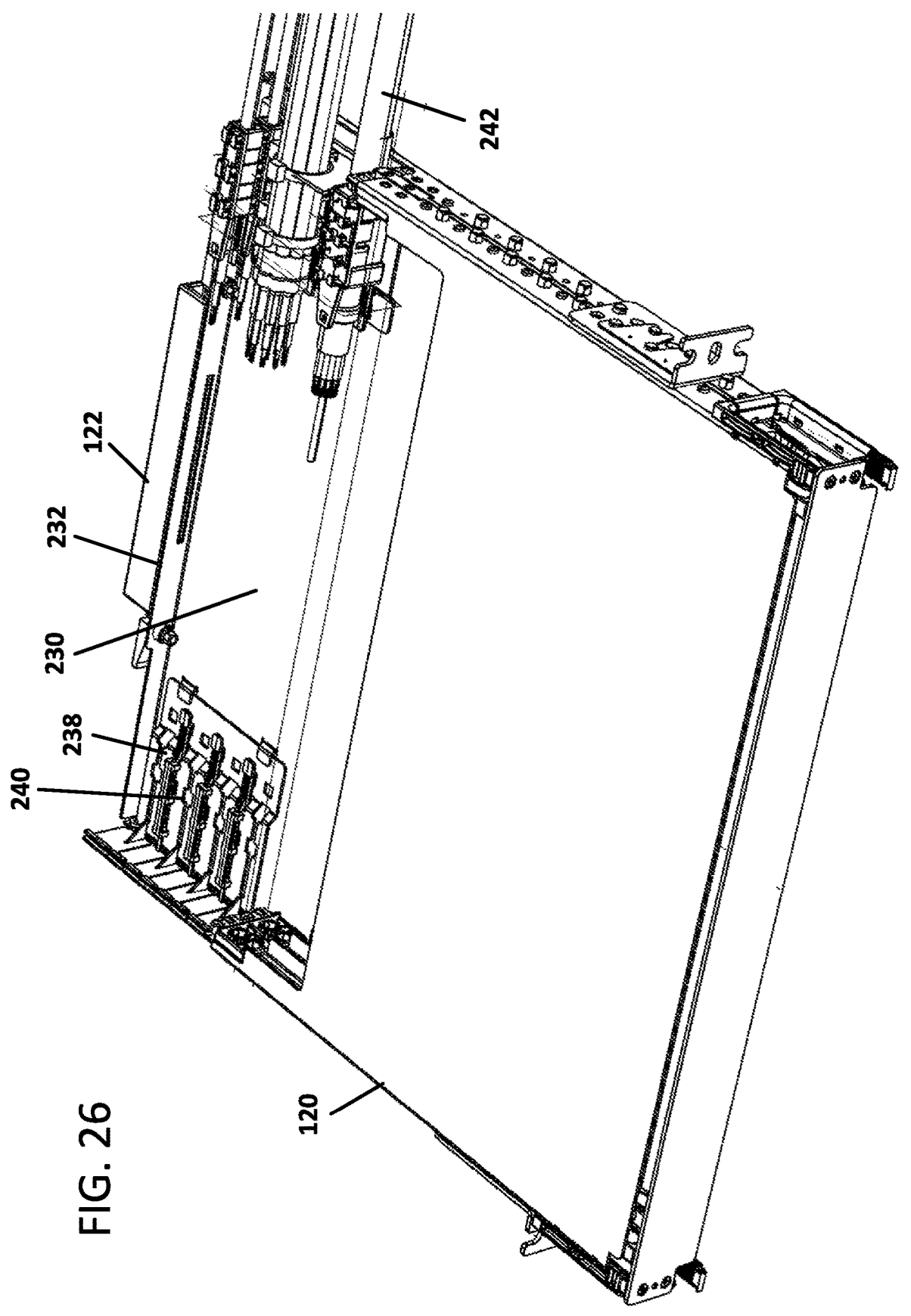
FIG. 26 is a perspective view of an example chassis including a cable management shelf providing cable anchoring stations, the cable management shelf also supporting an external communications unit.

FIGS. 26-30 illustrate various examples of a communications unit 122 mountable relative to the tray arrangement 100. The communications unit 122 is positioned so that a cable 124 can be routed between the communications unit 122 and the tray connector 123. In the examples shown, the communications unit 122 is mounted at a cable management shelf 230 disposed at a rear of the chassis 120. The cable management shelf 230 provides cable anchoring stations 240 at which one or more anchor clips 238 can be releasably mounted. As shown in FIG. 26, one or more cables 242 can be attached to the anchor clips 238 to secure the cables at the cable management shelf 230. In certain examples, certain types of cable anchor clips 238 are stackable to fit in a common cable anchor station 240 (e.g., see FIG. 30). Examples of cable anchor clips 238—including stackable cable anchor clips—and corresponding cable anchor stations 240 are shown and described in U.S. Provisional Application No. 63/178,944, filed Apr. 23, 2021, titled "Cable Anchor System," disclosure of which is hereby incorporated herein by reference in its entirety.

In the example shown in FIG. 26, the communications unit 122 is mounted to an exterior of the cable management shelf 230 (e.g., to an exterior surface of the rear door 232). By disposing the communications unit 122 outside of the management shelf 230, the communications unit 122 does not interfere with routing cables between the cable anchor stations 240 and the tray arrangements 100.

Figure 27:
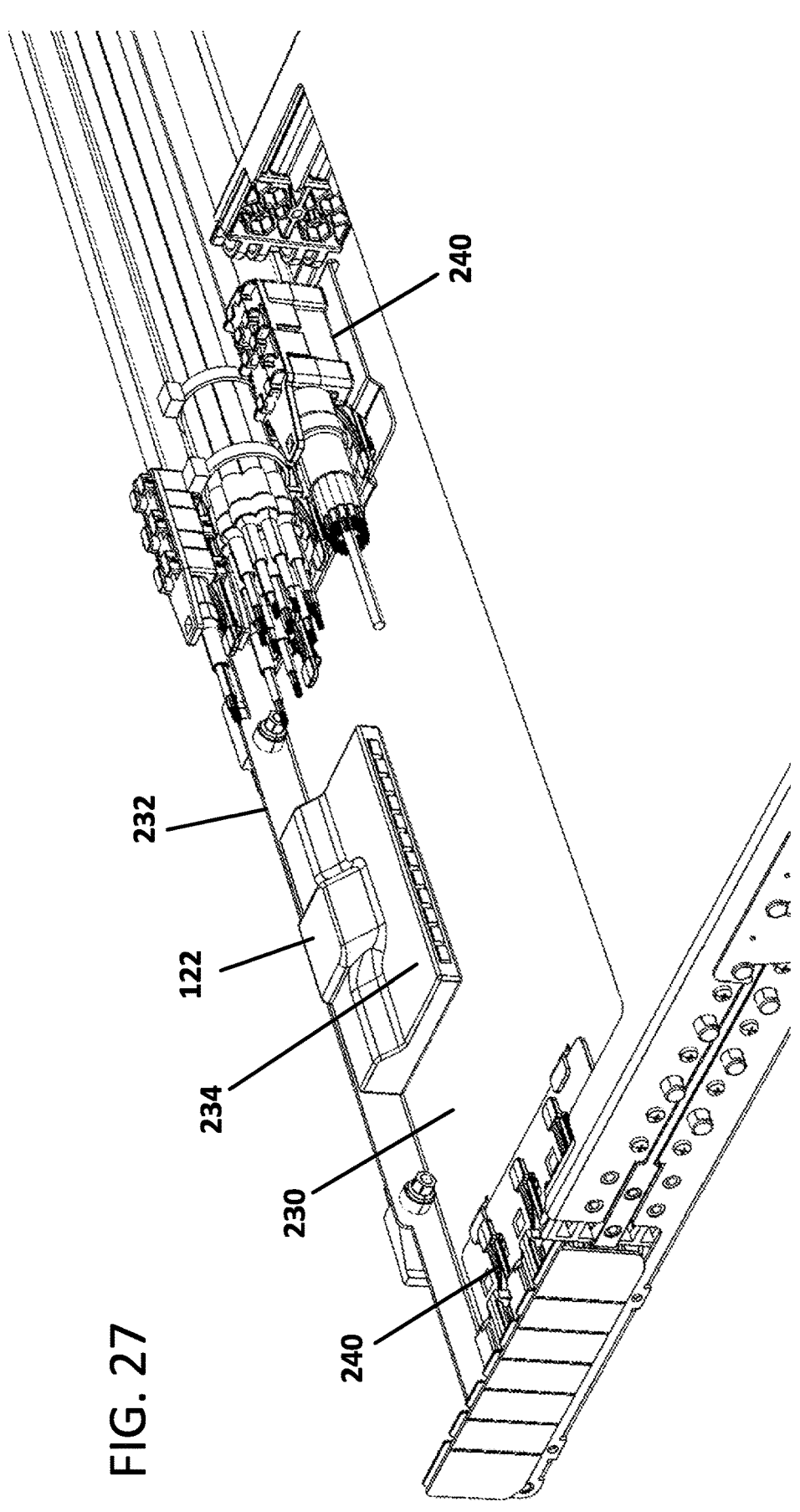
FIG. 27 is a perspective view of the cable management shelf of FIG. 26 holding a second example communications unit within an interior of the cable management shelf.

In the example shown in FIG. 27, the communications unit 122 is mounted to the cable management shelf 230 between two regions of cable anchor stations 240. In the example shown, the communications unit 122 is shaped to have a larger section against the rear door 232 and a smaller or flatter section 234 extend towards the chassis 120. In certain such examples, the larger electronic components of the communications unit 122 are disposed at the larger section and the ports for connecting to tray cables 124 are disposed at the flatter section 234. The flatter section 234 is shaped to mitigate interference with the routing of fibers between the cable anchor stations 240 and the tray connectors 123.

Figure 28:
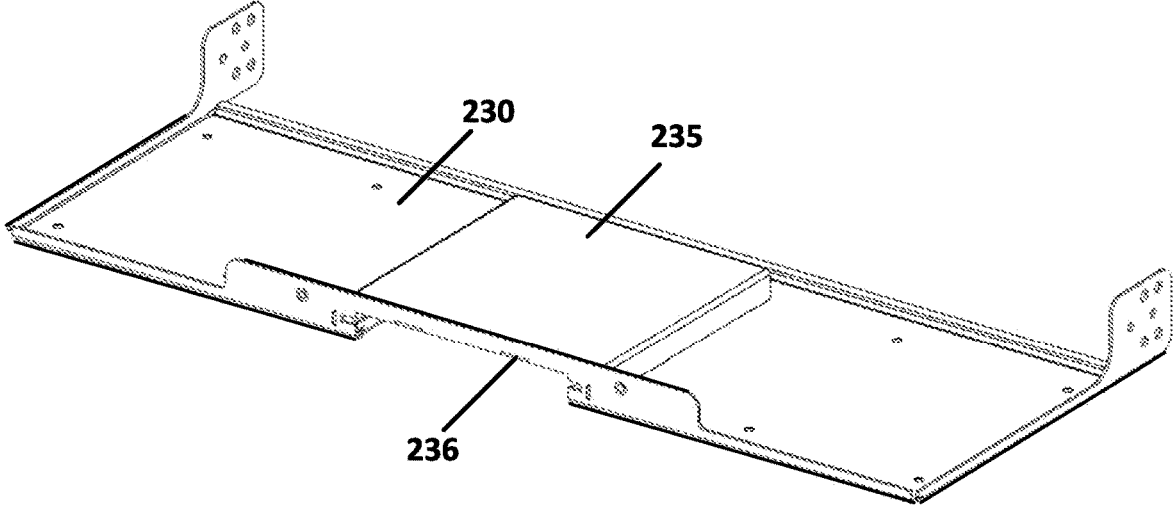
FIG. 28 is a top perspective view of another cable management shelf defining a pocket for receiving an example communications unit, the cable management shelf being shown without the corresponding chassis.
Figure 29:
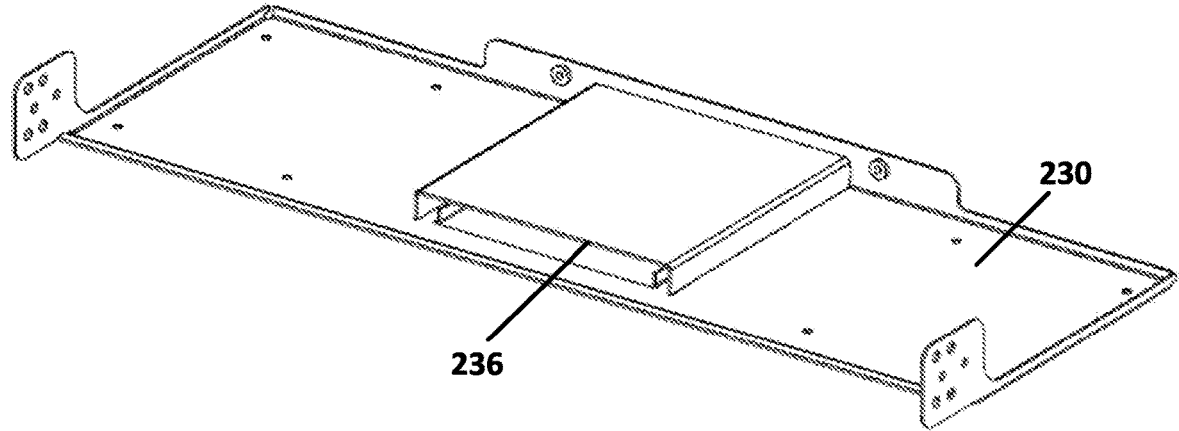
FIG. 29 is a bottom perspective view of the cable management shelf of FIG. 28.

FIGS. 28 and 29 illustrate a framework 235 disposed on the cable management shelf 230 and defining a pocket 236 sized to receive a communications unit 122. The framework 235 directs fibers over the pocket 236 and inhibits snagging of the fibers on the communications unit 122.

Figure 30:
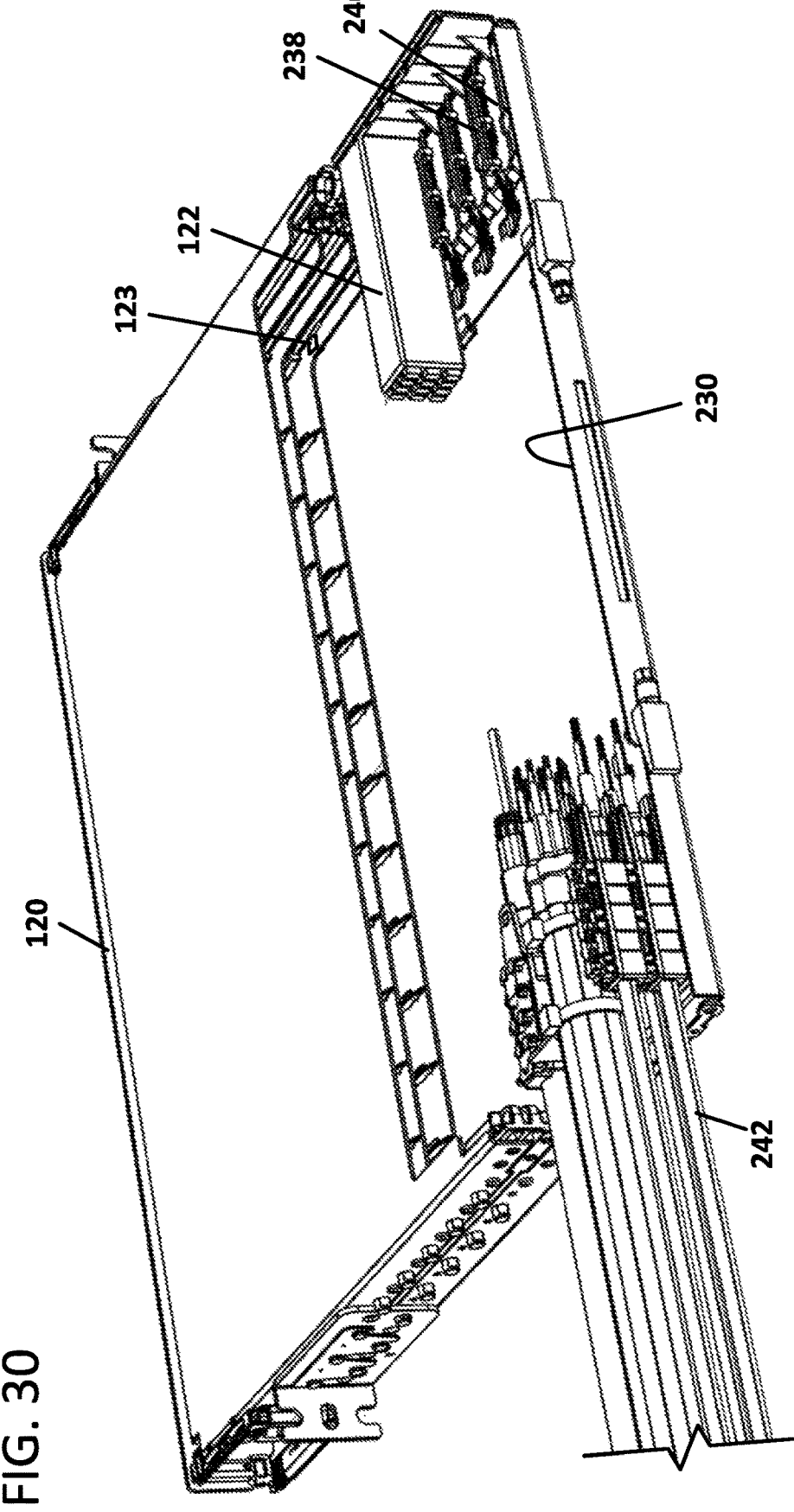
FIG. 30 is a rear perspective view of the chassis and cable management shelf of FIG. 26 in which a communications unit is mounted at a cable anchor station of the cable management shelf.

In the example shown in FIG. 30, the communications unit 122 is configured to mount at one or more of the cable anchor stations 240. For example, the communications unit 122 may include a housing defining the clip structure 238 to enable mounting of the communications unit 122 at the cable anchor station(s) 240. In an example, the communications unit 122 spans a single cable anchor station 240. In another example, the communications unit 122 spans multiple cable anchor stations 240. In some examples, ports for the tray cables 124 are provided at an axial end of the communications unit 122 (e.g., see FIG. 30). In other examples, the ports may face the tray arrangements 100. In some examples, cables 242 can be secured (e.g., using clips 238) to the cable anchor stations 240 provided at one side of the cable management shelf 230 and the communications unit 122 can be secured to one or more of the cable anchor stations 240 provided at the opposite side of the shelf 230. In other examples, the communications unit 122 includes structure mimicking the cable anchor station 240 so that a clip 238 can be mounted above (i.e., stacked) on the communications unit 122. In an example, the communications unit 122 has the same stacking features as the clips 238. Accordingly, the communications unit 122 does not prevent cables 242 from being secured to the management shelf 230 at any of the cable anchor stations 240.

Figures 31, 32:
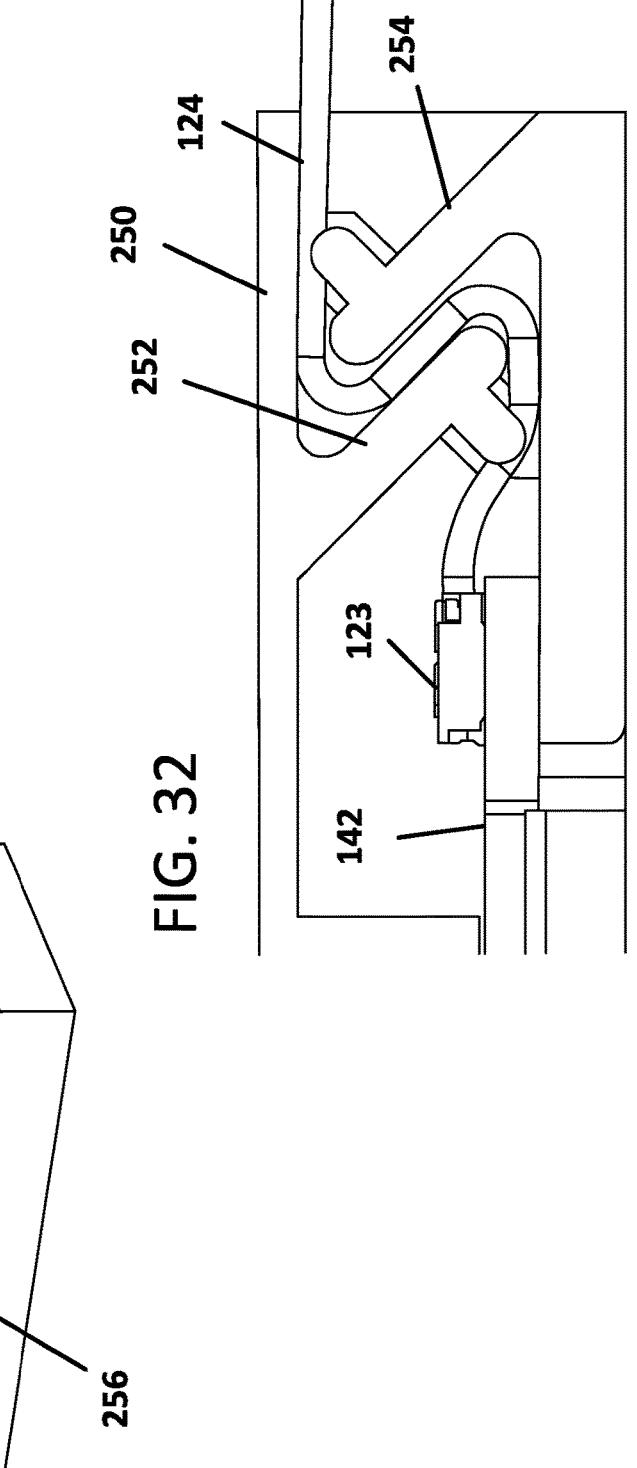
FIG. 31 is a perspective view of an example cable strain relief structure for a tray connector that mounts to the circuit board of the tray arrangement.
FIG. 32 is a side elevational view of the strain relief structure of FIG. 31.

In accordance with aspects of the disclosure, the tray arrangements 100 are movable relative to the chassis 120. Accordingly, the tray connector 123 mounted to each tray arrangement 100 is movable relative to the chassis 120 and cable management shelf 230. A cable 124 (i.e., one or more conductors) extends between the tray connector 123 and the communications unit 122. Absent strain relief, the cable 124 may pull on the tray connector 123 when the tray arrangement 100 is moved relative to the communications unit 122. FIGS. 31-32 illustrate an example strain relief structure 250 to provide strain relief at the tray connector 123.

The structure 250 forms a tortuous path along which the cable 124 extends away from the tray connector 123. The structure 250 includes walls 252, 254 extending from opposite directions to form the tortuous path. In the example shown, the path has a Z-shape. In other examples, the path may have an S-shape or any other desired shape providing multiple bends in the cable 124. Cable retaining tabs 256 may be disposed on the walls 252, 254 or otherwise along the path to hold the cable 124 within the structure 250. In certain examples, the structure 250 is mounted to the tray arrangement 100 above the circuit board 142 away from the bays 114. For example, the structure 250 may be disposed at a corner of the circuit board 142. In other examples, the structure 250 can be mounted to the tray base 140 adjacent the circuit board 142.

In certain implementations, the tray connector 123 and the cable strain relief structure 250 are aligned along the depth D of the tray arrangement 100 with a latching arrangement 121 carried by the tray arrangement 100 to secure the tray arrangement 100 in position relative to a chassis (e.g., see FIG. 5). Example latching arrangements 121 suitable for use with the tray arrangement 100 are shown and described in U.S. Provisional Application No. 63/166,636, filed Mar. 26, 2021, titled "Communications Panel Systems and Trays Therefore," the disclosure of which is hereby incorporated herein by reference in its entirety. In certain examples, the tray connector 123 is disposed within a housing of the latching arrangement (e.g., see FIG. 36).

Figures 33, 34:
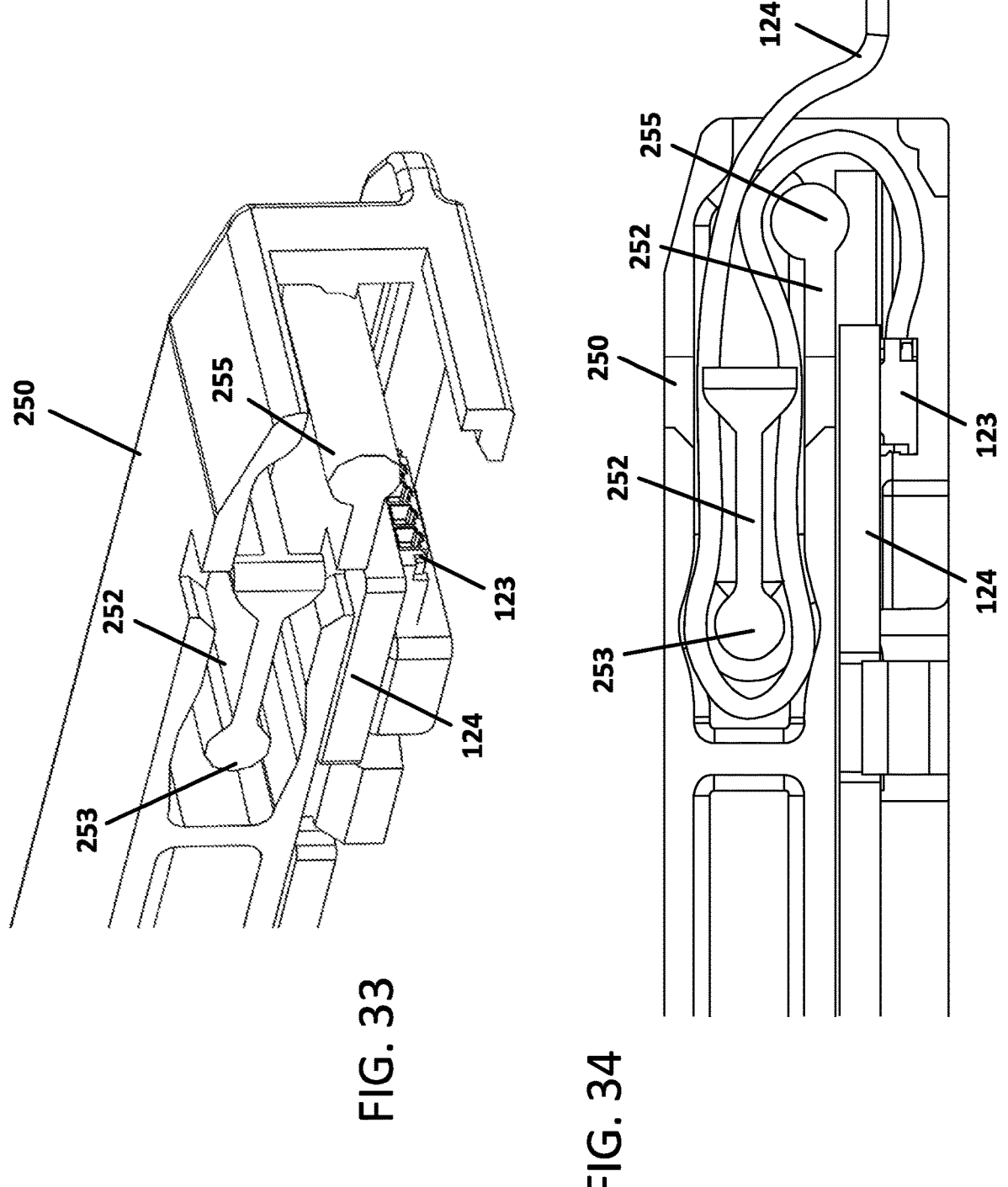
FIG. 33 is a perspective view of another example cable strain relief structure for a tray connector that mounts to the circuit board of the tray arrangement.
FIG. 34 is a side elevational view of the strain relief structure of FIG. 33.

FIGS. 33 and 34 illustrate another example structure 250 forming a tortuous path along which the cable 124 is routed to provide strain relief at the tray connector 123. The structure 250 includes walls 252, 254 extending in opposite directions to define the path. Enlarged ends 253, 255 of the walls 252, 254 inhibit excessive bending of the cable 124 along the path. In the example shown, the tray connector 123 is disposed at the bottom surface 143 of the board 142. In other examples, the tray connector 123 may be disposed at the top surface 141 of the board 142 or the edge of the board 142.

Figure 35:
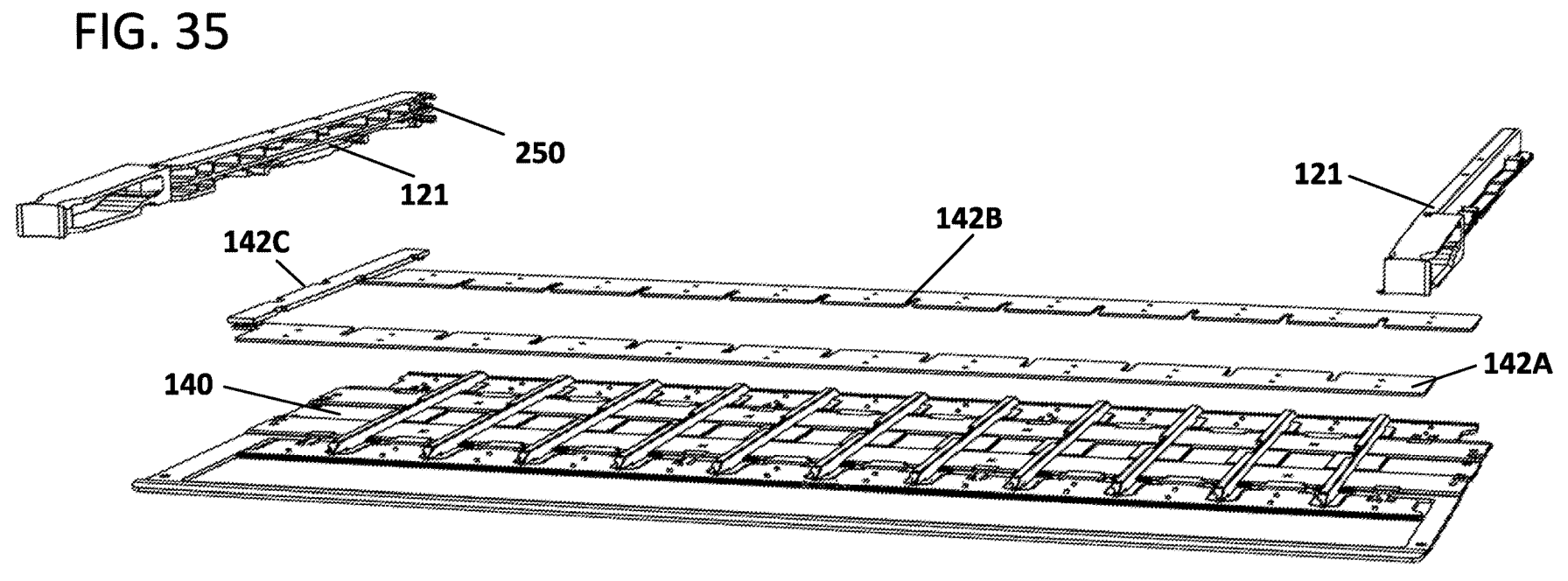
Figure 36:
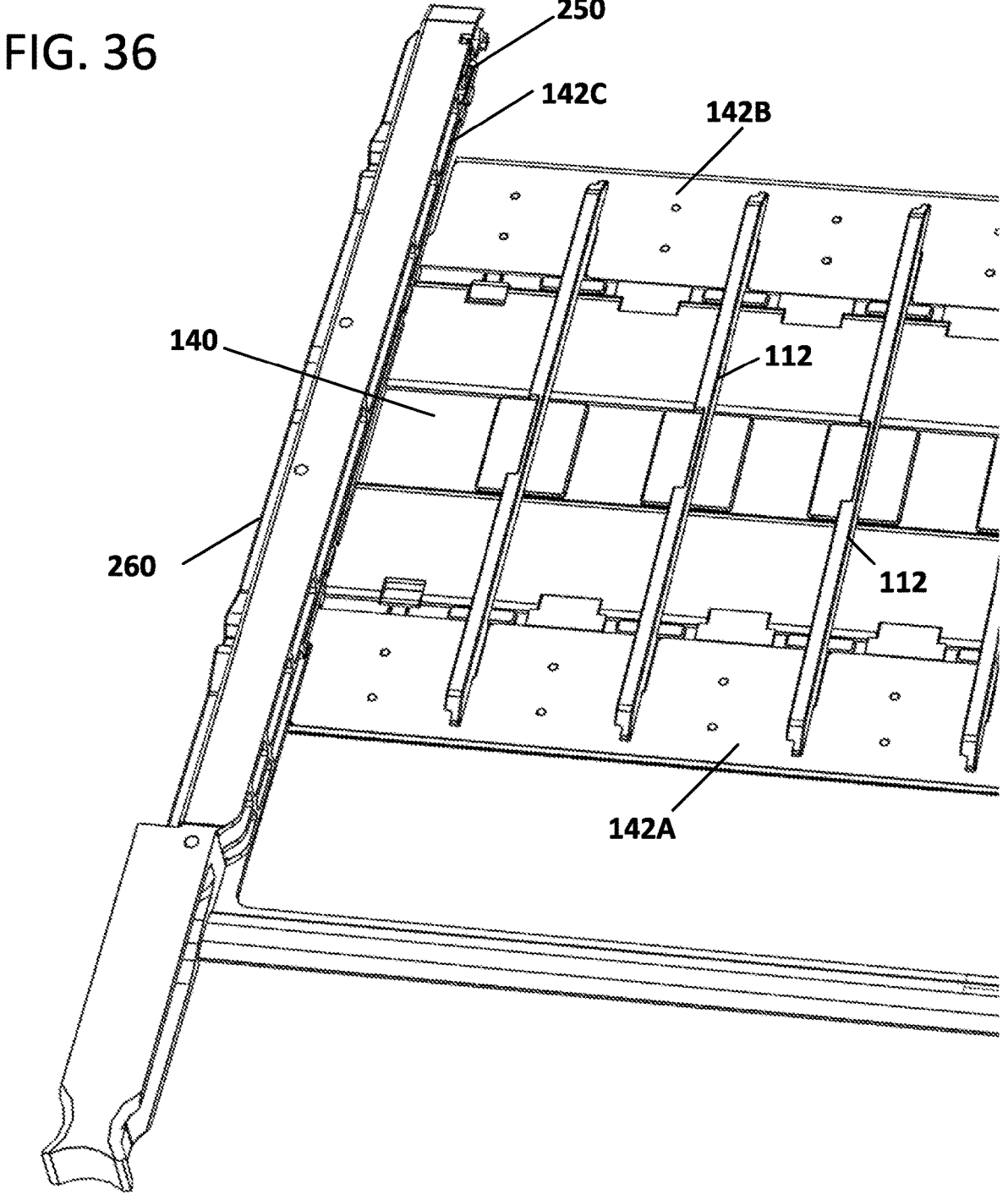
FIG. 36 is a perspective view of one side of the tray arrangement of FIG. 35.

In accordance with some aspects of the disclosure, the circuit board 142 is formed by a single board extending over the tray base 140. In accordance with other aspects of the disclosure, the circuit board 142 is formed by a combination of multiple boards. For example, as shown in FIGS. 35 and 36, the circuit board 142 may be formed from a front board 142A, a rear board 142B, and a connecting board 142C. The plug sensors 155 for the ports defined by the front port members 116 are mounted to or etched into the front board 142A. The plug sensors 155 for the ports defined by the rear port members 116C are mounted to or etched into the rear board 142B. The connecting board 142C mechanically and communicatively couples the front and rear boards 142A, 142B.

In some implementations, the cassette sensor 156 is disposed at the rear board 142B. In other implementations, the cassette sensor 156 is disposed at the front board 142A. In certain implementations, the tray connector 123 is disposed at the connecting board 142C. In certain implementations, the connecting board 142C is disposed along a tray latching arrangement 121 for latching the tray arrangement 100 to the chassis 120. In some examples, the connecting board 142C is disposed in a vertical orientation to reduce the amount of space taken up along the width W of the tray arrangement 100. In other examples, the connecting board 142C is disposed in a horizontal orientation to reduce the amount of vertical space taken up.

An example tray arrangement 100 suitable for receiving a multi-piece circuit board 142 is shown and described in U.S. Provisional Application No. 63/150,851, filed Feb. 18, 2021, titled "Tray Arrangements for Cassettes," the disclosure of which is hereby incorporated herein by reference in its entirety.

Figure 38:
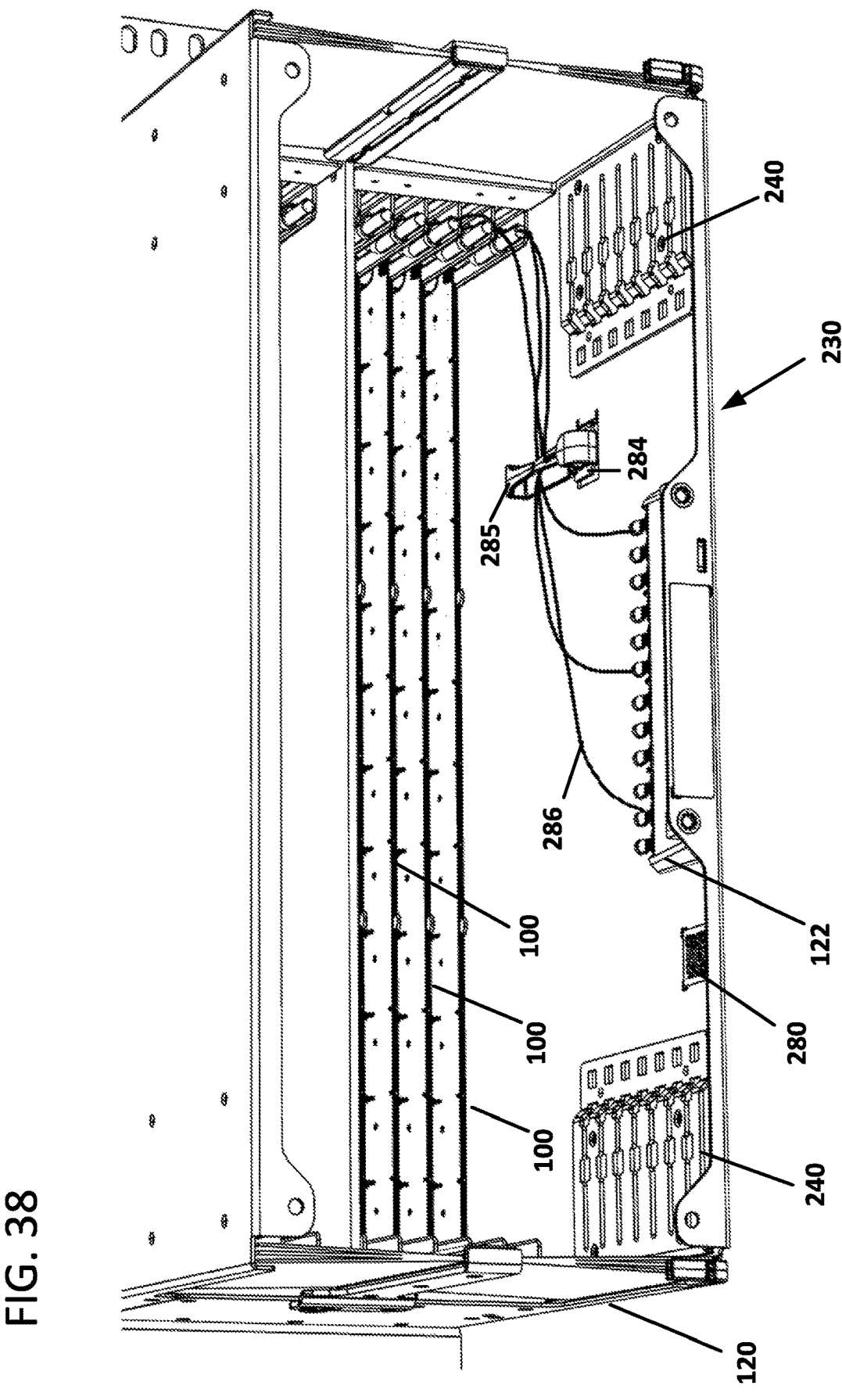
FIG. 38 is a rear perspective view of another example chassis and cable management shelf in which a communications unit is mounted within an interior of the cable management shelf.
Figure 39:
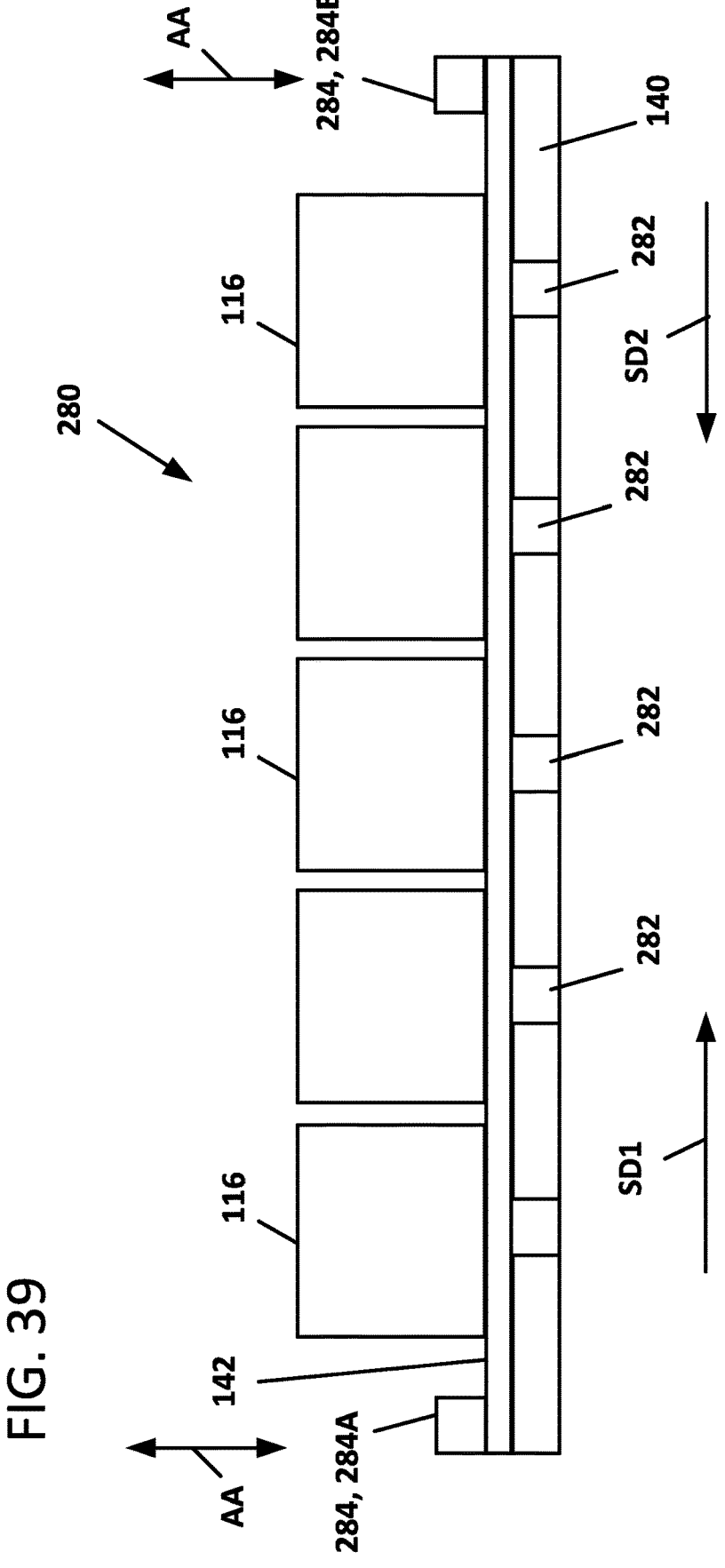
FIG. 39 is a schematic diagram of a tray arrangement including a tactile user interface configured to facilitate port tracing for cables plugged into ports of the tray arrangement.
Figure 40:
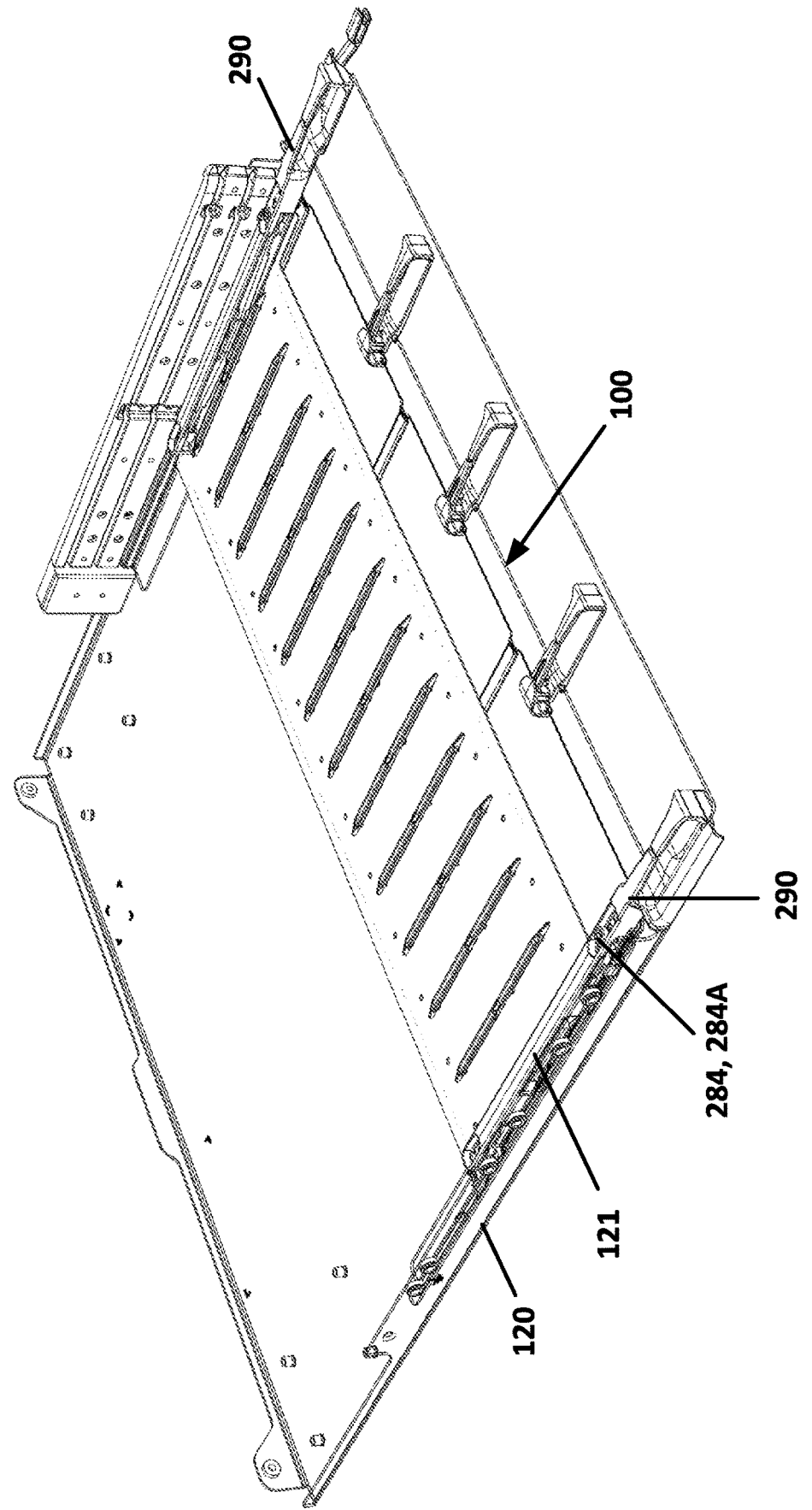
FIG. 40 is a perspective view of an example tray arrangement including an example implementation of the tactile user interface of FIG. 39.
Figure 41:
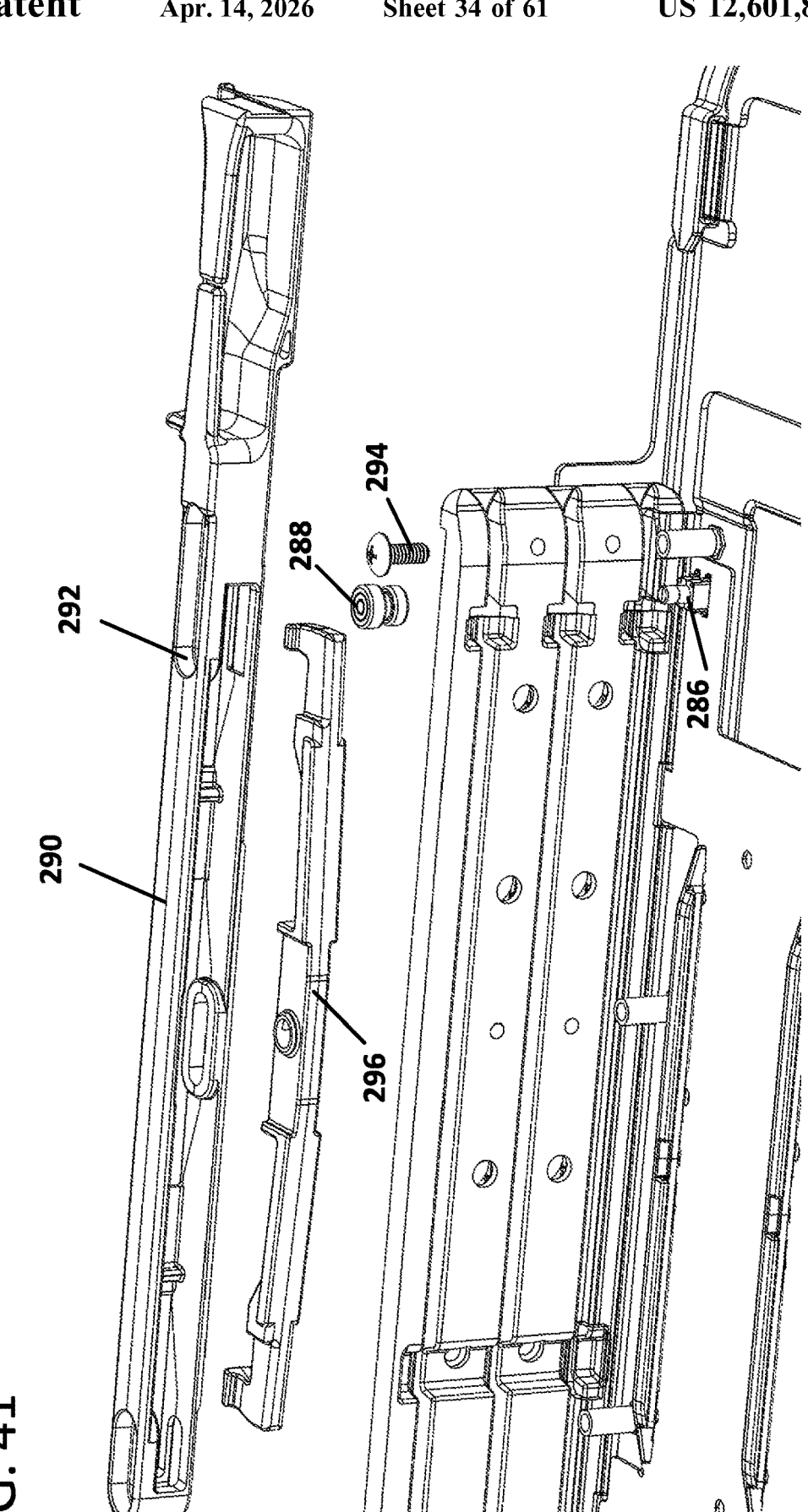
FIG. 41 is an exploded view of one side of the tray arrangement and the tactile user interface of FIG. 40.
Figures 42, 43:
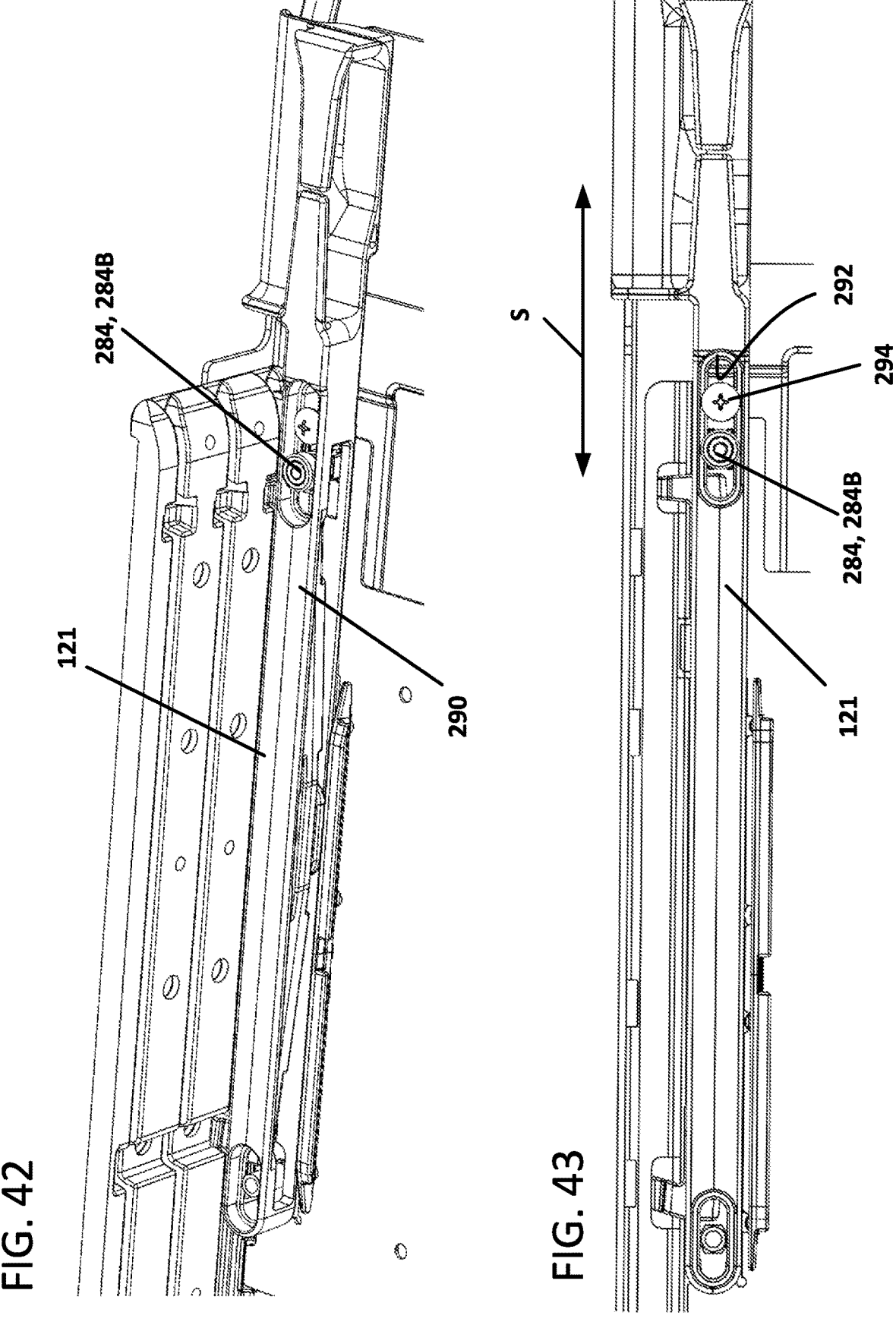
FIG. 42 is a perspective view of the tactile user interface of FIG. 40 disposed within a latching arrangement of the tray arrangement.
FIG. 43 is a top plan view of the tactile user interface and the latching arrangement of FIG. 40.
Figure 44:
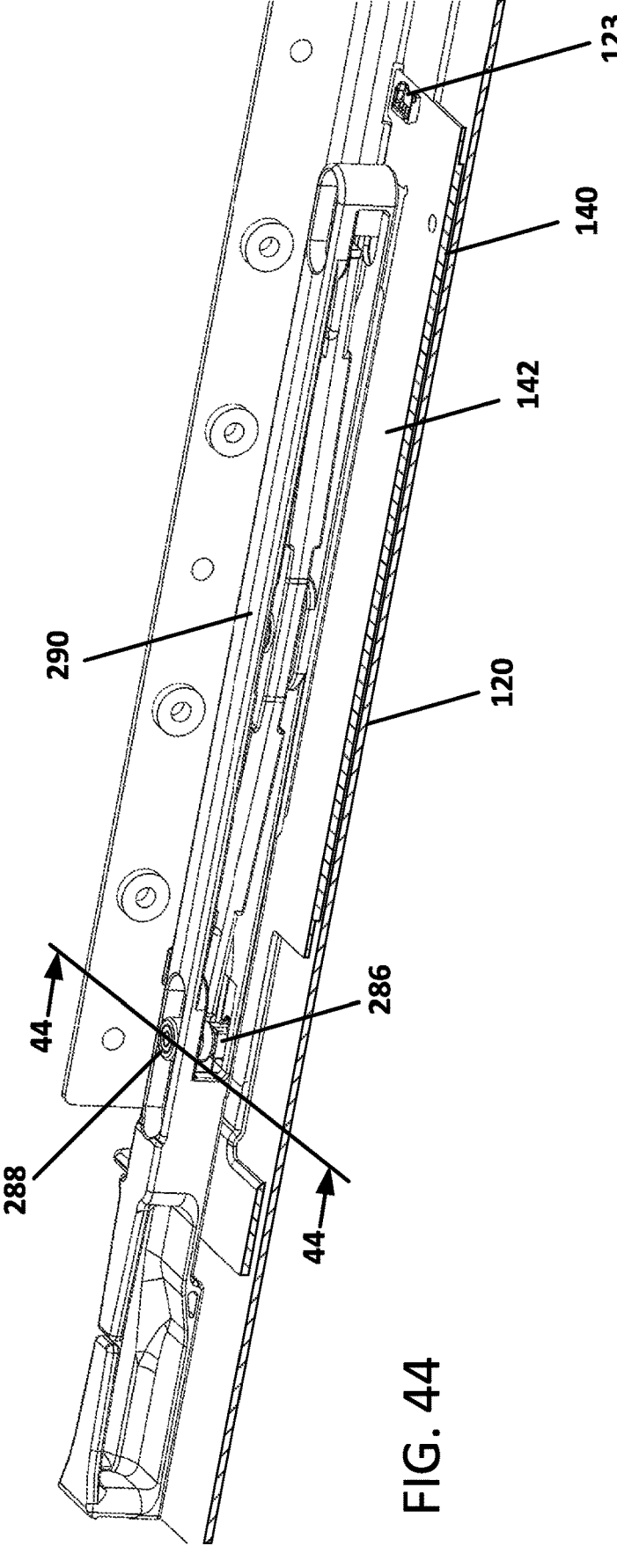
FIG. 44 is a perspective view of the other side of the tray arrangement of FIG. 41.
Figure 45:
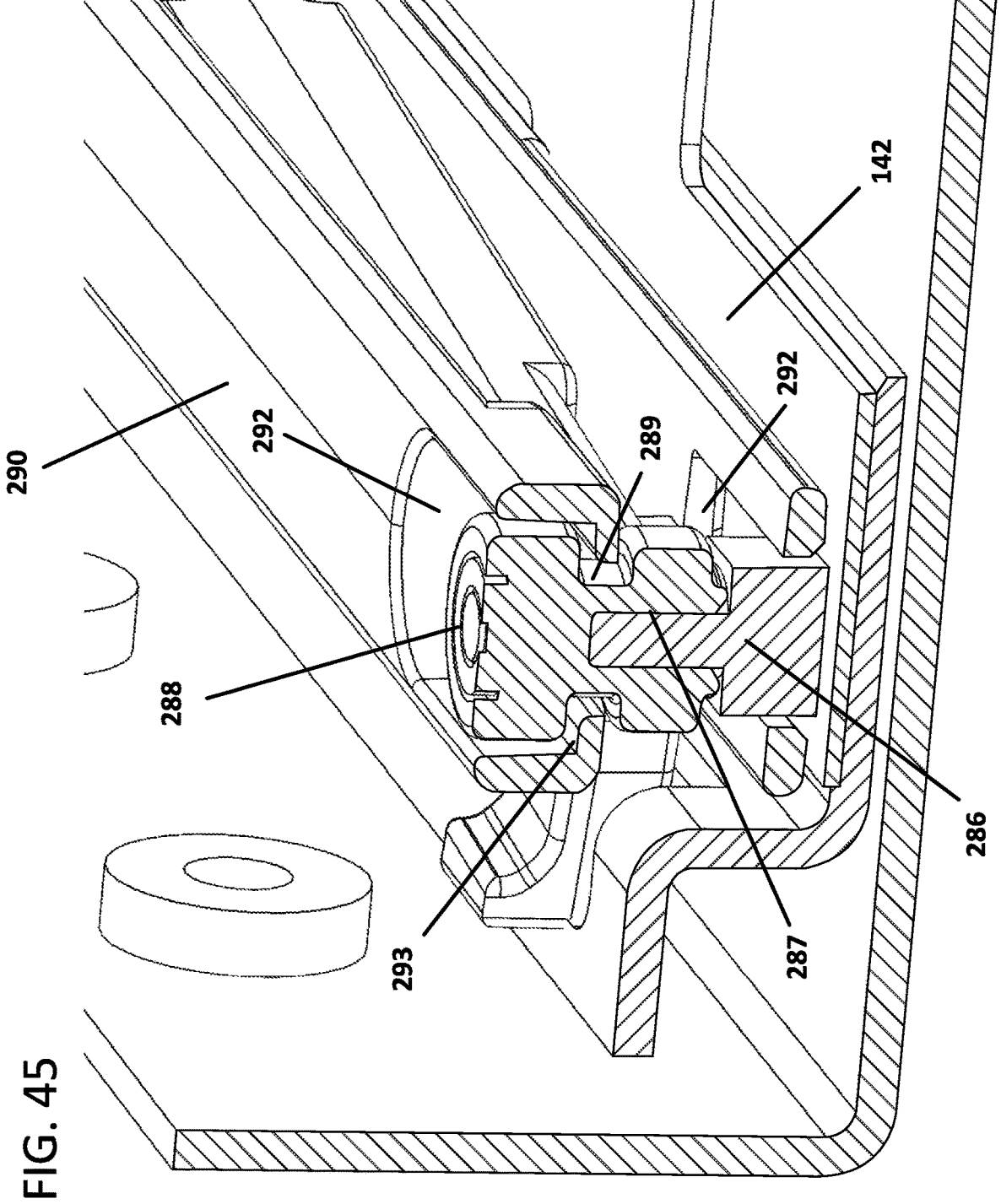
FIG. 45 is a cross-sectional view taken along the 44-44 line of FIG. 44.

Referring now to FIG. 38, a cable management shelf 230 disposed at a rear of the chassis 120 is shown. An example communications unit 122 is mounted at a rear of the cable management shelf 230. In certain implementations, the communications unit 122 is disposed between cable anchoring stations 240, which are disposed at opposite sides of the cable management shelf 230.

One or more cable guides 285 can be mounted at the cable management shelf 230 to direct wires or other cables between the communications unit 122 and the tray arrangements 100. In certain implementations, wires are routed onto the tray arrangements 100 at one side of the tray arrangements 100. In certain implementations, a single cable guide 285 is disposed at a position offset from a central reference axis extending along the forward-rearward axis of the chassis 120. In the example shown, the cable guide 285 is offset from the central reference axis towards the side of the tray arrangements 100 at which the wires are routed onto the tray arrangements 100. In certain examples, each wire is routed towards the tray circuit board connector 123 on the respective tray arrangement 100.

In certain examples, indicia 280 (e.g., printed indicia such as a QR code or bar code, wireless indicia such as an RFID tag, etc.) is provided at the cable management shelf 230. The indicia 280 refers a user to information about the chassis 120. For example, scanning the indicia 280 causes a reader (e.g., a cellular phone, a dedicated reader, etc.) to access information about the chassis 120 electronically stored on a network (e.g., the Internet). The information being stored is sufficient to identify the chassis 120. For example, the information being stored may include a unique ID or serial number, a location at which the chassis is installed, and/or a listing of or links to information about the cassettes 110 or other components installed in the chassis 120.

Referring now to FIGS. 39-45, the tray arrangement 100 is configured to facilitate port tracing for cables plugged into ports 116 of the tray arrangement 100. For example, the tray arrangement 100 may include a user interface 280 configured to facilitate selection of a port 116 at which a cable to be traced is received. In certain implementations, the user interface 280 includes one or more light indicators 282 disposed at the ports 116 and a tactile interface member 284 configured to be manually manipulated by a user to enter a selection or otherwise actuate the user interface 280. For example, actuation of the tactile interface member 284 may activate one of the light indicators 282. In certain examples, continued actuation of the tactile interface member 284 may sequence activation of the light indicators 282.

In certain implementations, the user interface 280 is electrically connected to the communications unit 122 to provide actuation signals received by the tactile interface member 284 to the remote server 128 for processing. The remote server 128 may then send activation signals to the light indicators 282. The remote server 128 also may review port relationships to determine which port 116 is indicated by a user and then determine a corresponding port linked to the selected port by a cable. The remote server 128 may send an activation signal to the light indicator 282 associated with the linked port. In other implementations, the communications unit 122 may include a processor sufficient to activate the light indicators 282 in response to actuation signals received from the tactile interface member 284.

In certain implementations, the tactile user interface 284 includes a push button switch. Depressing the tactile user interface 284 triggers an actuation signal that is sent to the communications unit 122 or a managing processor. In certain examples, the tactile interface member 284 is disposed so that the tactile interface member 284 moves along an actuation axis AA that extends transverse to the tray base 140. In an example, the tactile interface member 284 is disposed so that the actuation axis AA extends vertically. In some examples, the light indicators 282 are sequentially activated in response to repeated actuation (i.e., multiple button presses) of a tactile interface member 284. In other examples, the light indicators 282 are sequentially activated in response to extended actuation (i.e., a held button push) of a tactile interface member 284.

In certain implementations, the user interface 280 includes first and second tactile interface members 284A, 284B. In certain examples, actuation of the first tactile interface member 284A sequences activation of the light indicators 282 in a first sequence direction SD1 and actuation of the second tactile interface member 284B sequences activation of the light indicators 282 in a second sequence direction SD2. In an example, the second sequence direction SD2 is opposite the first sequence direction SD1. In some implementations, actuating the first tactile interface member 284A initially activates a light indicator 282 at the first side 106 of the tray arrangement 100 and actuating the second tactile interface member 284B initially activates a light indicator 282 at the second side 108 of the tray arrangement 100. In other implementations, actuating either of the first and second tactile interface members 284A, 284B initially activates a light indicator 282 in a central region of the tray arrangement 100.

In other implementations, actuation of the first tactile interface member 284A sequences activation of a light indicator 282 associated with each cassette 110 to select one of the cassettes 110 and actuation of the second tactile interface member 284B sequences activation of the light indicators 282 associated with the selected cassette 110. Accordingly, the first tactile interface member 284A may be actuated to select a cassette while the second tactile interface member 284B may be actuated to select a port 116 associated with the selected cassette 110. Other configurations are possible.

In certain implementations, the tactile interface members 284A, 284B are disposed at the latching arrangement 121 for the tray arrangement 100. For example, the latching arrangement 121 may include a first handle 290 disposed at the first side 106 of the tray arrangement 100 and a second handle 290 disposed at the second side 108 of the tray arrangement

100. Each handle 290 may define a slot 292 in which a respective one of the tactile interface members 284A, 284B is disposed. In certain examples, the handle 290 defines multiple horizontally extending surfaces that define aligned slot 292 (see FIG. 45). The slot 292 enables each handle 290 to move (e.g., slide) relative to the respective tactile interface members 284A, 284B. Accordingly, the tactile interface members 284A, 284B can be installed on the circuit board 142 without interfering with actuation of the handle 290 of the latching arrangement 121. In certain examples, each tactile interface members 284A travels over less than a full length of the respective slot 292. In certain examples, each tactile interface members 284A travels over less than a half of the length of the respective slot 292.

In certain implementations, the tactile user interface 284 includes an electrical or electronic switch 286 mounted to the circuit board 142 of the tray arrangement 100. A button or other contact member 288 is mounted to the switch 286 to facilitate actuation of the switch 286 by a user (e.g., see FIGS. 41 and 45). In certain implementations, the electronic switch 286 includes a trigger 287 that extends into an interior cavity defined in the button 288. In certain implementations, the button 288 is captured by the latching arrangement handle 290 to inhibit removal of the button 288 from the electronic switch 286. For example, the button 288 may defines an annular groove 289 into which an inner ledge 293 of the handle 290 extends. Interaction between the ledge 293 and the top and bottom surfaces of the groove 289 inhibit lifting of the button 288 off the electronic switch 286. The ledge 293 extends along the slot 292 so that the ledge slides along the groove 289 when the handle 290 is actuated.

Figure 46:
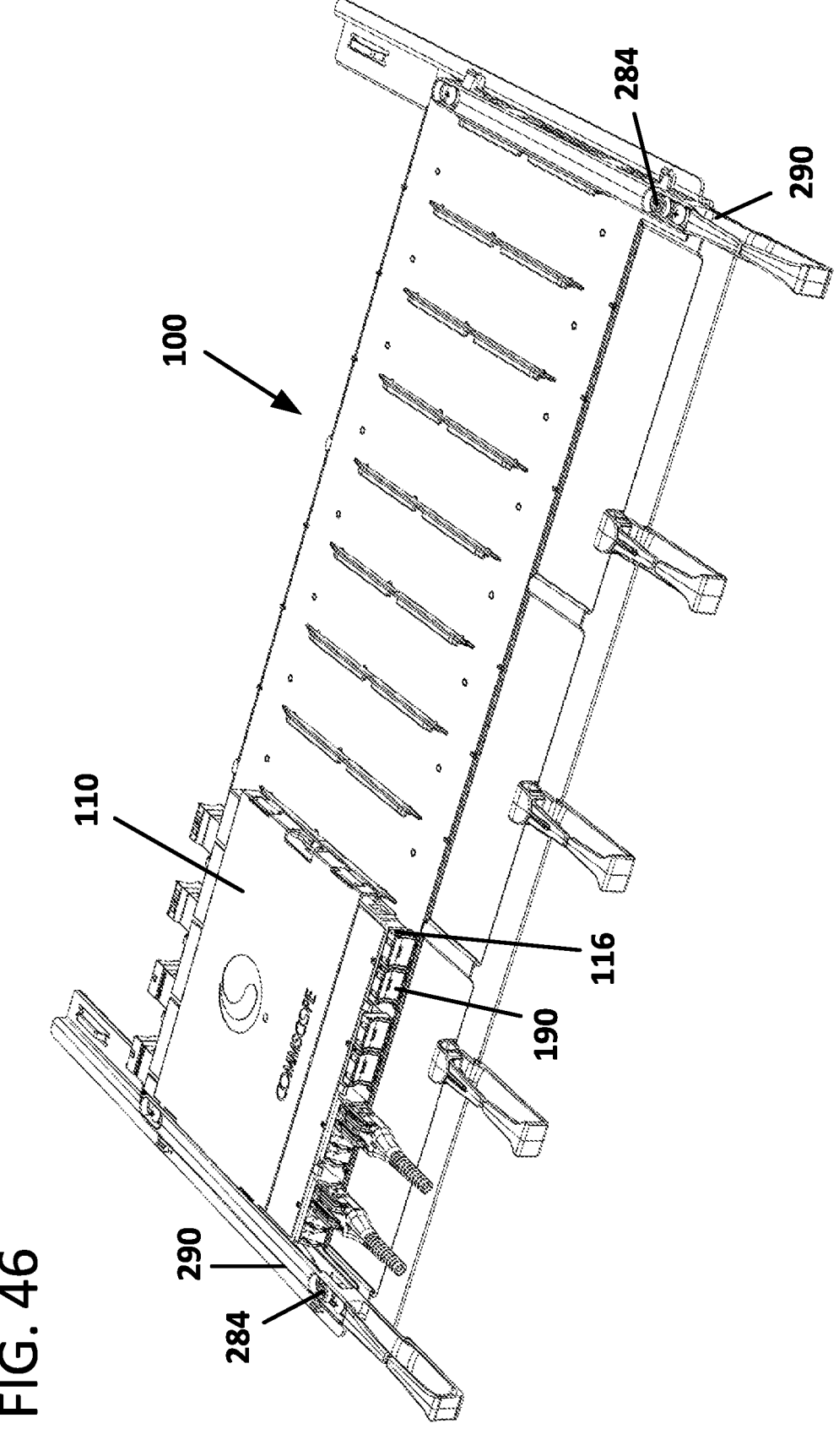
FIG. 46 is a perspective view of the tray arrangement of FIG. 39 with a cassette installed thereon.
Figure 47:
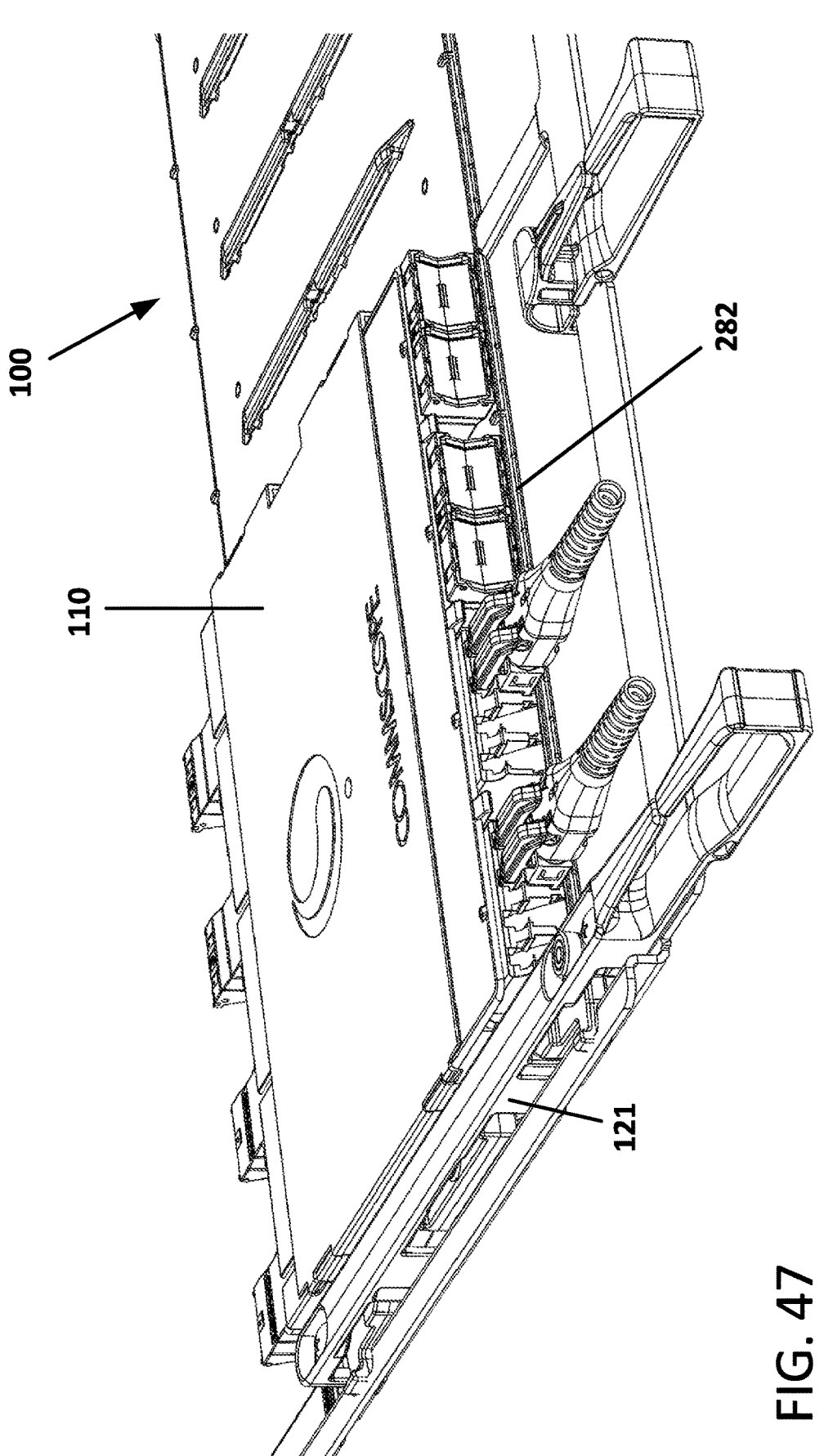
FIG. 47 is an enlarged view of a portion of the tray arrangement of FIG. 46.

FIGS. 46 and 47 show an example cassette 110 installed on an example tray arrangement 100. The cassette 110 is carrying a plurality of front port members 116. In the example shown, the cassette 110 holds a first type of front port member 116 configured to receive a single-fiber plug connector and a second type of front port member 116 configured to receive a multi-fiber plug connector. In other examples, however, the cassette 110 can hold one type of front port member 116. In certain examples, the front ports 115 defined by the front port members 116 are blocked by shutters 190 until a plug connector is received at the port 115.

Figure 48:
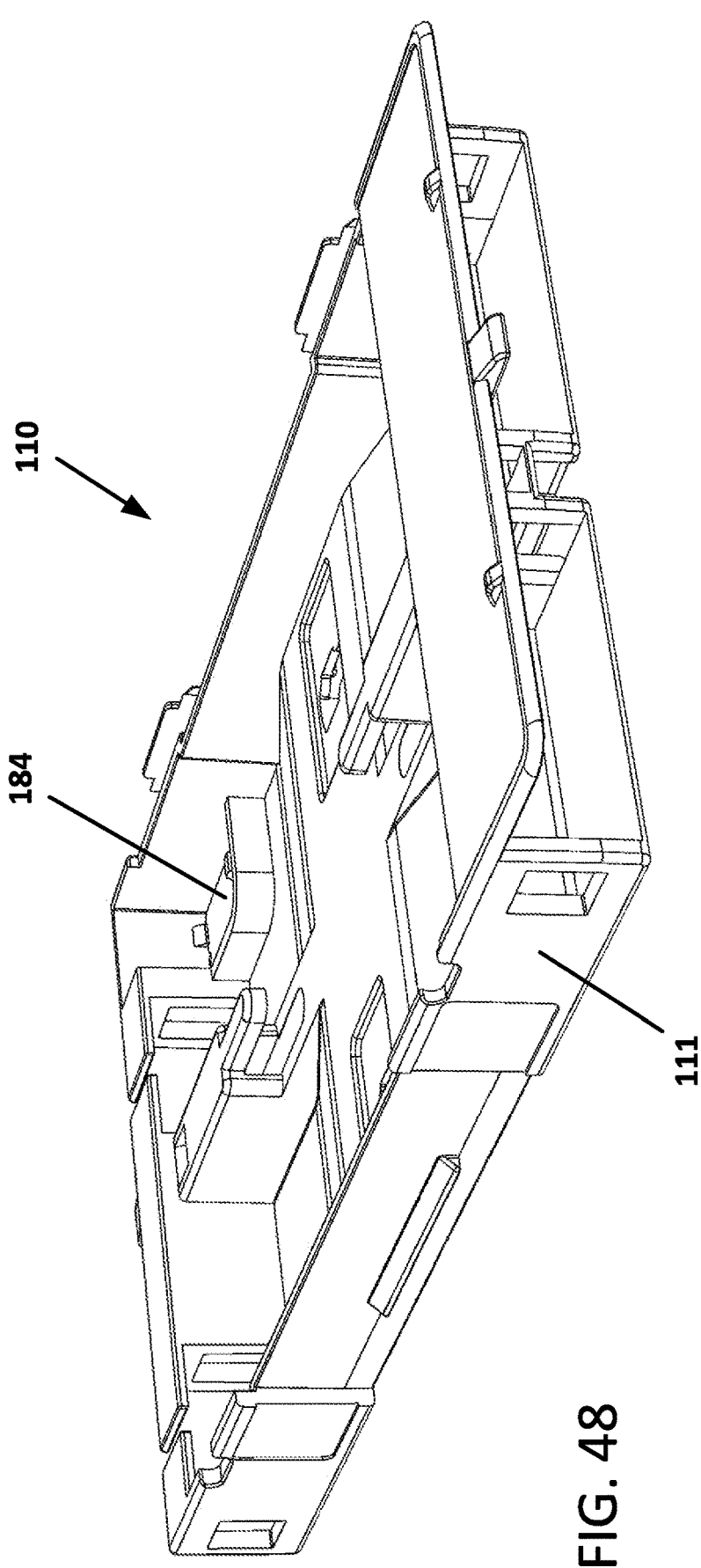
FIG. 48 is a perspective view of an example body of a cassette suitable for mounting to the tray arrangement of FIG. 39 before port members or fibers are installed within the cassette.
Figure 49:
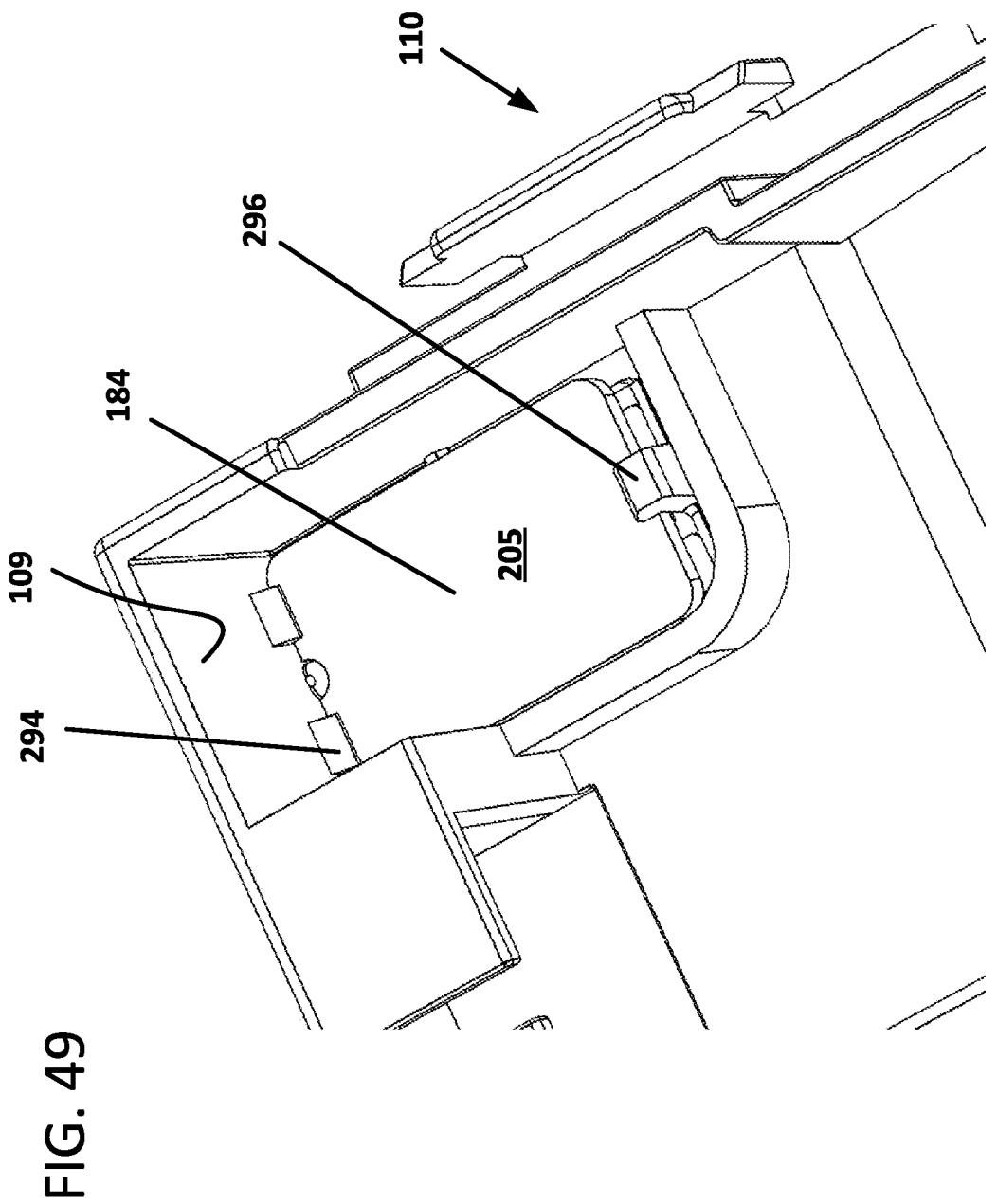
FIG. 49 is an enlarged view of a pocket of the cassette body of FIG. 48 with a cassette identifier mounted therein.
Figure 50:
FIG. 50 shows the spring contacts of the cassette identifier protruding through a bottom of the cassette for engagement with the circuit board on the tray arrangement.
Figure 51:
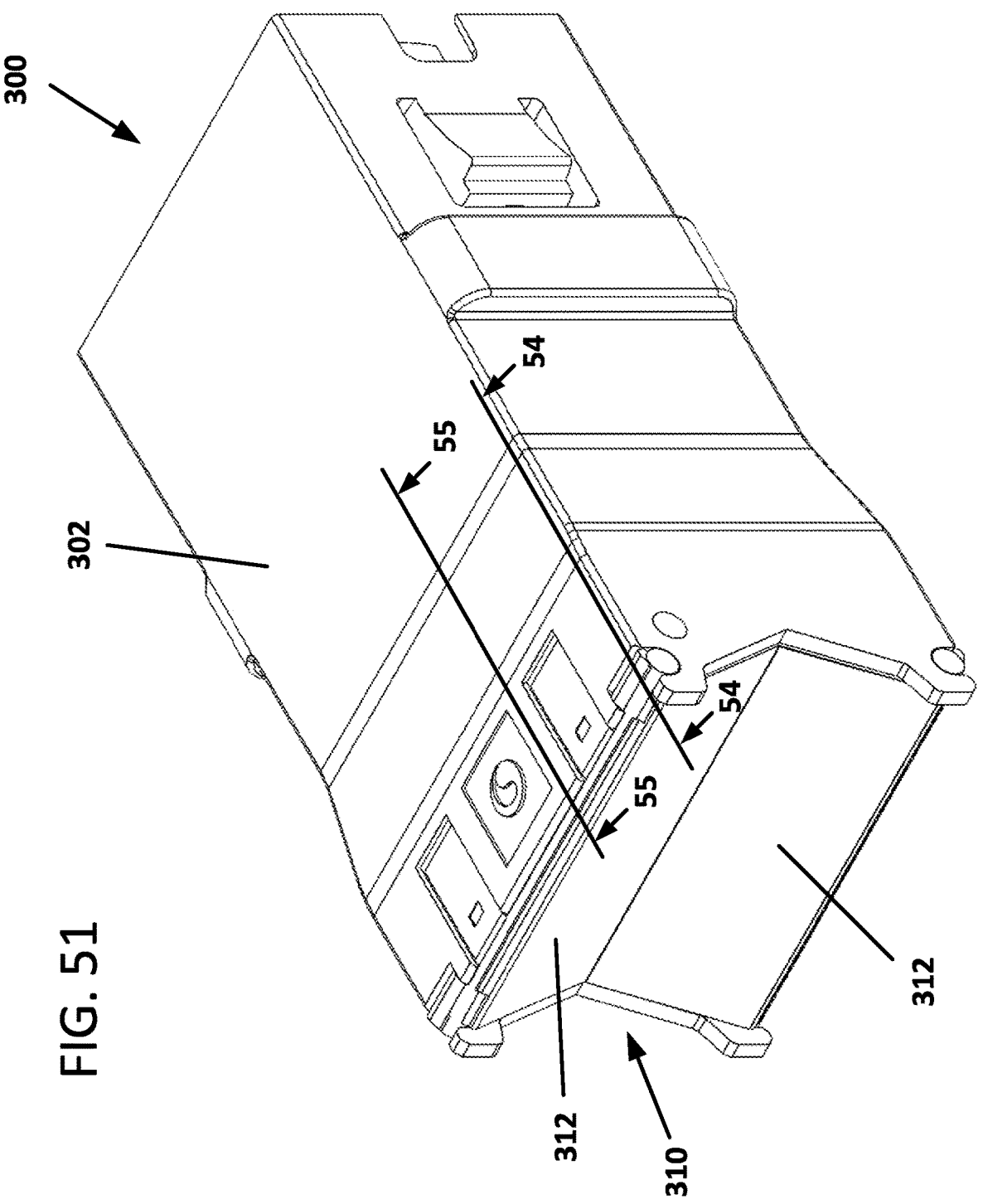
FIG. 51 is a perspective view of an example implementation of a port member configured to receive a multi-fiber plug connector.
Figure 52:
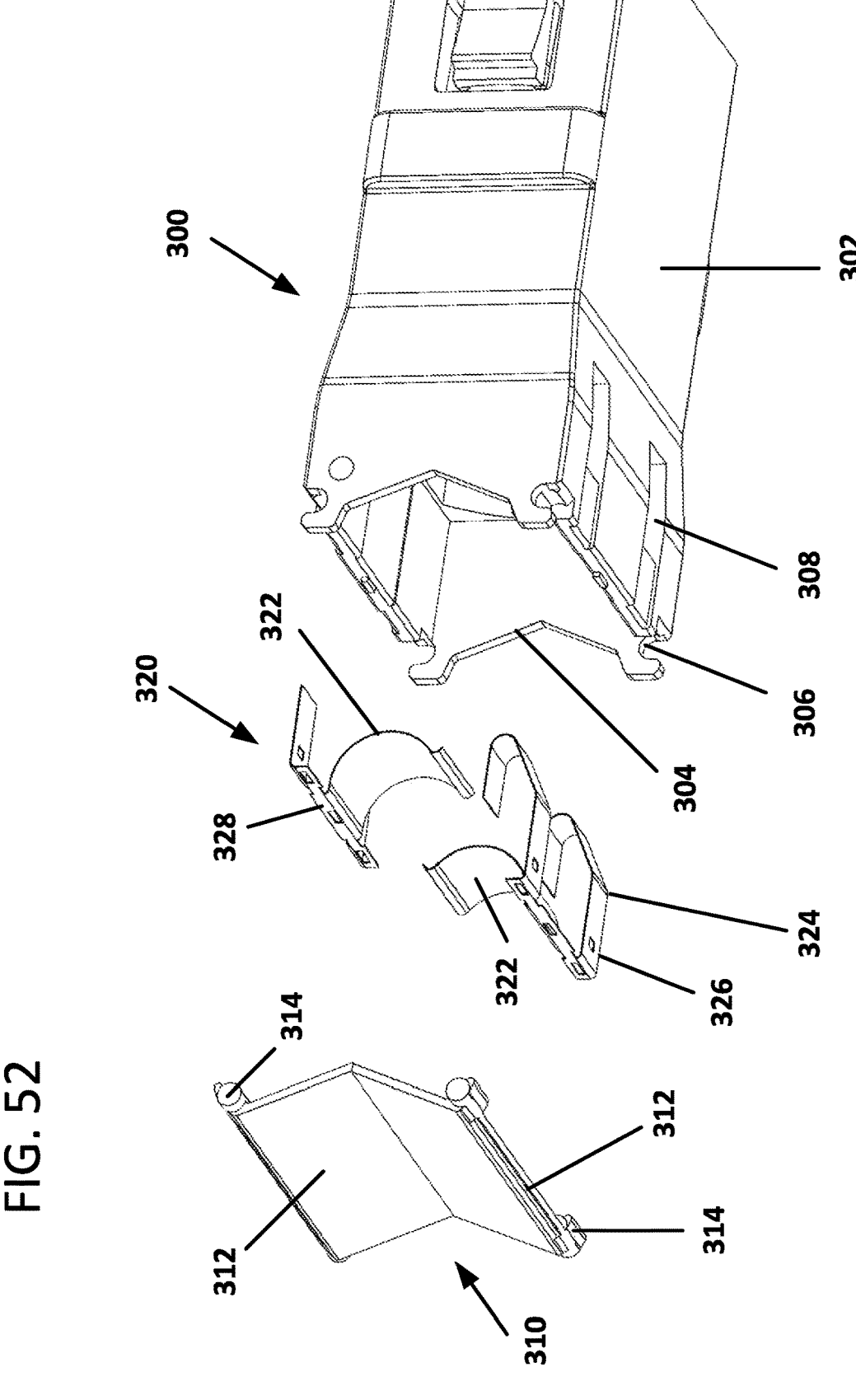
FIG. 52 is a perspective view showing the shutters and springs exploded outwardly from the port member of FIG. 51.
Figure 54:
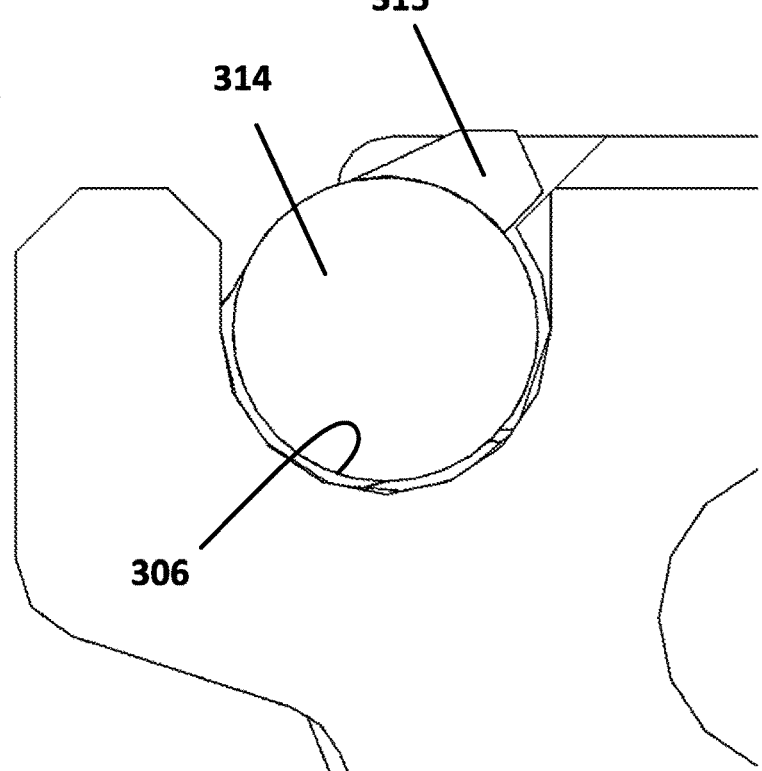
FIG. 54 is cross-sectional image taken of a portion of the port member of FIG. 51 along the 54-54 line.
Figure 55:
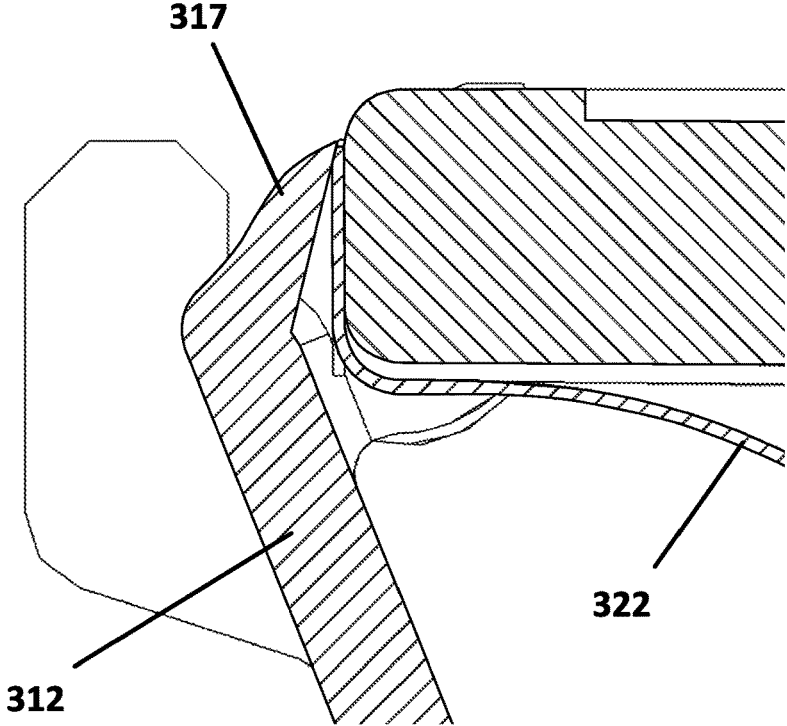
FIG. 55 is cross-sectional image taken of a portion of the port member of FIG. 51 along the 55-55 line.

FIGS. 48-50 illustrate another example cassette identifier 184 mounted within a pocket 109 defined by a body 111 of a cassette 110. The cassette identifier 184 includes a circuit board 205 on which one or more spring contacts 200 are mounted to form the interface with an electronic memory. The electronic memory also is mounted to the circuit board 205. In certain examples, the spring contacts 200 include a power contact to transfer power from the tray arrangement 100 to the electronic memory, a ground contact to connect the electronic memory to ground, and at least one data contact over which data is transferred between the memory and the cassette sensor 156 of the tray arrangement 100. In certain examples, the interface includes a spring contacts 200 for an SDA (i.e., data) line and a spring contact 200 for an SCL (i.e., clock) line. Other configurations are possible.

In certain implementations, the cassette identifier 184 (e.g., the circuit board 205 holding the electronic memory and interface contacts 200) can be snap-fit within the pocket 109. For example, the cassette body 111 may include ramped stops 294 and a flexible latch 296 (see FIG. 49). The cassette identifier 184 is installed by pushing the cassette identifier 184 into the pocket 109 from a top of the cassette body 111 so that the board 205 rides over the ramped stops 294 and deflects the latch arm 296 outwardly. When the board 205 clears the ramped stops 294, the latch arm 296 pushes the board 205 under the ramped stops and snaps over the top of the board 205, thereby inhibiting movement of the board 205 back out of the pocket 209.

In certain implementations, at least portions of the spring contacts 200 protrude downwardly beneath the body 111 of the cassette 110. In certain examples, the spring contacts 200 are curved so that distal ends of the spring contacts 200 extend back towards the cassette body 111. Raising the distal ends of the spring contacts 200 away from the tray arrangement 100 inhibits catching of the spring contacts 200 on the tray arrangement 100 when the cassette 110 is installed on the tray arrangement 100. In certain examples, the spring contacts 200 curve sufficiently for the distal ends of the spring contacts to pass back into the cassette body 111.

Figure 64:
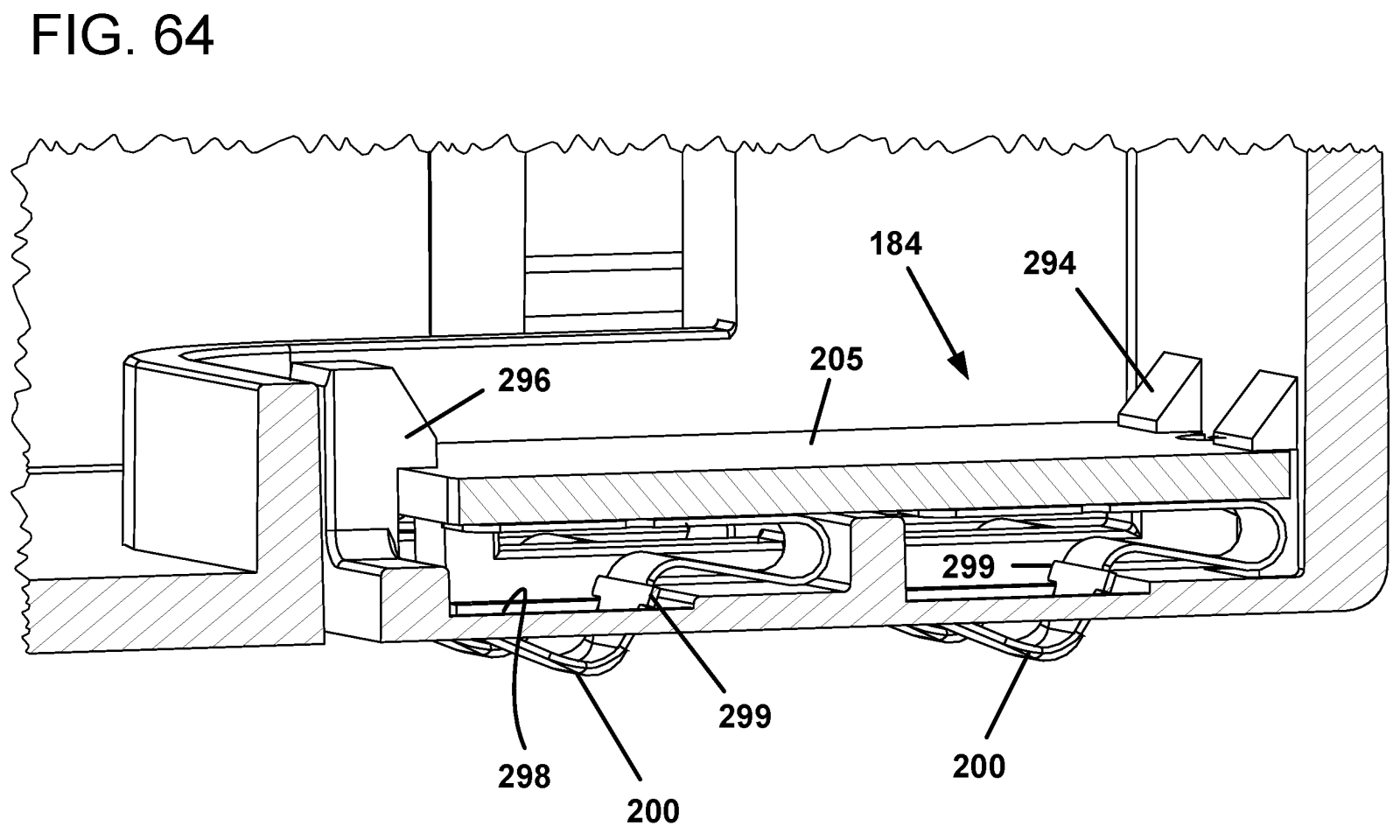

In certain implementations, the spring contacts 200 attached to the cassette identifier 184 all face in a common direction. In certain implementations, the spring contacts 200 are pre-loaded before the cassette 110 is mounted to the tray arrangement 100. For example, each spring contact 200 may include protrusions 299 that engage surfaces 198 within the pocket to maintain the spring contacts 200 in a pre-loaded position against the bias of the spring contacts 200. In certain examples, the protrusions 299 engage recessed surfaces or notches 298 within the pocket. One example of pre-loaded springs is shown in the example cassette identifier 184 of FIG. 64.

Figure 56:
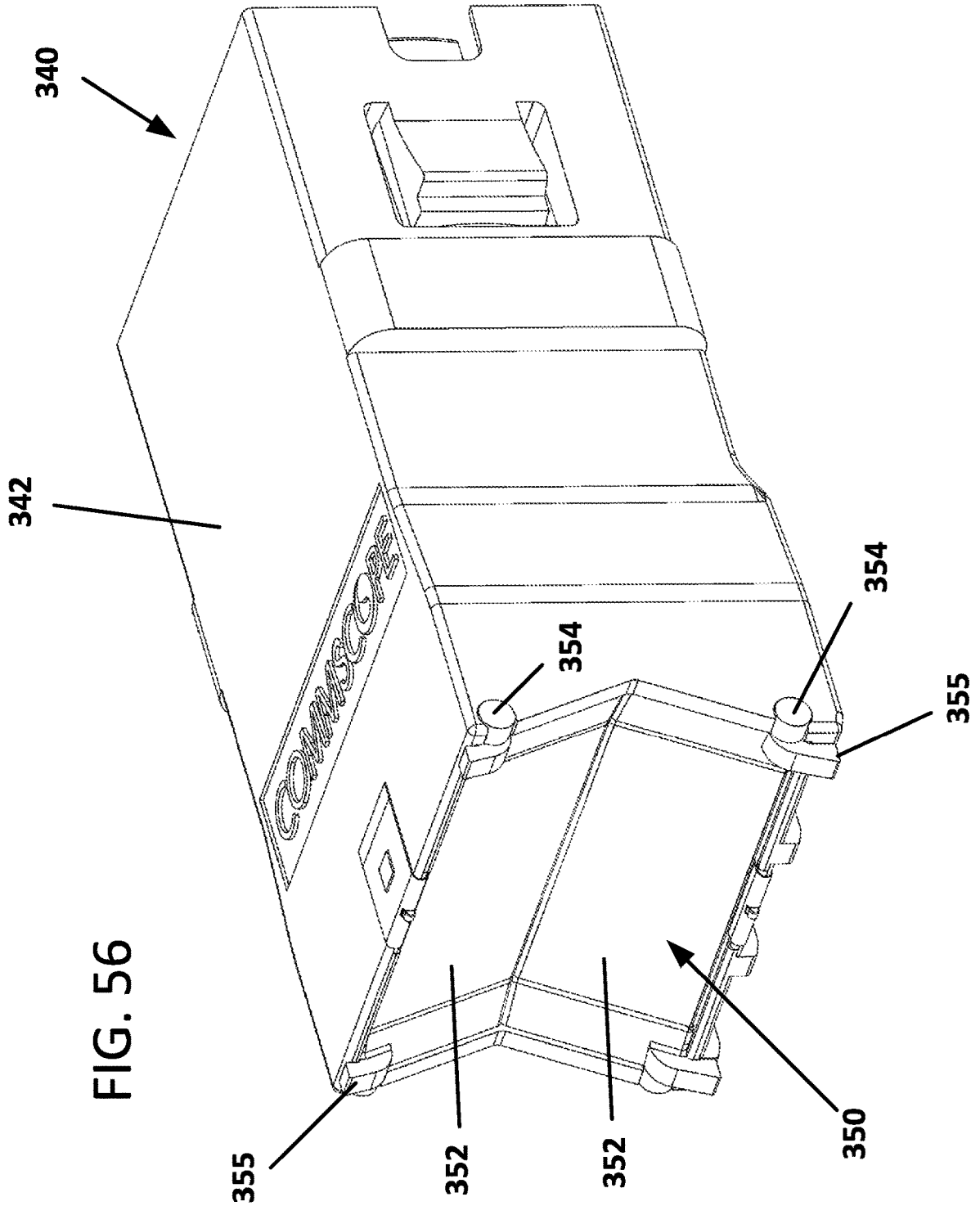
FIG. 56 is a perspective view of another example implementation of a port member configured to receive a multi-fiber plug connector.
Figure 57:
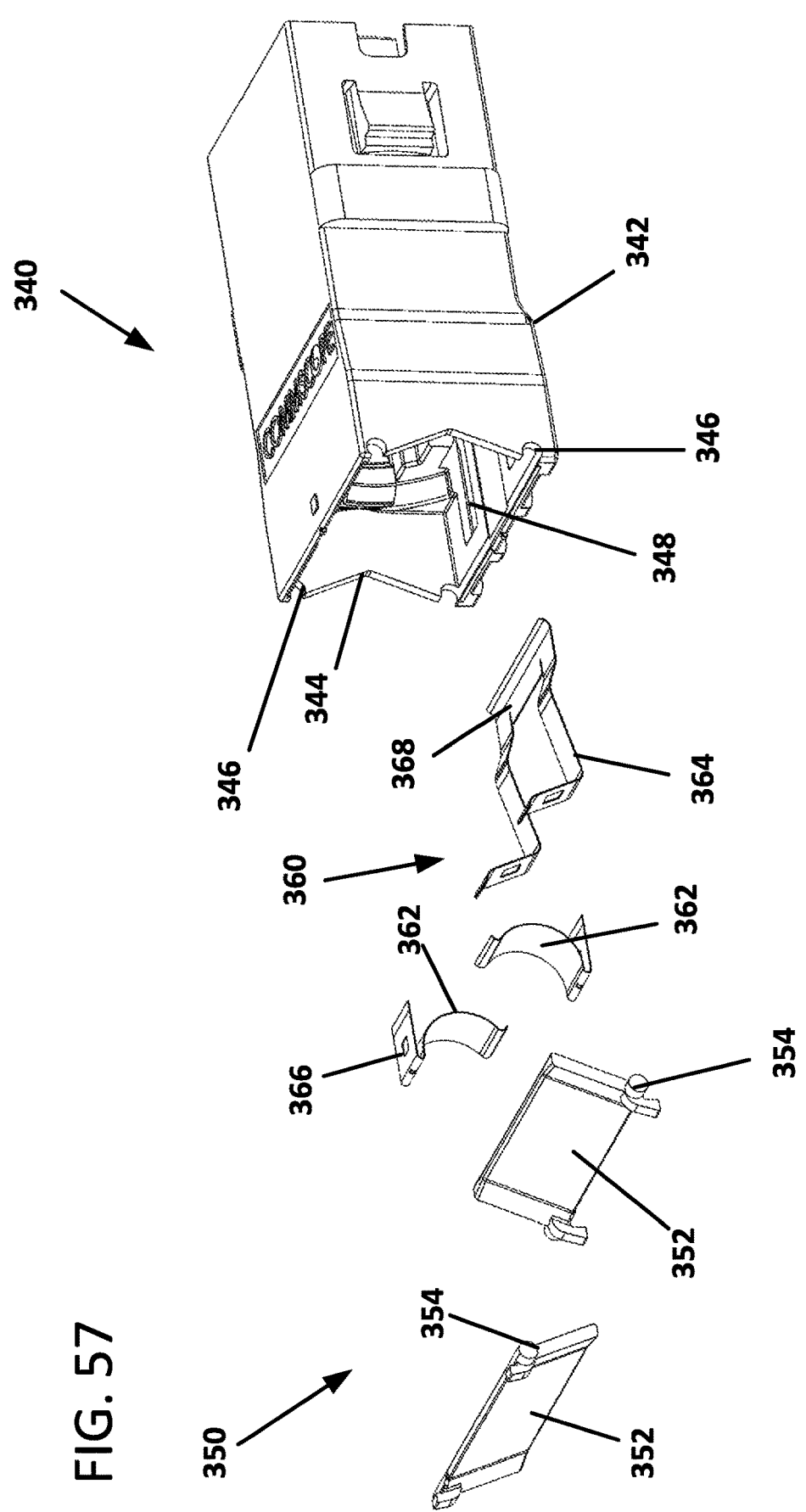
FIG. 57 is a perspective view showing the shutters and springs exploded outwardly from the port member of FIG. 56.
Figure 58:
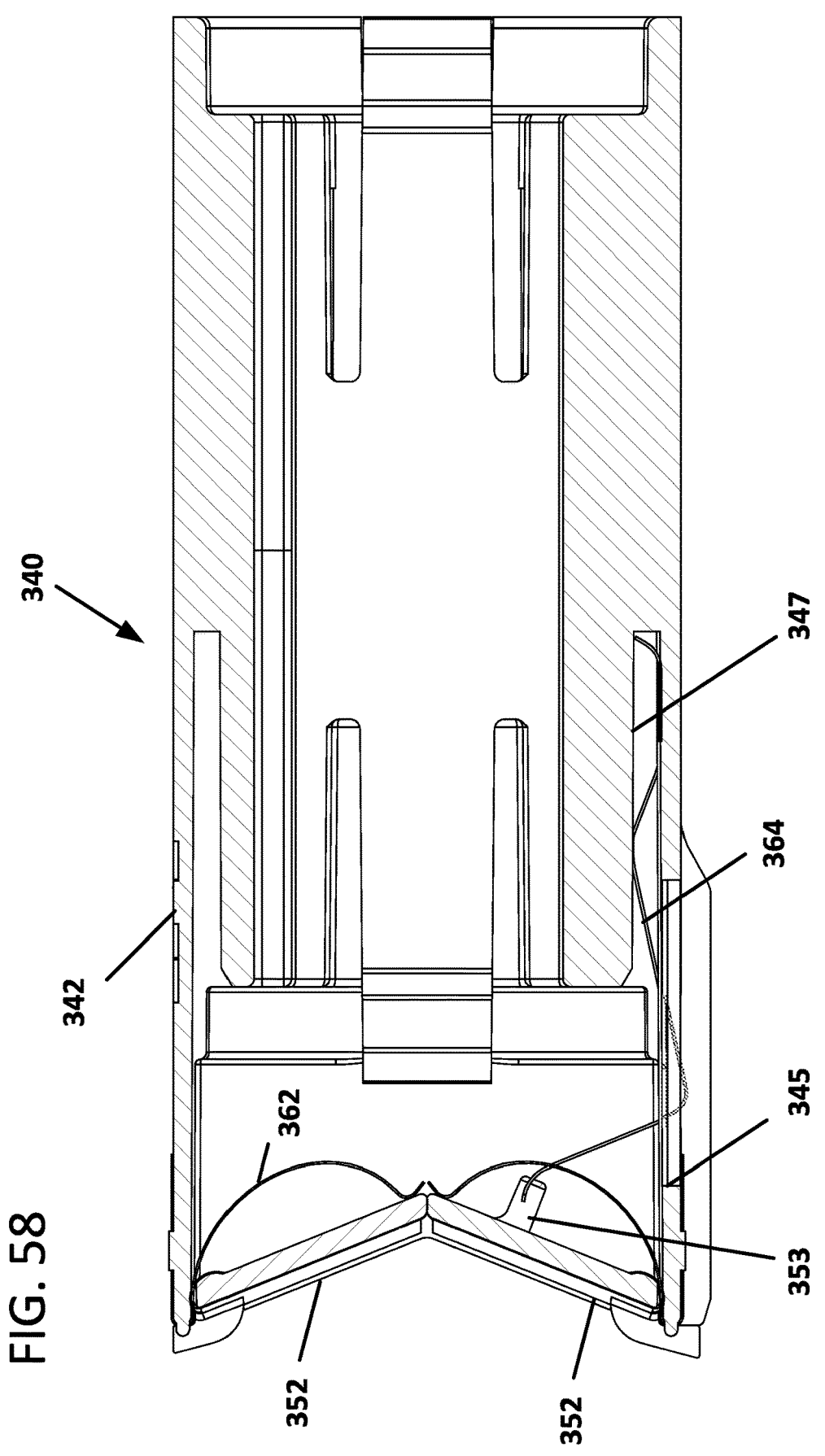
FIG. 58 is an axial cross-section taken of the port member of FIG. 56.
Figure 59:
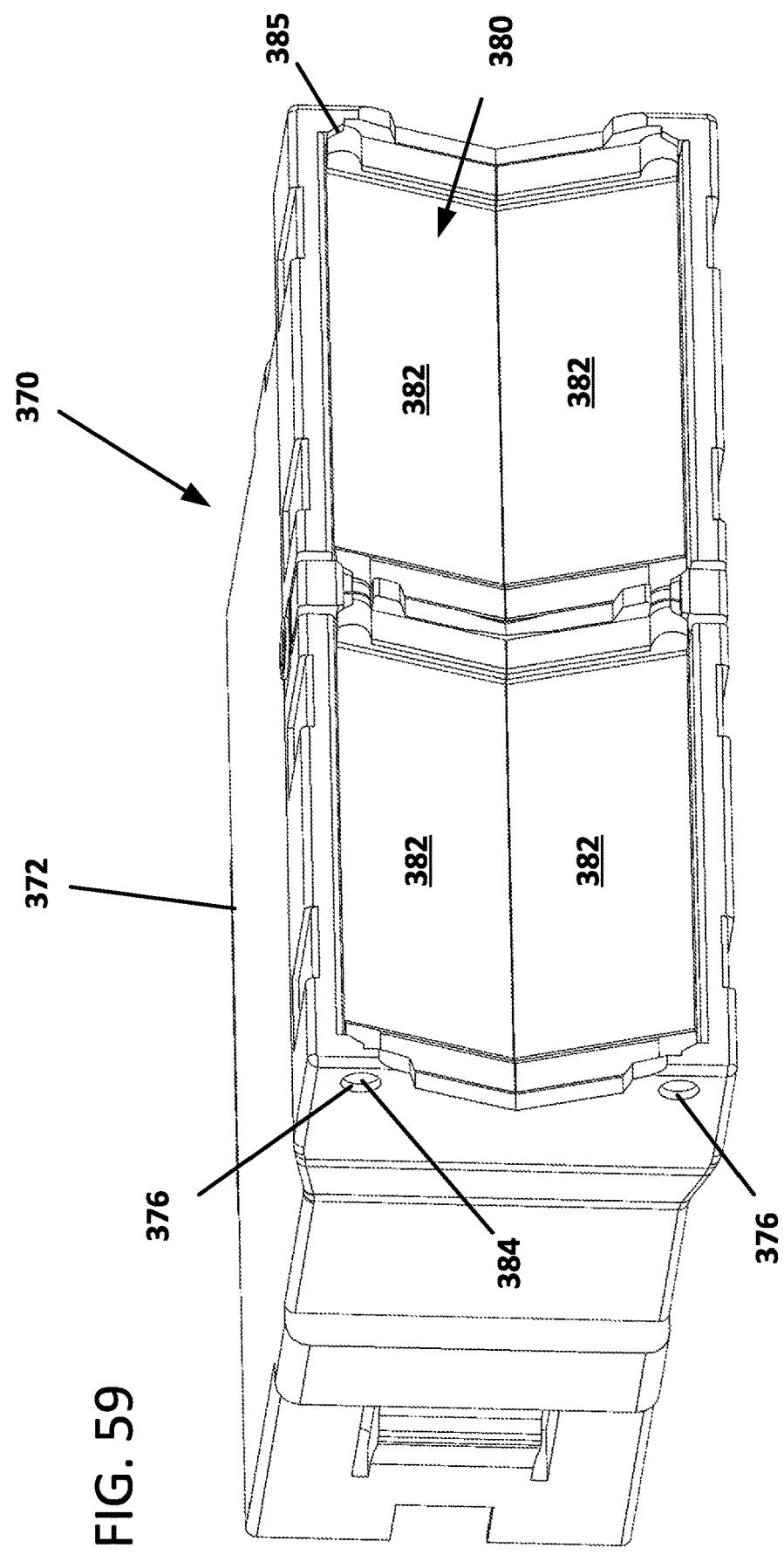
FIG. 59 is a perspective view of an example implementation of a port member configured to receive a multi-fiber plug connectors.
Figure 60:
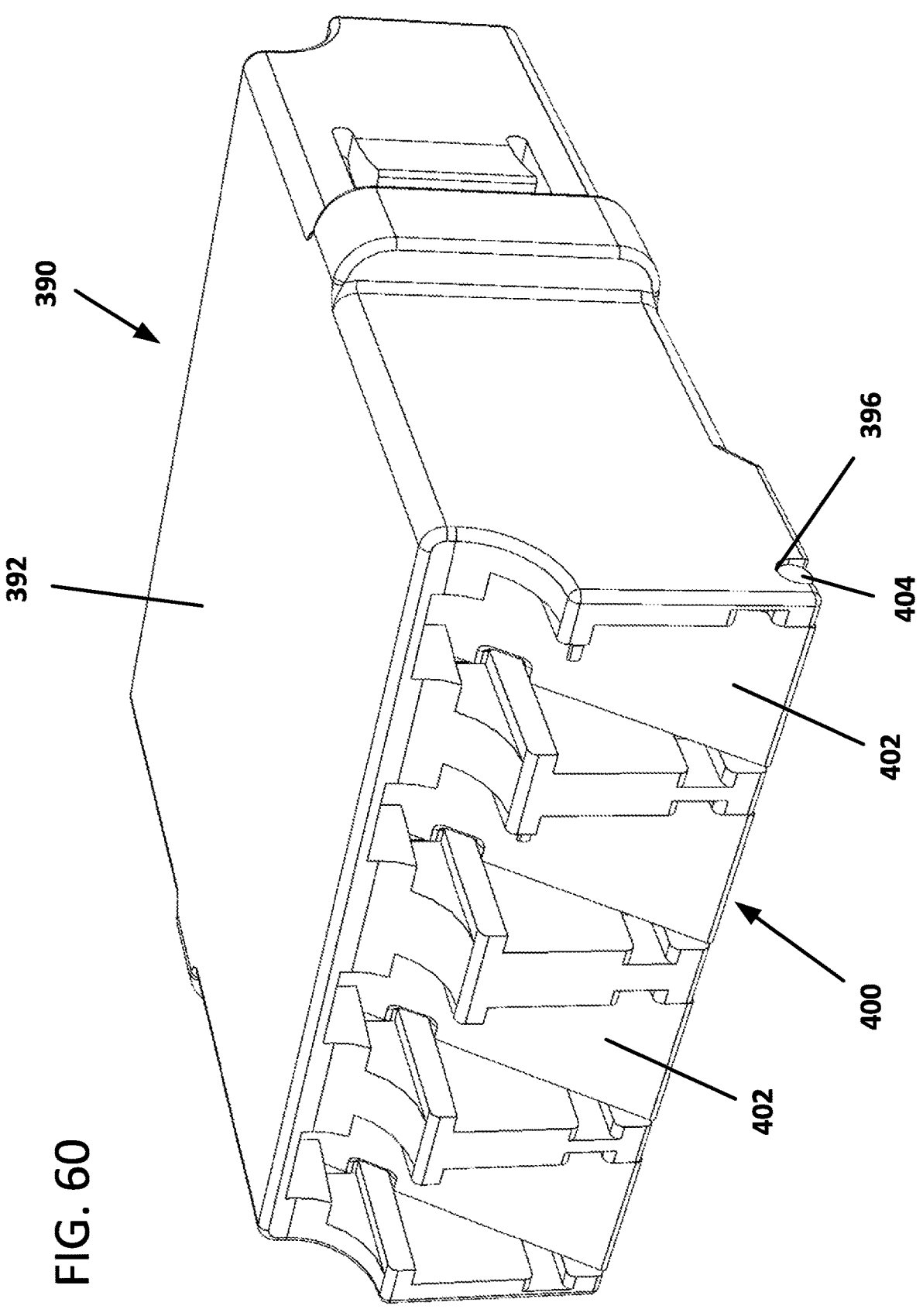
FIG. 60 is a top perspective view of an example implementation of a port member configured to receive single fiber plug connectors or duplex fiber plug connectors.
Figure 61:
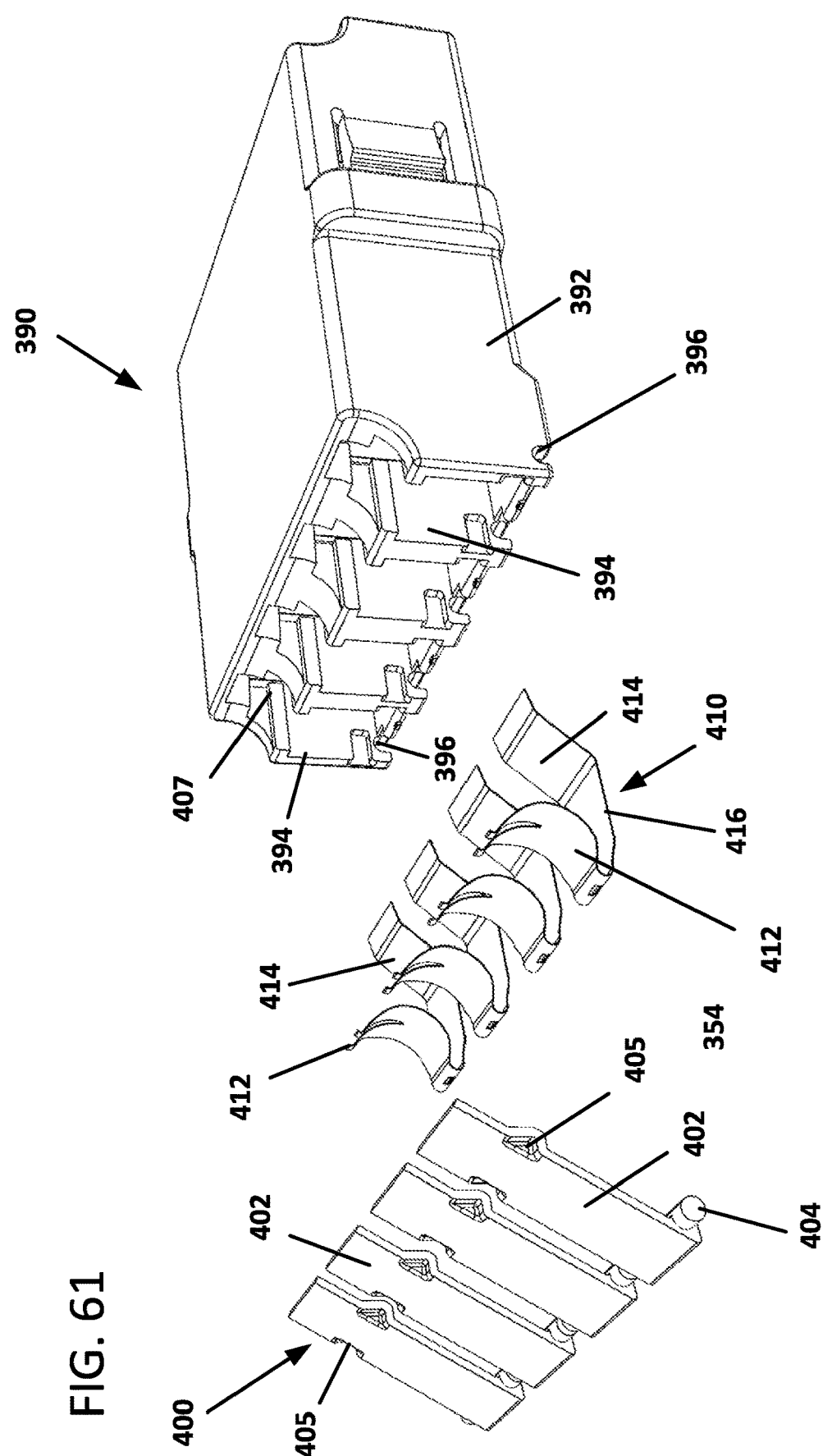
FIG. 61 is a perspective view showing the shutters and springs exploded outwardly from the port member of FIG. 60.
Figure 62:
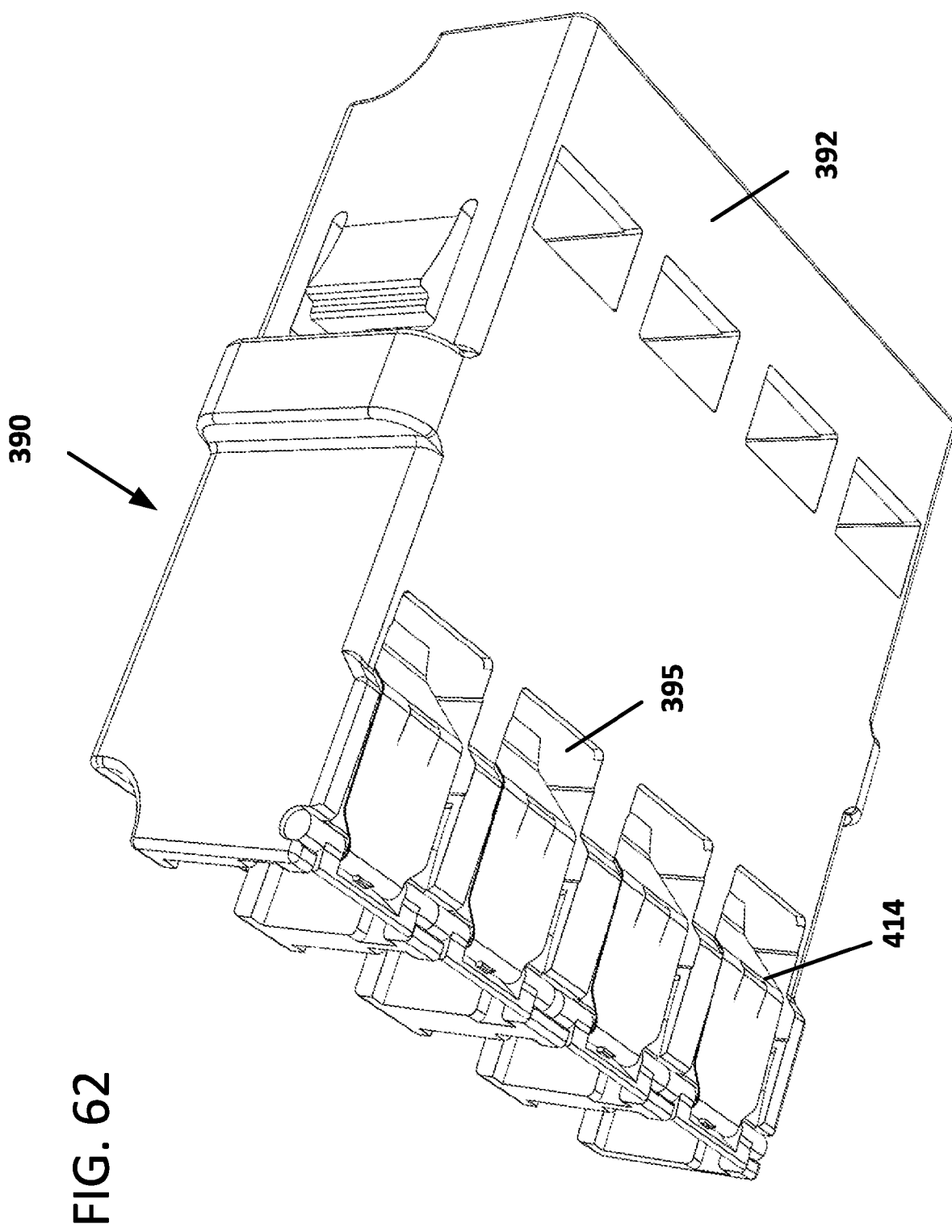
FIG. 62 is a bottom perspective view of the port member of FIG. 60.
Figure 69:
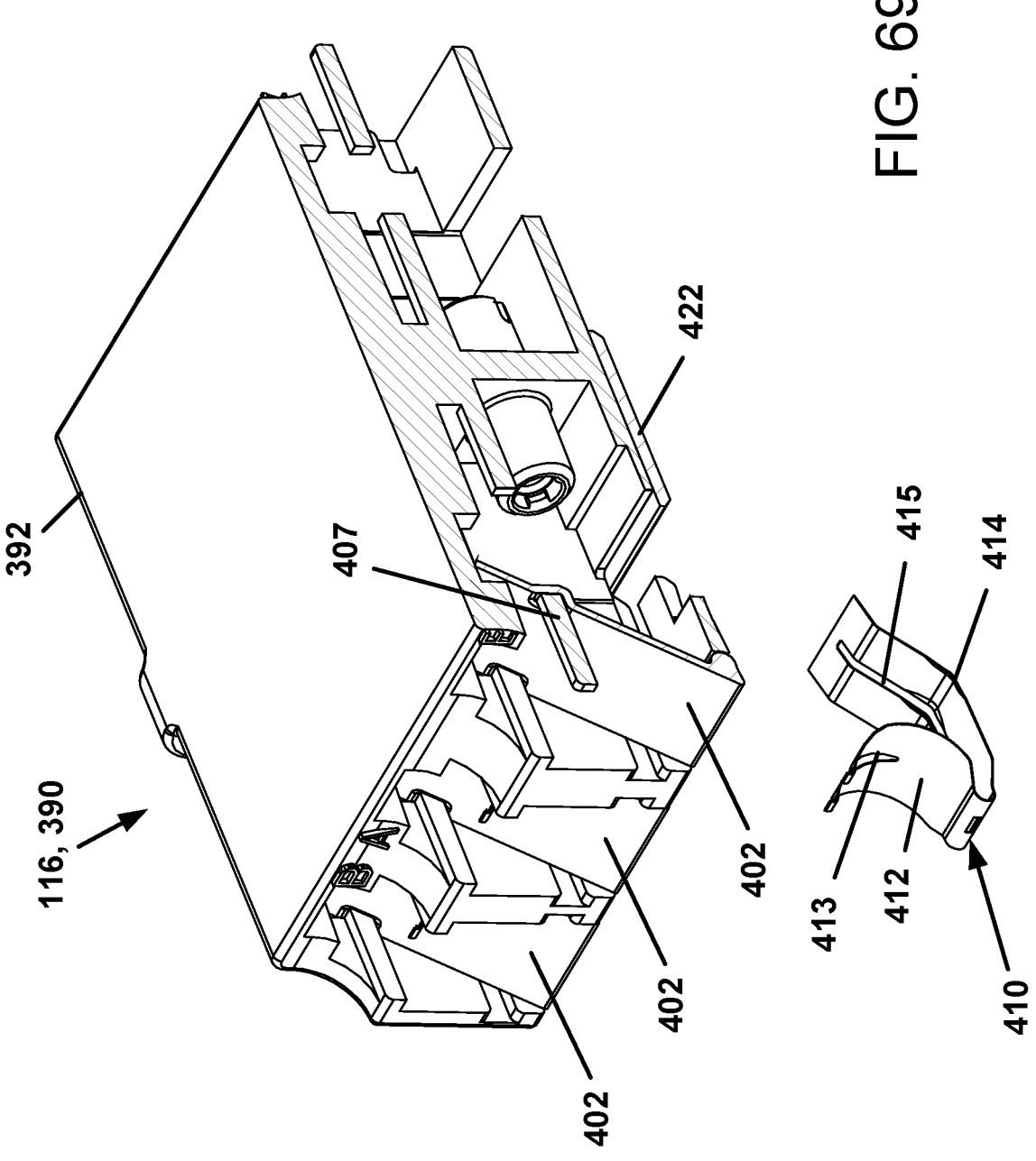
FIG. 69 is a perspective view of an axial cross-sectional of the port member of FIG. 60 with another suitable spring arrangement exploded outwardly for ease in viewing.
Figure 70:
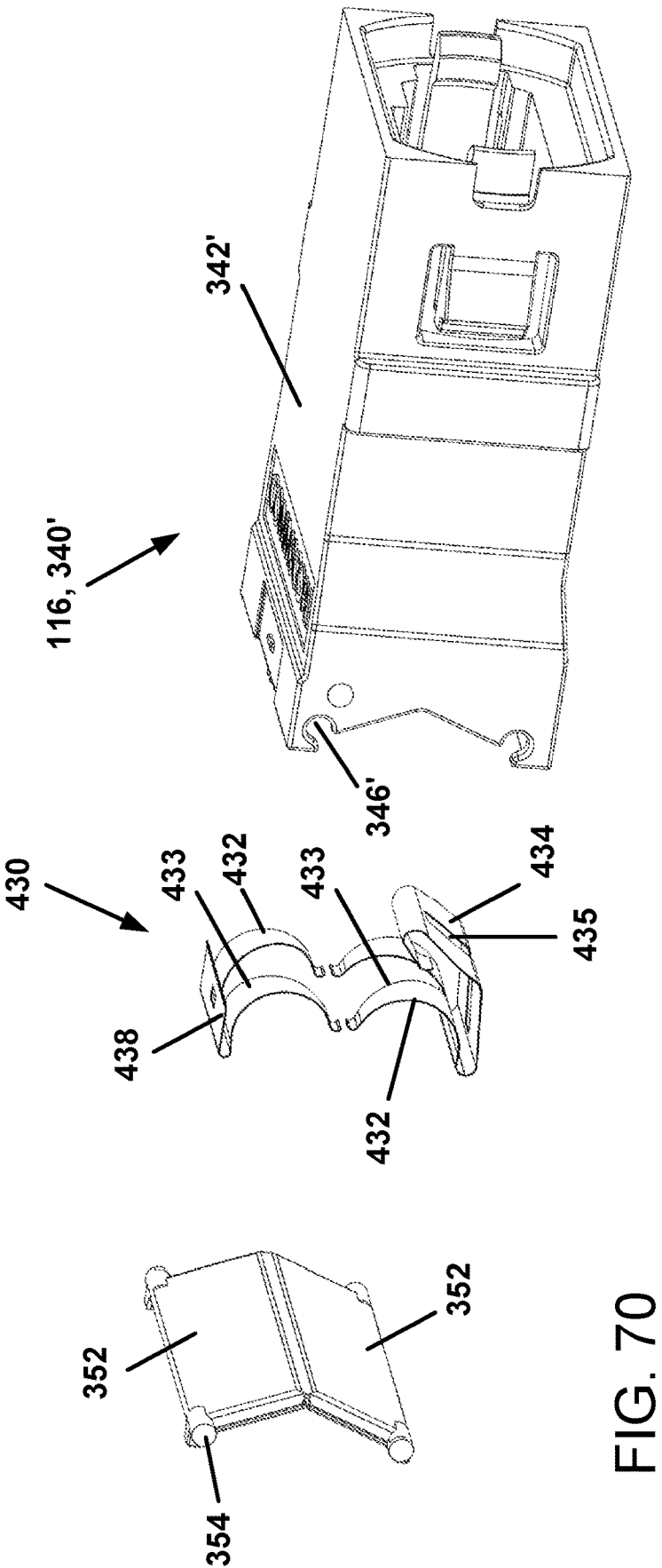
FIG. 70 is a perspective view of another example port member with the corresponding shutters and spring arrangement exploded outwardly for ease in viewing.

FIGS. 51-63 and 69-71 illustrate example implementations of port members 116 suitable for use in the cassettes 110 to define the front ports 115. At least some of the port members 116 of FIGS. 51-62 also are suitable for defining the rear ports 117 of the cassettes 110. FIGS. 51-55 illustrate an example implementation 300 of a port member 116 configured to receive a multi-fiber plug connector (e.g., an MPO plug connector). FIGS. 56-58 illustrate another example implementation 340 of a port member 116 configured to receive a multi-fiber plug connector (e.g., an MPO plug connector). FIG. 59 illustrates an example implementation 370 of a port member 116 configured to receive multiple multi-fiber plug connectors (e.g., MPO plug connectors). FIGS. 60-63 illustrate an example implementation 390 of a port member 116 configured to receive a plurality of single-fiber or duplex plug connectors (e.g., an LC or duplex LC plug connector). FIG. 69 illustrates another example spring arrangement 410 for use in the port member 390. FIG. 70 shows another example spring arrangement 430 for use with another example port member 340'. FIG. 71 illustrates two alternative spring arrangements—the spring arrangement 430 of FIG. 70 and another example spring arrangement 440—suitable for use with the port member 370.

The port member 300, 340, 370, 390 includes an adapter body 302, 342, 372, 392 defining a front aperture 304, 344, 374, 394 through which the plug connector can be received. A shutter arrangement 310, 350, 380, 400 is disposed at the front aperture 304, 344, 374, 394 to block the front aperture 304, 344, 374, 394 when no plug connector is received at the front aperture 304, 344, 374, 394. The shutter arrangement 310, 350, 380, 400 includes a shutter 312, 352, 382, 402 that pivotally mounts to the adapter body 302, 304, 344, 374, 394. Each shutter 312, 352, 382, 402 is mounted to the adapter body 302, 342, 372, 392 to move (e.g., pivot) between an open position that provides access to the port 115 and a closed position that blocks access to the port 115. In certain examples, the shutter arrangement 310, 350, 380, 400 includes first and second shutters 312, 352, 382 that cooperate to cover the front aperture 304, 344, 374.

In certain implementations, each shutter 312, 352, 382, 402 includes hinge pins 314, 354, 384, 404 that mount within a groove or notch 306, 346, 376, 396 defined by the adapter body 302, 304, 344, 374, 394. In the examples shown in FIGS. 51 and 60, the hinge pins 314, 404 snap into the notches 306, 396 from the bottom of the adapter body 302, 392. In the example shown in FIG. 51, some of the shutters also snap into the grooves 306 from the top of the adapter body 302. In the example shown in FIG. 56, the hinge pins 354 snap into the notches 346 from the front of the adapter body 342. In the example shown in FIG. 70, the hinge pins 354 snap past overhangs and into notches 346' from the front of the adapter body 342'. In the example shown in FIG. 59, the hinge pins 384 snap into holes 376 defined at outer walls of the adapter body 372 and into notches defined at inner walls of the adapter body 372.

In certain implementations, the shutters 312, 352, 382, 402 of the shutter arrangement 310, 350, 380, 400 are biased to the closed position by one or more biasing springs 322, 362, 412. In certain implementations, the shutters 312, 352, 382, 402 are attached to a spring arrangement 320, 360, 410 that biases the shutters 312, 352, 382, 402 to the closed position. In certain implementations, the spring arrangement 320, 360, 410 also provides spring contacts 324, 364, 414 by which the presence of a plug connector at the port 115 can be detected. For example, insertion of the plug connector into the port 115 pushes the shutter 312, 352, 382, 402 to the open position and thereby presses the spring contact 324, 364, 414 against a pad on the circuit board 142.

In some implementations, the biasing springs 322, 412 and the spring contacts 324, 414 form integrated spring members 326, 366. For example, in FIG. 52, a first spring member 326 includes a biasing spring 322 for the lower shutter 312 and two spring contacts 324 disposed on opposite sides of the biasing spring 322. A second spring member 328 includes only a biasing spring 322 to close the upper shutter 312. In the example shown in FIG. 61, separate spring members 416 each include a biasing spring 412 and a spring contact 414. In the example shown in FIG. 57, the biasing springs 362 are each formed by a respective spring member 366 while the spring contacts 364 are formed by a common spring member 368.

In certain implementations, the biasing springs 322, 362, 412 and/or the spring contacts 324, 364, 414 define slits extending through a central portion. For example, in FIGS. 69 and 70, the biasing springs 412, 432 defines slits 413, 433 that enables signals passing through the port member 116, 390 to extend past the biasing springs 412, 432 through the slit 413, 433 to light up the shutters 402, 352. In certain examples, the spring contacts 414, 434, 444 also defines a slit 415, 435, 445.

Figure 63:
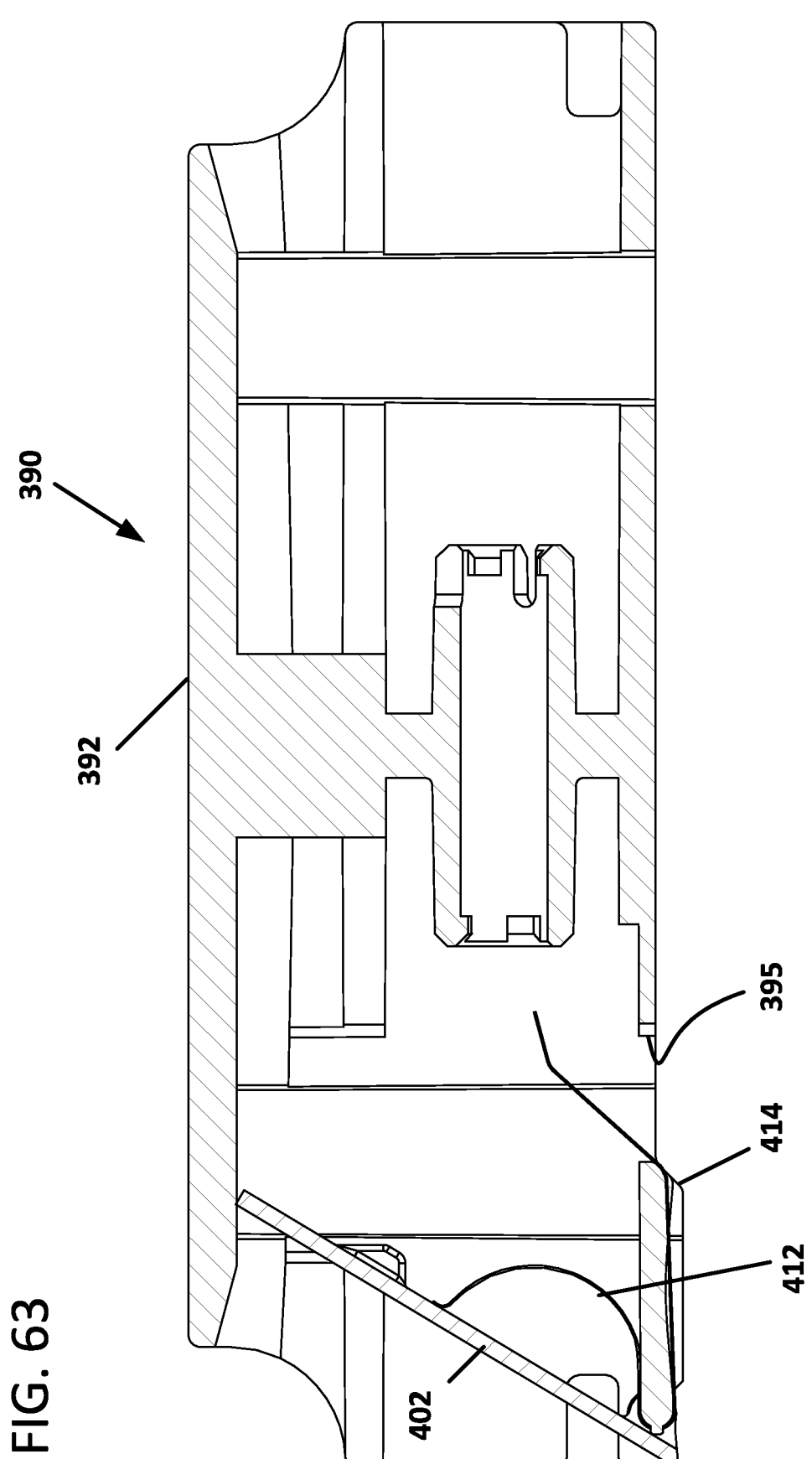
FIG. 63 is an axial cross-section taken of the port member of FIG. 60.
Figure 65:
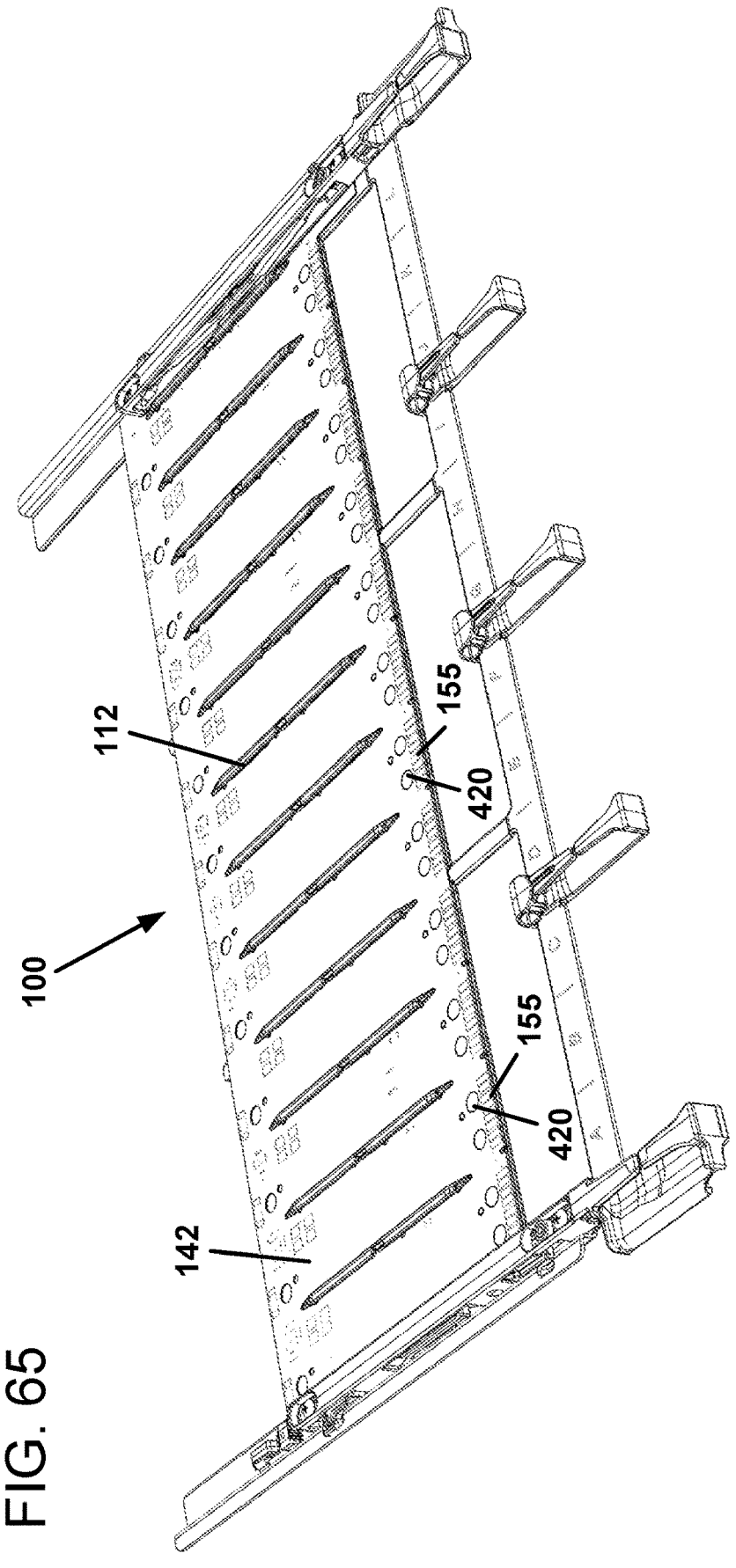
FIG. 65 illustrates another example tray arrangement including a magnetic arrangement to enhance engagement between port sensors of the tray arrangement and contacts carried by the cassettes.
Figure 53:
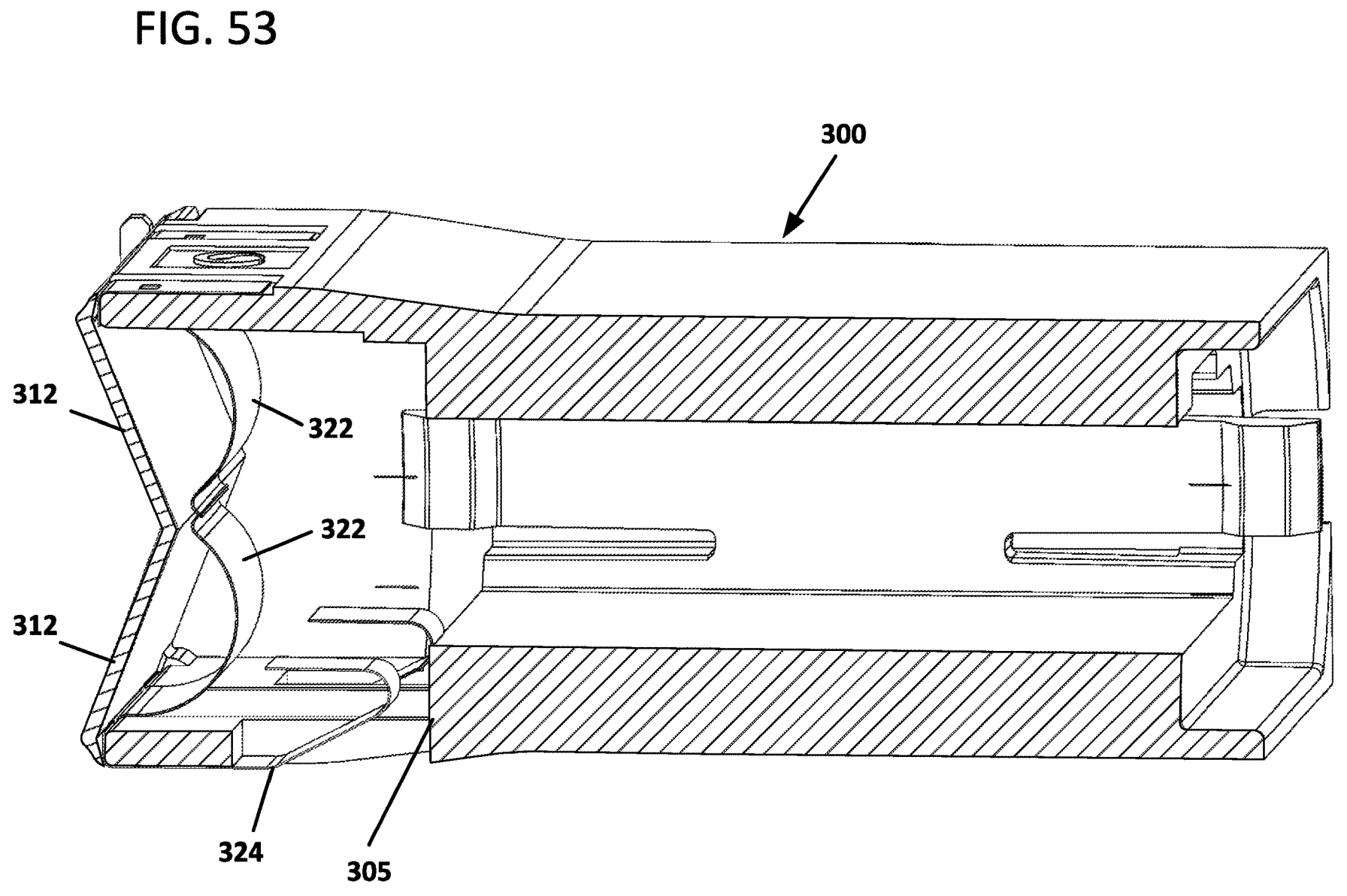

As shown in FIGS. 53, 58, and 63, each adapter body 302, 342, 372, 392 defines one or more apertures 305, 345, 395 through which the spring contact 324, 364, 414 protrudes to contact the circuit board 142. The apertures 305, 345, 395 are disposed at a bottom surface of the adapter body 302, 342, 392 towards a front of the adapter body 302, 342, 392.

As shown in FIGS. 53 and 63, the spring contacts 324, 414 enter the adapter body 302, 392 through the apertures 305, 395. When a plug is inserted into the port 115, the plug deflects the bottom shutter 312 downwardly towards the closed position. The bottom shutter 312, 402 engages the distal ends of the spring contacts 324, 414 and deflects an intermediate portion of the spring contacts 324, 414 towards the circuit board 142 by pushing a portion of the spring contacts 324, 414 through the aperture 305, 395.

In the example shown in FIG. 58, the adapter body 342 defines a cavity 347 that extends along a depth of the adapter body 342 and opens towards the front of the adapter body 342. The spring contact 364 extends from a first end attached to the bottom shutter 352 at a mount 353 to a second end disposed within the cavity 347. In certain examples, the second end of the spring contact 364 is movable (e.g., slidable) within the cavity 347. When the bottom shutter 352 is deflected to the closed position, the first end of the spring contact 364 is deflected inwardly and downwardly. However, movement of the second end of the spring contact 364 is limited within the cavity 347. Accordingly, continued deflection of the first end causes an intermediate portion of the spring contact 364 to pass through the aperture 345 to engage the circuit board 142.

In certain implementations, the shutters 312, 352, 382, 402 include limiters 315, 355, 385, 405 that engage structure on the adapter body 302, 342, 372, 392 to inhibit over travel of the shutters 312, 352, 382, 402 past the closed position. In the examples shown in FIGS. 54 and 55, the hinge pins 314 of the shutters 312 include a limiter 315 that protrudes outwardly from the hinge pin 314. The limiter 315 travels between opposite sides of the notch 306 during movement of the shutter 312 between open and closed positions. In certain examples, the shutter 312 also includes a second limiter 317 extending between the hinge pins 314 (see FIG. 55). The second limiter 317 is configured to engage the front of the adapter body 302 when the shutter 312 is disposed in the closed position to inhibit movement of the shutter 312 beyond the closed position.

In the example shown in FIG. 56, the limiters 355 are offset from the hinge pins 354 and configured to engage the front of the adapter body 342 when the shutter 352 is disposed in the closed position to inhibit movement of the shutter 352 beyond the closed position. In FIG. 59, the hinge pin 384 defines a notched or recessed region 385 that receives a rail or ledge protruding inwardly from an interior sidewall of the adapter body 372 when the shutter 382 is disposed in the closed position to inhibit movement of the shutter 382 beyond the closed position. In the example shown in FIG. 61, each shutter 402 defines a notch or recess 405 that is configured to engage a rail or other inward protrusion 407 from the interior walls of the adapter body 392 when the shutter 402 is disposed in the closed position to inhibit movement of the shutter 402 beyond the closed position.

Referring to FIGS. 65-68, one or more magnets 420 can be added to the tray arrangement 100 to enhance contact between the shutter biasing springs 322, 362, 412 and the plug sensors 155. In certain examples, a magnet 420 is provided for each bay 114. In certain examples, a magnet 420 is provided for each duplex port spacing. In the example shown in FIG. 65, two magnets 420 are provided at each bay 114 adjacent the plug sensors 155.

Figure 68:
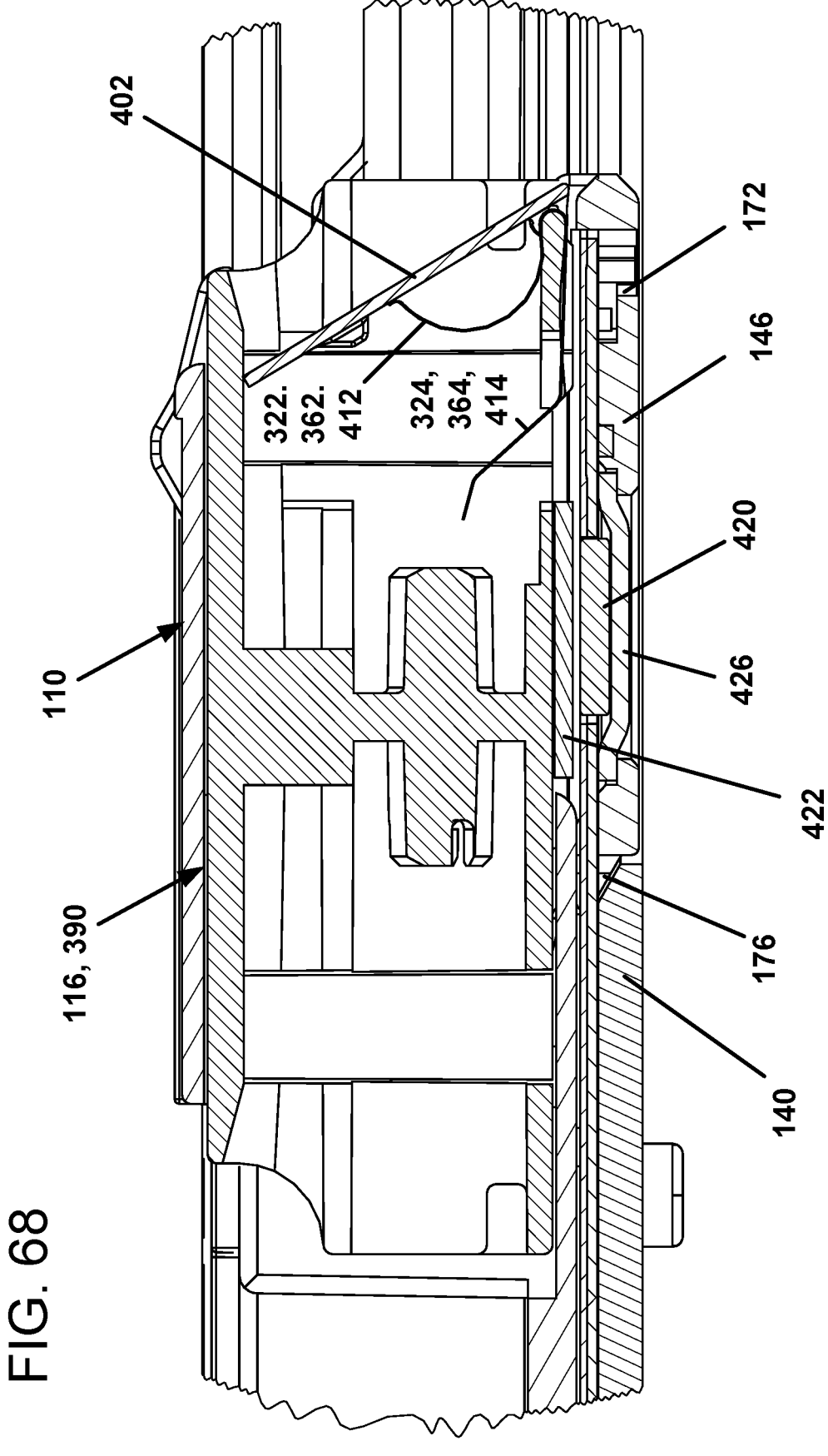
FIG. 68 is a cross-sectional view of a cassette mounted to the tray arrangement of FIG. 65, where a port member carried by the cassette aligns with the bezel of FIGS. 66-67 so that a ferromagnetic plate of the port member aligns with a magnet of the tray arrangement.

As shown in FIG. 68, a cassette 110 carrying one or more port members 116 also may carry a sheet or other structure 422 formed of a ferromagnetic metal. The sheet of other structure 422 aligns sufficiently with the magnet 420 when the cassette 100 is mounted to the tray arrangement 100 for the magnet 420 to attract the sheet or other structure 422 towards the magnet 420. The attraction between the magnet 420 and the sheet or other structure 422 pulls the body of the port member 116 against the circuit board 142. Accordingly, engagement between the spring contacts 324, 364, 414 within the port member 116 and the plug sensors 155 on the circuit board 142 is enhanced.

Figures 66, 67:
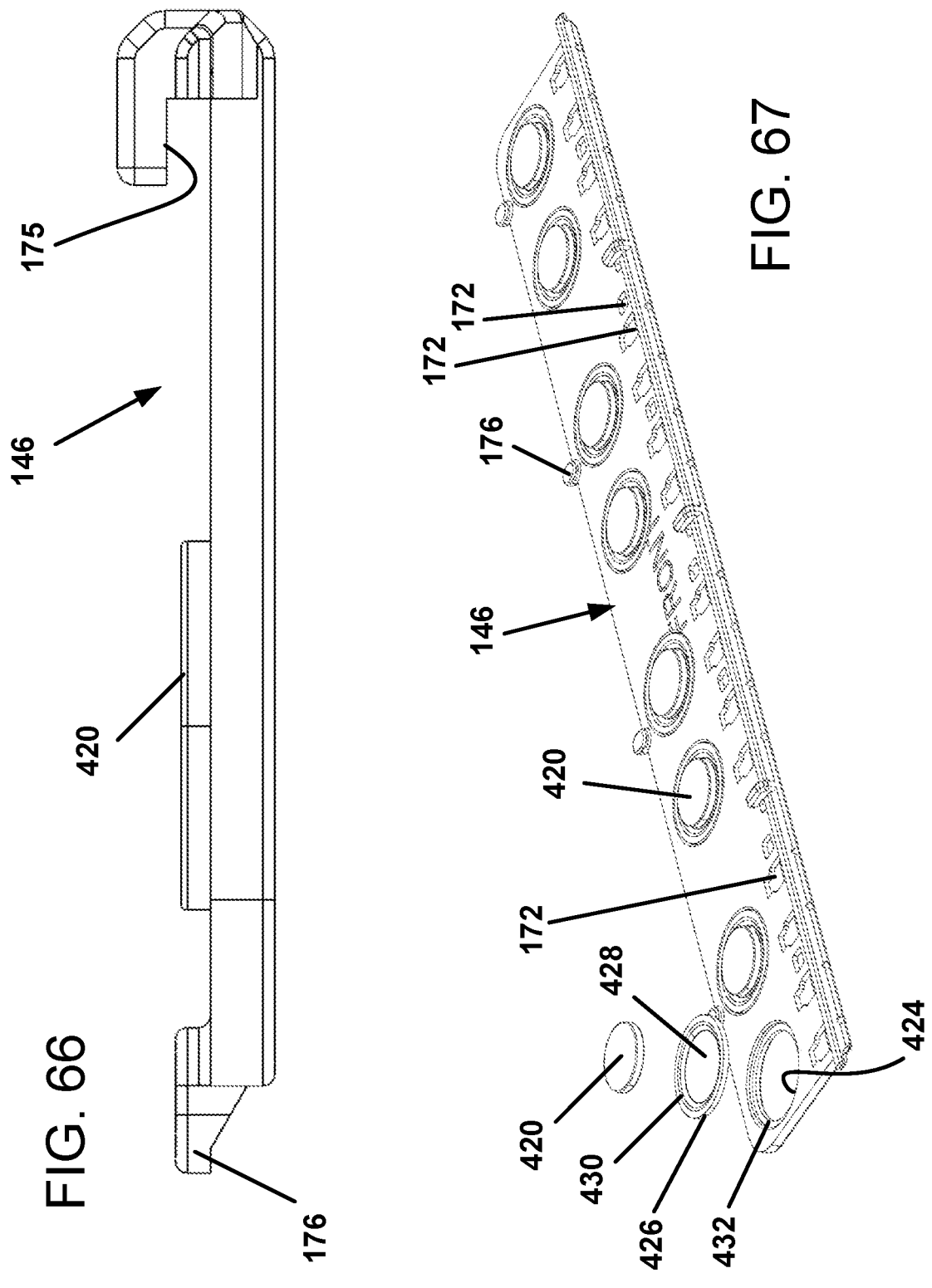
FIG. 66 is a side elevational view of an example bezel forming part of the tray arrangement of FIG. 65.
FIG. 67 is a perspective view of the bezel of FIG. 66 shown with one of the magnets exploded upwardly for ease in viewing.

As shown in FIGS. 66 and 67, the magnets 420 can be mounted to the tray arrangement 100 using the bezels 146. For example, each bezel 146 may define one or more apertures 424 at which the magnets 420 can be mounted. In an example, the magnets 420 are mounted in a row extending across the width of the tray arrangement 100 at the front of the tray arrangement 100. In certain implementations, the magnets 420 are mounted onto platforms 426 that mount to the bezel 146 at the apertures 424. In certain examples, the platforms 426 are clamped or otherwise held between the bezel 146 and the circuit board 142.

In certain examples, each platform 426 includes a rim 430 surrounding a base 428. The base 428 is configured to hold a magnet 420. In an example, the base 428 is ferromagnetic. In certain examples, the base 428 is recessed relative to the rim 430 to seat the magnet 420 further into the aperture 424. In some examples, the rim 430 of the platform 426 seats on a surface 432 recessed into the aperture 424.

FIG. 69 illustrates another example port member 116

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A panel system comprising:
   a chassis defining an interior;
   a tray arrangement mountable within the interior of the chassis, the tray arrangement including a circuit board, and the tray arrangement including a first portion of a port occupancy sensor arrangement and a cassette sensor disposed on the circuit board; and
   a cassette mountable to the tray arrangement, the cassette including a plurality of front ports, the cassette including a second portion of the port occupancy sensor arrangement at the front ports, and the cassette including a cassette identifier, the second portion of the port occupancy sensor arrangement and the cassette identifier being configured to engage the first portion of the port occupancy sensor arrangement and the cassette sensor, respectively, when the cassette is mounted to the tray arrangement, the cassette identifier being separate from the port occupancy sensor arrangement.

2. The panel system of claim 1, wherein the cassette sensor is one of a plurality of cassette sensors; and wherein the cassette identifier includes an electronic storage and an interface through which the electronic storage is accessible at one of the cassette sensors.

3. The panel system of claim 2, wherein the tray arrangement extends along a depth between a front and a rear and extends along a width between opposite first and second sides, wherein the tray arrangement includes a plurality of cassette guides arranged in parallel along the depth of the tray arrangement and spaced apart along the width of the tray arrangement to define bays, the cassette being mountable over at least one of the bays, wherein the cassette sensors are disposed on the circuit board so that at least a majority of the bays each have a respective one of the cassette sensors.

4. The panel system of claim 3, wherein the first portion of the port occupancy sensor arrangement includes a plurality of plug sensors disposed on the circuit board, the plug sensors including first plug sensors and second plug sensors so that each bay includes at least two respective first plug sensors and at least one respective second plug sensor, each second plug sensor being offset along the depth of the tray arrangement from the respective first plug sensors.

5. The panel system of claim 1, further comprising a communications unit mounted relative to the chassis, the communications unit being configured to receive data from both the cassette identifier and the port occupancy sensor arrangement.

6. The panel system of claim 1, wherein the tray arrangement includes a tray base to which the circuit board is mounted, the tray base defining an aperture through a thickness of the tray base, the circuit board having a portion overhanging the aperture, the circuit board carrying circuit components on the portion overhanging the aperture so that the circuit components extend into the aperture.

7. The panel system of claim 6, wherein the aperture is one of a plurality of apertures defined by the tray base and the portion of the circuit board is one of a plurality of portions that overhang the apertures; and wherein all active components mounted to the circuit board are mounted to the portions that overhang the apertures so that the active components extend into the apertures.

8. The panel system of claim 6, wherein the tray base and the circuit board including all components mounted to the circuit board have a total thickness of no more than 2 mm.

9. The panel system of claim 1, further comprising:
a first tactile interface member coupled to the circuit board at a first side of the tray arrangement; and
a second tactile interface member coupled to the circuit board at a second side of the tray arrangement, the second side being opposite the first side, the first and second tactile interface members cooperating to enable a user to indicate a selected one of the front ports.

10. The panel system of claim 9, further comprising:
a plurality of light indicators disposed at respective ones of the front ports; and
a communications unit mounted at the chassis, the communications unit being communicatively coupled to the circuit board to receive signals from the port occupancy sensor arrangement and the cassette sensor and to send control signals to the light indicators based on input received from the first and second tactile interface members.

11. The panel of claim 9, wherein the tray arrangement is movable relative to the chassis between a retracted position and an extended position, wherein the tray arrangement includes a first latching arrangement at the first side of the tray arrangement and a second latching arrangement at the second side of the tray arrangement, the first and second latching arrangements releasably retaining the tray arrangement relative to the chassis in one of the retracted and extended positions, wherein the first tactile interface member is disposed at the first latching arrangement and the second tactile interface member is disposed at the second latching arrangement.

12. The panel system of claim 1, further comprising:
a plurality of magnets disposed at the tray arrangement; and
a ferromagnetic member carried by the cassette to align with a respective one of the magnets when the cassette is mounted to the tray arrangement.

13. The panel system of claim 1, wherein the cassette identifier includes an electronic storage and an interface through which the electronic storage is accessible at one of the cassette sensors.

14. The panel system of claim 13, wherein the interface of the cassette identifier includes spring contacts.

15. The panel system of claim 1, wherein the spring contacts of the second portion of the cassette identification sensor arrangement are pre-loaded at the cassette.

16. The panel system of claim 1, wherein the second portion of the port occupancy sensor arrangement is deflectably mounted to the cassette.

17. The panel system of claim 16, wherein the second portion of the port occupancy sensor arrangement includes a plurality of shutter arrangements at the front ports, the shutter arrangements including spring contact.

18. The panel system of claim 17, wherein the spring contacts are monolithically formed with the shutters.

19. The panel system of claim 1, wherein the cassette is mountable to the tray arrangement from a front of the tray arrangement or a rear of the tray arrangement at a discretion of a user.

20. The panel system of claim 1, wherein the cassette identifier is mountable to the cassette at a rear corner of the cassette.

\* \* \* \* \*